US009461546B2

(12) United States Patent
Freeman et al.

(10) Patent No.: US 9,461,546 B2
(45) Date of Patent: Oct. 4, 2016

(54) POWER DEVICE AND METHOD FOR DELIVERING POWER TO ELECTRONIC DEVICES

(71) Applicant: Advanced Charging Technologies, LLC, Tulsa, OK (US)

(72) Inventors: Michael H. Freeman, Tulsa, OK (US); W. J. "Jim" Weaver, Jr., Tulsa, OK (US); Mitchael C. Freeman, Sapulpa, OK (US); Robert Dieter, Owasso, OK (US); Brian Santee, Tulsa, OK (US)

(73) Assignee: ADVANCED CHARGING TECHNOLOGIES, LLC, Tulsa, OK (US)

( * ) Notice: Subject to any disclaimer, the term of this patent is extended or adjusted under 35 U.S.C. 154(b) by 0 days.

(21) Appl. No.: 14/168,364

(22) Filed: Jan. 30, 2014

(65) Prior Publication Data
US 2015/0036389 A1 Feb. 5, 2015

Related U.S. Application Data

(60) Provisional application No. 61/859,445, filed on Jul. 29, 2013, provisional application No. 61/857,373, filed on Jul. 23, 2013, provisional application No. 61/847,473, filed on Jul. 17, 2013, provisional (Continued)

(51) Int. Cl.
*H02M 3/335* (2006.01)
*H02M 1/10* (2006.01)
(Continued)

(52) U.S. Cl.
CPC ....... *H02M 3/33507* (2013.01); *H01R 31/065* (2013.01); *H02M 1/10* (2013.01);
(Continued)

(58) Field of Classification Search
CPC .............. H02M 7/003; H02M 7/217; H02M 2001/0019; H02M 2001/0058; H02M 3/06; H02M 1/10; H02M 2003/072; G05F 1/10
USPC ....... 363/16, 17, 20, 21.01, 21.02, 21.03, 62
See application file for complete search history.

(56) References Cited

U.S. PATENT DOCUMENTS 4,464,710 A * 8/1984 Gruber ................ H02M 3/3382
323/901
5,057,986 A * 10/1991 Henze ............... H02M 3/33576
363/20

(Continued)

OTHER PUBLICATIONS

Non-Final Office Action (U.S. Appl. No. 14/487,639); Notification Date: Dec. 4, 2015.

*Primary Examiner* — Timothy J Dole
*Assistant Examiner* — Yusef Ahmed
(74) *Attorney, Agent, or Firm* — Howard & Howard Attorneys PLLC

(57) ABSTRACT

An energy efficient apparatus includes a switching device, a frequency dependent reactive device, and a control element is provided. The switching device is coupled to a source of electrical power and includes a pair of transistors and is adapted to receive a control signal and to produce an alternating current power signal. The frequency of the alternating current power signal is responsive to the control signal. The frequency dependent reactive device is electrically coupled to the pair of transistors for receiving the alternating current power signal and producing an output power signal. The frequency dependent reactive device is chosen to achieve a desired voltage of the output power signal relative to the frequency of the alternating current power signal. The control element senses an actual voltage of the direct current power signal and modifies the control signal delivered to achieve the desired voltage of the direct current power signal.

8 Claims, 78 Drawing Sheets

Related U.S. Application Data application No. 61/844,784, filed on Jul. 10, 2013, provisional application No. 61/841,079, filed on Jun. 28, 2013, provisional application No. 61/835,438, filed on Jun. 14, 2013, provisional application No. 61/809,732, filed on Apr. 8, 2013, provisional application No. 61/809,080, filed on Apr. 5, 2013, provisional application No. 61/762,785, filed on Feb. 8, 2013, provisional application No. 61/762,762, filed on Feb. 8, 2013, provisional application No. 61/762,723, filed on Feb. 8, 2013.

(51) Int. Cl.
  *H02M 3/07* (2006.01)
  *H02M 3/158* (2006.01)
  *H02M 3/337* (2006.01)
  *H02M 7/217* (2006.01)
  *H01R 31/06* (2006.01)

(52) U.S. Cl.
  CPC ............ *H02M 3/07* (2013.01); *H02M 3/158* (2013.01); *H02M 3/335* (2013.01); *H02M 3/337* (2013.01); *H02M 3/3374* (2013.01); *H02M 3/33592* (2013.01); *H02M 7/217* (2013.01); *Y02B 70/1475* (2013.01); *Y10T 29/41* (2015.01)

(56) References Cited

U.S. PATENT DOCUMENTS

| | | | |
|---|---|---|---|
| 5,180,963 A * | 1/1993 | El-Sharkawi | G05F 1/70 323/209 |
| 5,402,329 A * | 3/1995 | Wittenbreder, Jr. | H02M 3/33576 363/127 |
| 5,453,921 A * | 9/1995 | Shutts | H02M 3/33507 363/21.15 |
| 5,587,892 A * | 12/1996 | Barrett | H02M 1/4208 363/16 |
| 5,625,539 A * | 4/1997 | Nakata | H02M 7/4807 363/132 |
| 5,650,705 A * | 7/1997 | Hart | H02P 7/0044 318/635 |
| 5,675,480 A * | 10/1997 | Stanford | H02M 3/285 307/58 |
| 5,838,558 A * | 11/1998 | Tan | H02M 3/3376 363/17 |
| 5,959,470 A * | 9/1999 | Sugihashi | G11C 27/024 327/91 |
| 6,121,761 A * | 9/2000 | Herbert | H02M 3/07 323/222 |
| 6,288,914 B1 * | 9/2001 | Sato | H02M 3/33523 363/18 |
| 6,452,814 B1 * | 9/2002 | Wittenbreder | H02M 1/34 363/127 |
| 6,462,962 B1 * | 10/2002 | Cuk | H02M 1/34 363/131 |
| 6,605,972 B1 * | 8/2003 | Wright | G06F 1/10 327/291 |
| 7,408,330 B2 * | 8/2008 | Zhao | H02M 3/07 323/266 |
| 7,557,641 B2 * | 7/2009 | Georgescu | H02M 3/07 327/536 |
| 7,616,465 B1 * | 11/2009 | Vinciarelli | H02M 3/157 323/265 |
| 7,746,669 B2 * | 6/2010 | Falk | H02M 3/3372 363/132 |
| 7,796,410 B2 * | 9/2010 | Takayanagi | H02J 7/0013 307/66 |
| 7,907,430 B2 * | 3/2011 | Kularatna | G05F 1/46 320/167 |
| 7,907,431 B2 * | 3/2011 | Barrenscheen | B60W 10/08 363/124 |
| 8,593,837 B2 * | 11/2013 | Hong | G03G 15/5004 320/166 |
| 8,854,019 B1 * | 10/2014 | Levesque | H02M 3/07 323/266 |
| 8,867,245 B1 * | 10/2014 | Hwang | H02M 1/4225 363/21.04 |
| 2001/0010638 A1 * | 8/2001 | Konno | H02M 3/335 363/21.07 |
| 2001/0036091 A1 * | 11/2001 | Yasumura | H02M 3/3385 363/21.02 |
| 2002/0006047 A1 * | 1/2002 | Yasumura | H02M 3/3385 363/21.01 |
| 2003/0038619 A1 * | 2/2003 | Boateng | G01R 31/3167 324/76.53 |
| 2003/0099122 A1 * | 5/2003 | Cho | H02M 3/337 363/125 |
| 2004/0242182 A1 * | 12/2004 | Hidaka | H04B 1/44 455/333 |
| 2005/0068008 A1 * | 3/2005 | Zhang | H02J 7/0026 320/134 |
| 2005/0088862 A1 * | 4/2005 | Simada | H02M 1/36 363/49 |
| 2005/0105305 A1 * | 5/2005 | Sawada | H02M 1/4225 363/34 |
| 2005/0270805 A1 * | 12/2005 | Yasumura | H02M 3/3376 363/16 |
| 2005/0281059 A1 * | 12/2005 | Yasumura | H02M 1/4241 363/16 |
| 2006/0062025 A1 * | 3/2006 | Yasumura | H02M 3/3376 363/16 |
| 2006/0164870 A1 * | 7/2006 | Yasumura | H02M 1/10 363/17 |
| 2007/0008743 A1 * | 1/2007 | Weinberg | H02M 3/3374 363/16 |
| 2007/0041222 A1 * | 2/2007 | Eguchi | H02M 1/10 363/17 |
| 2007/0091649 A1 * | 4/2007 | Vinciarelli | H02M 3/1584 363/16 |
| 2007/0217235 A1 * | 9/2007 | Quazi | H02M 1/425 363/89 |
| 2007/0279034 A1 * | 12/2007 | Roh | H02M 3/157 323/351 |
| 2008/0055941 A1 * | 3/2008 | Victor | H02M 3/158 363/17 |
| 2008/0101096 A1 * | 5/2008 | Takayanagi | H02J 7/0013 363/17 |
| 2008/0158915 A1 * | 7/2008 | Williams | H02M 3/07 363/21.06 |
| 2008/0198638 A1 * | 8/2008 | Reinberger | H02M 3/3376 363/74 |
| 2008/0219030 A1 * | 9/2008 | Chang | H02M 3/33569 363/17 |
| 2008/0239772 A1 * | 10/2008 | Oraw | H02M 3/07 363/60 |
| 2008/0278970 A1 * | 11/2008 | Honda | A61B 1/00032 363/21.01 |
| 2008/0298095 A1 * | 12/2008 | Chuang | H02M 3/33523 363/21.12 |
| 2009/0034299 A1 * | 2/2009 | Lev | H02M 3/33592 363/17 |
| 2009/0086511 A1 * | 4/2009 | Lin | H02M 3/07 363/21.01 |
| 2009/0290389 A1 * | 11/2009 | Ueno | H02M 3/337 363/21.02 |
| 2010/0321963 A1 * | 12/2010 | Yamashita | H02M 3/33507 363/21.17 |
| 2012/0014143 A1 * | 1/2012 | Schueneman | H02M 1/126 363/40 |
| 2012/0134705 A1 * | 5/2012 | Fukutani | H02M 3/33569 399/88 |
| 2012/0176823 A1 * | 7/2012 | Sims | H02M 7/02 363/69 |
| 2012/0250366 A1 * | 10/2012 | Wang | H02M 3/33523 363/21.15 |
| 2013/0016533 A1 * | 1/2013 | Halberstadt | H02M 3/3376 363/21.02 |
| 2013/0027986 A1 * | 1/2013 | Atrash | H02M 3/33507 363/21.07 |

(56) References Cited

U.S. PATENT DOCUMENTS

| | | | | |
|---|---|---|---|---|
| 2013/0033903 A1* | 2/2013 | Teggatz | H02M 3/3387 | 363/16 |
| 2013/0051088 A1* | 2/2013 | Yamashita | H02M 1/36 | 363/21.13 |
| 2013/0099590 A1* | 4/2013 | Ma | H02M 3/3388 | 307/104 |
| 2013/0099691 A1* | 4/2013 | Esaki | H05B 33/0815 | 315/210 |
| 2013/0099787 A1* | 4/2013 | Lu | H02M 3/3376 | 324/319 |
| 2013/0127358 A1* | 5/2013 | Yao | H05B 33/0815 | 315/201 |
| 2013/0188397 A1* | 7/2013 | Wu | H02M 3/33576 | 363/17 |
| 2013/0207571 A1* | 8/2013 | Esaki | H05B 37/02 | 315/297 |
| 2013/0229841 A1* | 9/2013 | Giuliano | H02M 3/158 | 363/60 |
| 2013/0234513 A1* | 9/2013 | Bayer | G05F 1/577 | 307/31 |
| 2013/0242616 A1* | 9/2013 | Oldenkamp | H02J 3/383 | 363/16 |
| 2013/0265804 A1* | 10/2013 | Fu | H02M 3/33576 | 363/17 |
| 2013/0301304 A1* | 11/2013 | Murakami | H02M 3/335 | 363/17 |
| 2014/0002043 A1* | 1/2014 | Li | H02M 3/156 | 323/282 |
| 2014/0049991 A1* | 2/2014 | Freeman | H02M 3/33507 | 363/37 |
| 2014/0049997 A1* | 2/2014 | Freeman | H02M 7/539 | 363/97 |
| 2014/0051292 A1* | 2/2014 | Weaver, Jr. | H01R 13/6675 | 439/620.21 |
| 2014/0070787 A1* | 3/2014 | Arno | H02M 3/07 | 323/304 |
| 2014/0160799 A1* | 6/2014 | Gu | H02M 3/156 | 363/17 |
| 2014/0167648 A1* | 6/2014 | Hsiu | H05B 33/0815 | 315/299 |
| 2014/0225439 A1* | 8/2014 | Mao | H02M 3/3376 | 307/31 |
| 2014/0268897 A1* | 9/2014 | Zimmanck | H02M 3/3353 | 363/17 |
| 2014/0334190 A1* | 11/2014 | Zhang | H02M 3/33507 | 363/17 |
| 2014/0346962 A1* | 11/2014 | Sanders | H05B 33/0815 | 315/193 |
| 2015/0048891 A1* | 2/2015 | Rozek | H02M 3/07 | 330/297 |
| 2015/0155895 A1* | 6/2015 | Perreault | H04B 1/0458 | 455/127.3 |

* cited by examiner

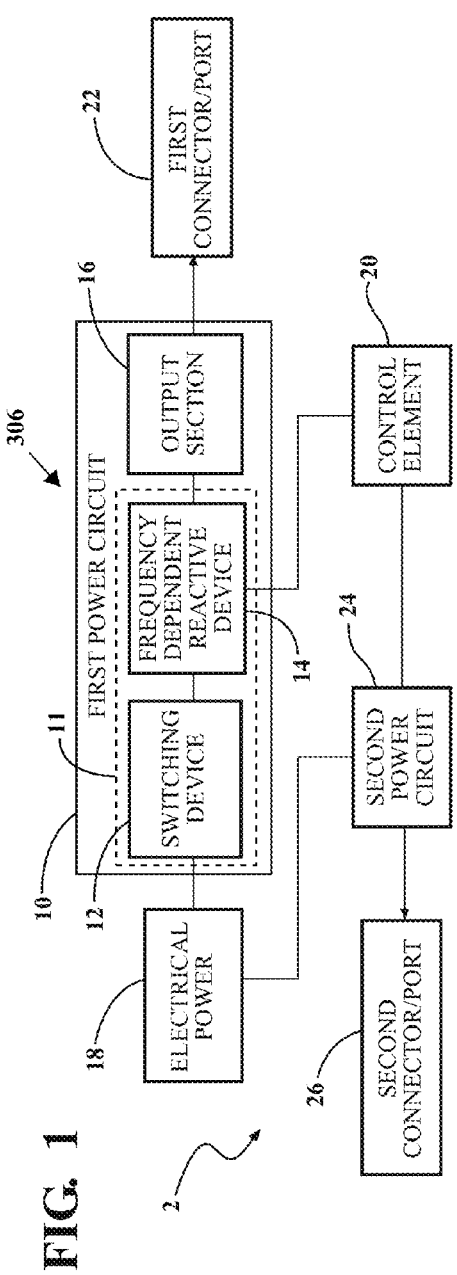
FIG. 1
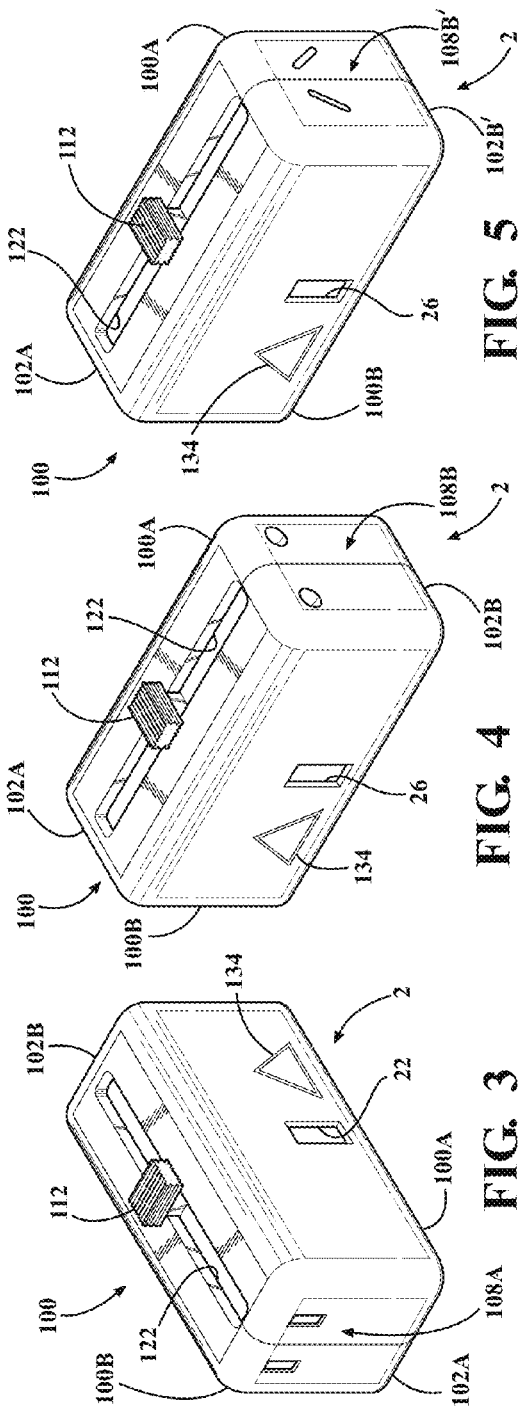
FIG. 3
FIG. 4
FIG. 5

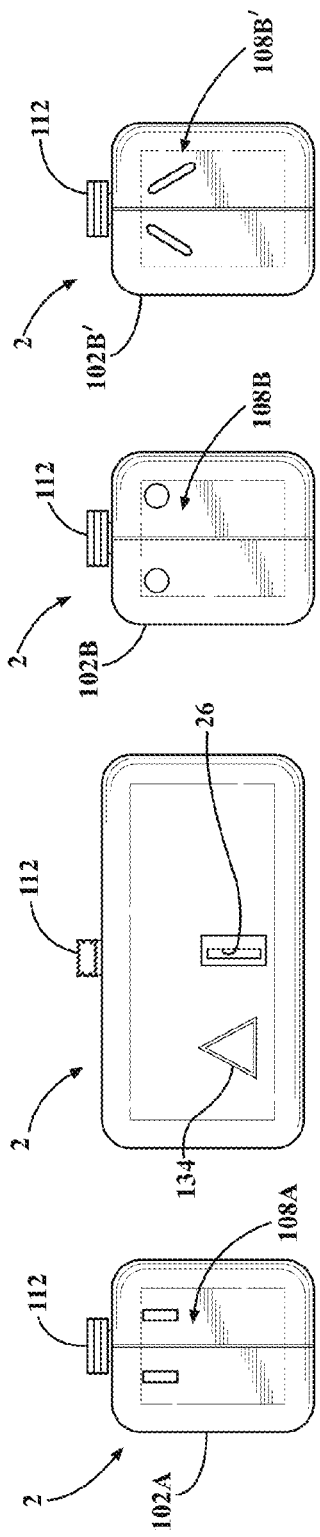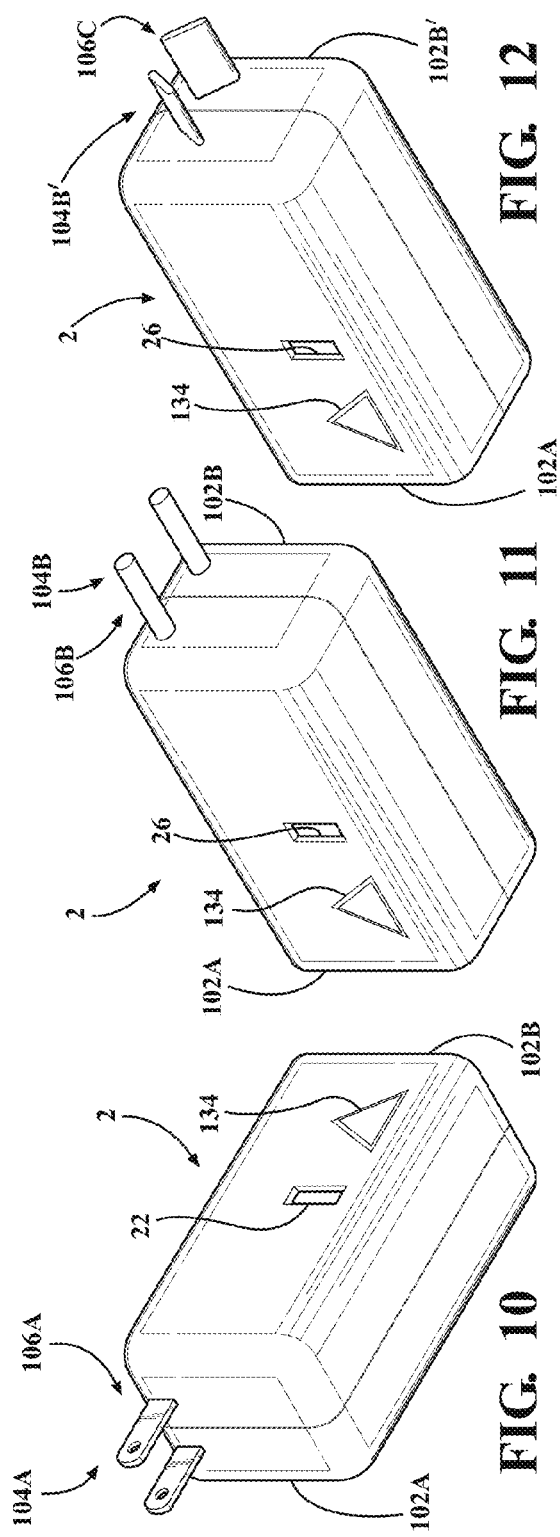

Switched N-Capacitor Ladder with Buck Output

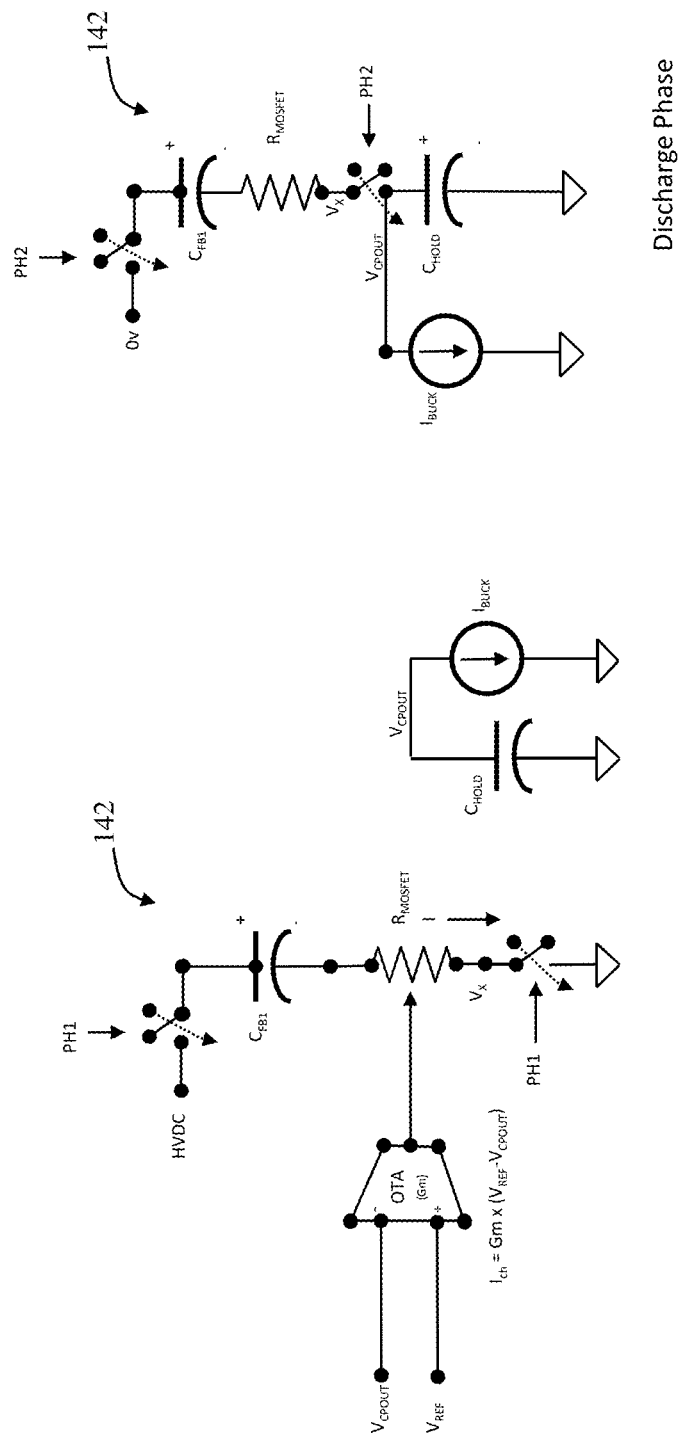
FIG. 41 Discharge Phase
FIG. 40 Charge Phase

BiDFET with FET Source Connected to AC Main, Asynchronous Secondary, PWM Controller Referenced to Secondary Asynchronous BiDFET with FETs Blocking Current from Transformer BiDFET With Single Side Switching BiDFET with FET Source Connected to Transformer, Synchronous Secondary, PWM Controller Referenced to Secondary BiDFET with FET Source Connected to Transformer and PWM Controller Referenced to Asynchronous Secondary BiDFET with FET Source Connected to Transformer, Asynchronous Secondary, PWM Controller Referenced to Primary Asynchronous BiDFET with FETs Blocking Current From AC Source BiDFET with FET Source Connected to AC Main, Synchronous Secondary, PWM Controller Referenced to Primary Synchronous BiDFET With FETs Blocking Current From Transformer BiDFET with FET Source Connected to AC Main and PWM Controller Referenced to Synchronous Secondary Block Diagram of Dies for a BiDFET Integrated Module Package Asynchronous Modified Ćuk Converter Synchronous Modified Ćuk Converter with Quasi-Resonant Front End Synchronous Modified Ćuk Converter Synchronous Modified Push-Pull Converter Asynchronous Modified Push-Pull Converter Synchronous Modified Push-Pull Converter With Quasi-Resonant Front End Synchronous Modified SEPIC Converter Asynchronous Modified SEPIC Converter Synchronous Modified SEPIC Converter With Quasi-Resonant Front End

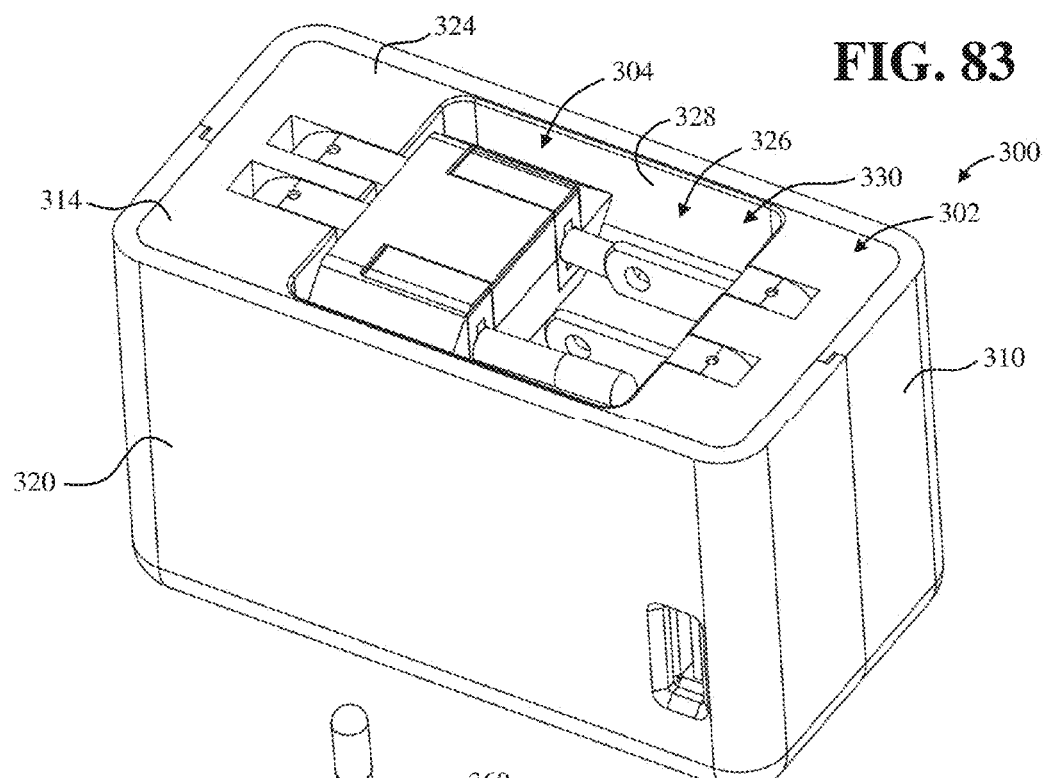
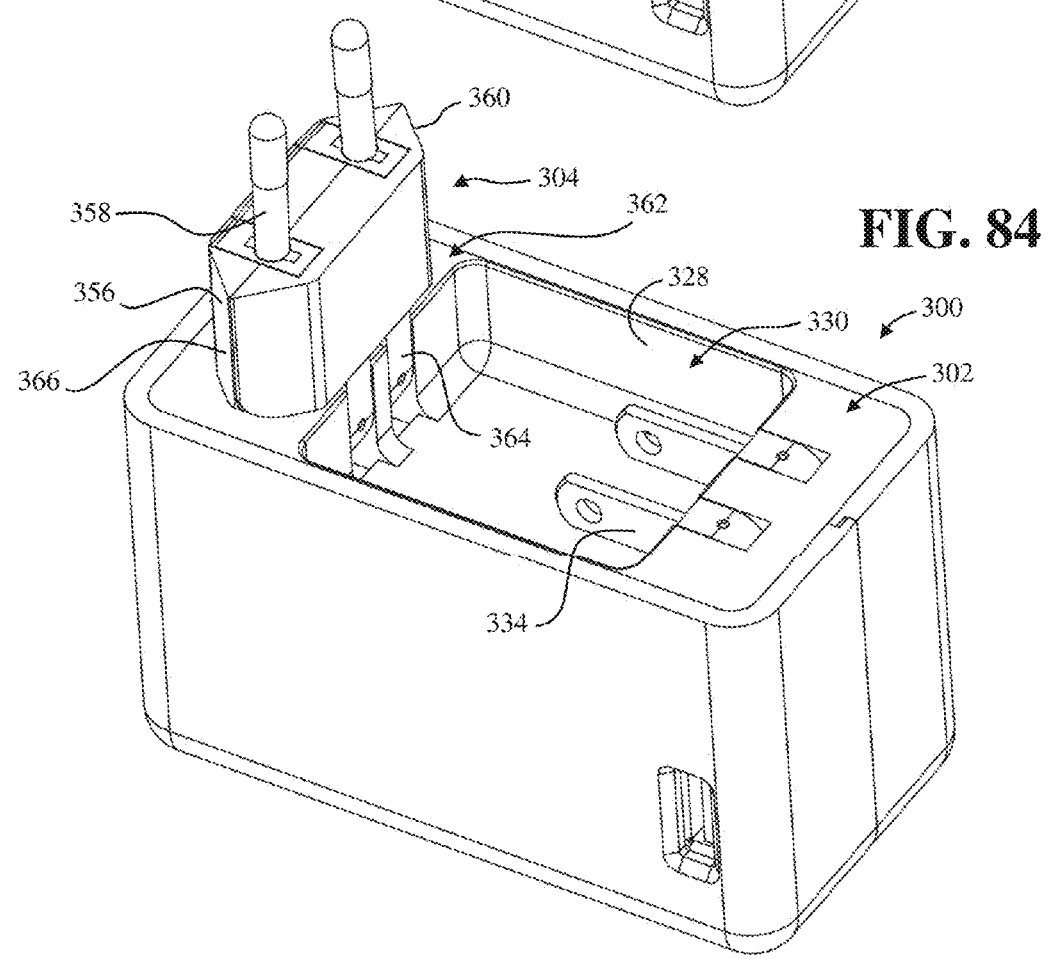

POWER DEVICE AND METHOD FOR DELIVERING POWER TO ELECTRONIC DEVICES

CROSS-REFERENCES TO RELATED APPLICATIONS

This application claims priority to U.S. Provisional Patent Application Ser. No. 61/859,445, filed on Jul. 29, 2013; U.S. Provisional Patent Application Ser. No. 61/857,373, filed on Jul. 23, 2013; U.S. Provisional Patent Application Ser. No. 61/847,473, filed on Jul. 17, 2013; U.S. Provisional Patent Application Ser. No. 61/844,784, filed on Jul. 10, 2013; U.S. Provisional Patent Application Ser. No. 61/841,079, filed on Jun. 28, 2013; U.S. Provisional Patent Application Ser. No. 61/835,438, filed on Jun. 14, 2013; U.S. Provisional Patent Application Ser. No. 61/809,732, filed on Apr. 8, 2013; U.S. Provisional Patent Application Ser. No. 61/809,080, filed on Apr. 5, 2013; U.S. Provisional Patent Application Ser. No. 61/762,785, filed on Feb. 8, 2013; U.S. Provisional Patent Application Ser. No. 61/762,762, filed on Feb. 8, 2013; and U.S. Provisional Patent Application Ser. No. 61/762,723, filed on Feb. 8, 2013, all of which are hereby incorporated by reference in their entirety for all purposes.

FIELD OF THE INVENTION

The present invention relates generally to power device circuits and integrated circuits, and more particularly, to a power circuit which transforms electrical power utilizing a frequency dependent reactive device.

BACKGROUND OF THE INVENTION

The Energy Crises Requires Demand Side Response That Lowers Current Loads. The Energy Crisis is upon us worldwide. For instance, the U.S. Department of Energy predicts that by 2015 there will not, on the average, be enough electric power to supply average demand in the U.S.

One of the controllable offenders is "Vampire Loads". Also call "Wall Wort Power" or "Standby Power" this electricity waste is estimated by the U.S. Department of Energy (DOE) to be in excess of 100 Billion kW annually costing over Ten Billion Dollars in wasted energy. Vampire Load producers includes cell phone chargers, lap top chargers, notebook chargers, calculator chargers, small appliances, and other battery powered consumer devices.

The U.S. Department of Energy said in 2008:

"Many appliances continue to draw a small amount of power when they are switched off. These "phantom" loads occur in most appliances that use electricity, such as VCRs, televisions, stereos, computers, and kitchen appliances. This can be avoided by unplugging the appliance or using a power strip and using the switch on the power strip to cut all power to the appliance."

According to the U.S. Department of Energy, the following types of devices consume standby power:

1. Transformers for voltage conversion. (Including cell phone, lap top and notepad, calculators and other battery powered devices that use wall chargers).
2. Wall wart power supplies powering devices which are switched off. (Including cell phone, lap top and notepad, calculator, battery powered drills and tools, all of which have wall chargers and have either completely charged the batteries or are actually disconnected from the device).
3. Many devices with "instant-on" functions which respond immediately to user action without warm-up delay.
4. Electronic and electrical devices in standby mode which can be woken by a remote control, e.g. some air conditioners, audio-visual equipment such as a television receiver.
5. Electronic and electrical device which can carry out some functions even when switched off, e.g. with an electrically powered timer. Most modern computers consume standby power, allowing them to be woken remotely (by Wake on LAN, etc.) or at a specified time. These functions are always enabled even if not needed; power can be saved by disconnecting from mains (sometimes by a switch on the back), but only if functionality is not needed.
6. Uninterruptible power supplies (UPS)

All this means that even when a cell phone, lap top or like device is completely charged, current is still flowing, but not accomplishing anything and wasting electricity. Most recently manufactured devices and appliances continue to draw current all day, every day—and cost you money and add to the Energy Crisis Worldwide.

The National Institute of Standards and Technology (NIST) (a division of the U.S. Department of Commerce) through its Buildings Technology Research and Development Subcommittee in 2010 stated its goals for reducing "plug loads," stating:

"The impact of plug loads on overall consumption is quite significant. For commercial buildings, plug loads are estimated at 35% of total energy use, for residential 25%, and for schools 10%.

Opportunities for lowering plug loads include:
1) more efficient plugged devices and appliances,
2) automated switching devices that turn off unused appliances and reduce "vampire" loads from transformers and other small but always on appliances, or
3) modifying occupant behaviors."

One of the problems experienced by virtually all modern electronics is that power supplies, whether external or embedded "power modules" are not energy efficient. This is true for a number of several reasons, one of which dates back to 1831 when Michael Faraday invented the transformer. Transformers are inherently inefficient because, as an analog device, they can only produce on power output for each specific winding. So if two power outputs are necessary, two secondary windings are necessary. Moreover, there are often over 50 parts and pieces that are necessary to work with a transformer to create a common modern external power supply, the numbers only get somewhat lower with internal or embedded power modules. The number of parts in a power supply is inherently inefficient because current must travel in, around and through the various parts, each with different power dissipation factors; and even the circuit traces cause resistive losses creating energy waste.

Further, the way a transformer works is creating and collapsing a magnetic field. Since all of the electrons cannot be "recaptured" by the magnetic field creation/collapse, those that escape often do so as heat, which is why cell phone, lap top and tablet chargers feel warm or hot to the touch. It is also the primary reason why all consumer electronics create heat, which not only wastes energy/electricity, but causes eventual detrition through heating of other associated electronic parts.

Another inefficiency found in current electronics is the need for multiple internal power supplies to run the different parts. For instance, in the modern world power modules MOSFETS which have become more and more important part of the "real world" interfaces in circuitry.

MOSFETS enable switching, motor/solenoid driving, transformer interfacing, and a host of other functions. At the other end of the spectrum is the microprocessor. Microprocessors are characterized by steady reduced operating voltages and currents, which may be 5 volts, 3.3 volts, 2.7 volts or even 1.5 volts. In most systems the MOSFETS and microprocessors are used together or in combination to make the circuitry work. However, most often the microprocessor and the drivers for the MOSFETS operate at different voltages, causing the need for multiple power supplies within a circuit.

A standard MOSFET requires a driver that can deliver on the order of a 15 volt swing in order to successfully turn it on and off. In the case of turn on, there is actually a requirement for that the driver voltage exceed the rail power to be effective. Specialty drivers using charge pump technology have been devised for this purpose. The MOSFET drivers other main function is to have a reduced input drive requirement making it compatible with the output drive capability of modern CMOS processor.

This MOSFET/driver arrangement, common in most external power supplies, like chargers, actually requires three separate power supplies. The first power supply needed is the main power rail, which is normally composed of a voltage in the range of 100 VAC to 300 VAC supplied to the MOSFET. The second power supply needed is the 15 volts (or higher) required by the MOSFET drivers. Finally, the microprocessors require another isolated power supply for their many different and varying voltages.

A good example of the current inefficiencies and energy waste is found in a typical television, which requires as many as four to six different power supply modules, to run the screen, backlighting, main circuit board, and sound and auxiliary boards. This current system requires multiple transformers and dozens of parts for each power supply needed. The transformers and the parts (including MOSFETS) multiply heat through their duplicated inefficiencies, which is one reason the back of a television is always hot to the touch. In addition, the more transformers that are needed for various power outputs, the more parts are needed, and more causation for energy waste is created.

In addition to the heat problem, the multiple transformer based power supplies all need typically from forty to sixty parts to operate, requiring dozens of parts for a typical transformer based television power supply module which increases costs and total component size while decreasing reliability. With the multiplicity of parts comes increased system resistance which ends up in wasted energy as heat.

The present invention is aimed at one or more of the problems identified above to provide better efficiencies and create more control over electrical inrush currents from rail sources.

SUMMARY OF THE INVENTION

In one aspect of the present invention, a power circuit for providing electrical power at a desired voltage level from an alternating current power source is provided. The power circuit includes a rectifying circuit, a switching device, a control element, and a frequency dependent reactive device. The rectifying circuit is electrically coupled to the alternative current power source for producing a rectified AC power signal. The switching device is coupled to the rectifying circuit and includes first and second pairs of transistors. Each pair of transistors is arranged in a totem pole configuration fixed at 180 degrees of each other. The first and second pairs of transistors drive a high-side output and a low-side output, respectively, to produce an alternating current power signal. The frequency of the alternating current power signal is responsive to a control signal. The control element is coupled to the switching device for delivering the control signal to the switching device. The frequency dependent reactive device is electrically coupled to the first and second pairs of transistors for receiving the alternating current power signal and producing an output power signal. The frequency dependent reactive device includes first and second reactive elements and a rectifier. The first and second reactive elements are electrically coupled to the high-side and low-side outputs, respectively, and to the rectifier, and are chosen to achieve the desired voltage of the output power signal relative to the frequency of the alternating current power signal. The control element is configured to modify the control signal delivered to the switching element to fine tune the switching device to achieve the desired voltage of the output power signal.

This invention works for both battery powered devices and direct powered devices. With a communication chip included in the SmartProng™ Technology Plug/cord, powered appliances can receive a command to shut-off the appliance/device at certain times (usually designated as "Demand Response" times by the Electrical Utility) and thus cover the entire plug load market with added energy efficiency.

Many similar existing electronic devices use a "Post-Regulation System" which extracts the exact power flow from a wall outlet then modifies it to an approximately desired AC voltage, usually through the use of a transformer, which is then converted to pulsating DC through the use of a rectifying system (usually in a circuit board), commonly through the use of a full wave bridge. Then an electrolytic capacitor is used to provide an unregulated DC voltage. Finally, a linear regulator device is used to provide the desired regulated DC power. Because the regulator is at the end of this chain, this is described herein a as a "Post-Regulation System." All of the parts in the chain provide losses which come in the form of heat and waste of electricity (loss). In the Post-Regulation Systems, the largest loss typically comes from the linear regulator followed closely by the transformer.

This invention is a method for a design and utility patent for "Pre-Regulating" power current loads for devices which makes transformers obsolete, and regulating battery fulfillment, turning-off power when the battery is full and saving wasted energy.

One way to replace the transformer in such a system is through capacitor drop technology which is described herein. This process hinges on a capacitor's ability to pass an AC voltage that diminishes with frequency. For a given frequency, such as 60 cycle AC, it is possible to select a value that will deliver a desired AC output for a given load. This characteristic is similar to a valve in a water pipe. Because of this mode of action, this process is almost lossless.

In the current invention, the capacitors are used on the circuit board instead of a transformer.

The present invention utilizes capacitor drop technology, by housing it in or connected directly to the plug prong or prongs, which are then plugged into and AC outlet, makes the prongs themselves one or more capacitors. One advantage is that the voltage leaving the outlet socket is limited right from the start. This conserves energy and makes the SmartProng Plug safer. Thus safety and efficiency are embodied in a new and unique way into the same product. The miniature capacitors which are either embedded into one or more prongs or are connected to one or more prongs and housed in the plug can have a fixed value, like a plug that only delivers 5 volts AC at 1 Amp which would be the 5 watts needed to charge a cell phone. Or a fixed value could deliver 10 volts AC at 2 Amps for the 12 watts needed to power an iPad or similar notebook. Alternatively, the capacitance can be housed on the circuit board, replacing the need for the transformer and linear regulator combination.

In this configuration just the fixed capacitance could be utilized, or a chip, like Maxim's MAX8971 could be integrated with the SmartProng circuitry to create intelligence that would sense when the battery is full and disconnect the prong(s) capacitor from the AC outlet, thus shutting off the Vampire Load. In addition, as described below, when the charging device is plugged into the wall, but senses no device attached, the clock time is reduced to almost zero providing a no-load drain of less than 1 Milliwatt, approximately thirty (30) times lower than the recommended U.S. Standards issued in 2011.

The current invention uses an embedded processor which controls the process. This processor could also contain or be coupled with a carrier current system (communication over power lines) or wireless communication chip which would enable remote operation by the powered device or other remote system.

The invention modifies and controls the capacitance of a capacitor drop system, and eliminates the need for the transformer linear regulator combination at the end of the chain. Instead, it controls the amount of current (amp ×volts) that exits by frequency modulation.

As such, the capacitor charging technology is a very efficient because the two most heat producing and wasteful portions of the chain, i.e. the transformer and the linear regulators, are eliminated altogether. Moreover, many external charging devices provide less (700-800 mA) than the 1 A needed to adequately charge a phone, much less the 2.4 A needed to charge and run (while charging) devices like a tablet (i.e. a Samsung Galaxy or an iPad) or the 9.2 A needed to charge and/or run a notebook or laptop. The current invention can alter the voltage and amp outputs to be able to either charge one or more cell phones, or one or more tablets, or one or more notebooks/laptops, or alternatively one or more cell phones and one or more tablet, notebooks, and or laptops. All charging combinations of cell phones, tablets, notebooks, and/or laptops are possible.

The current invention's software and microprocessor recognizes through its logic in the microprocessor the draw from the battery as connected and analyzes the ramp up draw from that battery and then either sends 1 A (for charging a cell phone) or up to 2.4 A for devices like a tablet; or up to 9.2 A for charging a notebook or laptop, which the current invention can either do alternatively or at the same time. In one embodiment, the acceptable input voltage can range from a low of 85V—a high of 300V worldwide. Output voltage is device dependent but 5V to 19V are possible.

In another aspect of the invention a consolidated monolithic semiconductor part and/or hybrid chip (i.e. combinations of semiconductors and internal/external capacitors and/or internal/external MOSFETS, packaged together) can substantially alter these problems though an integrated "Energy well" semiconductor circuitry.

As this invention teaches, this new semiconductor part would include "Energy wells" which is defined as and can be anything that can store electricity, such as capacitors, super capacitors, and/or batteries which can then be managed by gateways and active and/or passive parts sets such as diodes, resistors, transistors, MOSFETS, high quality power factor inductors, polysilicon resistors, zener diodes, pin diodes, and the like.

In another aspect of the invention the semiconductors are combined to create a Power Supply System on a Chip ("PSSoC") which eliminates the need for dozens of external parts by the integration of tens, hundreds or even thousands of components such as resistors, capacitors, inductors and zener diodes in a single silicon die or several silicon dies, with or without external capacitors and/or MOSFETS, executed in a high power substrate such as a high voltage CMOS process that is compatible with microprocessor control/intelligence technology.

In one aspect of the present invention, it is an apparatus comprising a Power Supply system on a Chip (PSSoC) without the need for external digital control and with internal Energy wells, and/or with or without external capacitors, batteries, and/or MOSFETS, that has the following characteristics: (1) it will provide one or more external power outputs, which (2) work from any rectified and filtered "rail" power supply (i.e. 110 VAC, 230 VAC, 240 VAC) which (3) provides 180 VDC to 400 VDC for throughput within the chip system, and uses (4) either capacitors, resistors batteries, diodes, and/or integrated circuits instead of a transformer, to "digitize" the powering process, using (5) MOSFETS (transistors) to control power gateways, which then control the (6) Energy wells inputs and outputs, which are arraigned in a decreasing voltage ladder (much like a fish ladder on a dam), with the resulting process providing power in (7) multiple "dial-a-volt" output settings. The PSSoC is a high voltage stand-off, "dial-a-voltage™" multiple power output system on a chip. It can supply highly efficient (>70%) output power capable of delivering 5 to 15 volts and from 1 to 5 amps from each output. Its primary use is for providing power in "point-of-use" situations powering onboard circuitry or charging consumer products such as cell phones, tablets, and notebooks.

In another aspect of the invention, it is an apparatus comprising a Power Supply system in a Package (PSSiP) where the power IC potion of the chip is combined with a microcontroller chip within a JEDEC or other type hybrid packaging. The PSSiP may include only internal Energy wells or have external capacitors, batteries, and/or MOSFETS, that has the following characteristics: (1) it will provide one or more external power outputs, which (2) work from any rectified and filtered "rail" power supply (i.e. 110 VAC, 230 VAC, 240 VAC) which (3) provides 180 VDC to 400 VDC for throughput within the chip system, and uses (4) either capacitors, resistors batteries, diodes, and/or integrated circuits instead of a transformer, to "digitize" the powering process, using (5) MOSFETS (transistors) to control power gateways, which then control the (6) Energy wells inputs and outputs, which are arraigned in a decreasing voltage ladder (much like a fish ladder on a dam), with the resulting process providing power in (7) multiple "dial-a-volt" output settings. The PSSoC is a high voltage stand-off, "dial-a-voltage™" multiple power output system on a chip. It can supply highly efficient (>70%) output power capable of delivering 5 to 15 volts and from 1 to 5 amps from each output. Its primary use is for providing power in "point-of-use" situations powering onboard circuitry or charging consumer products such as cell phones, tablets, and notebooks.

The substrata for these Energy well PSSoC/PSSiP/s ("Power IC's") integrated circuits could be made from customary films currently used in capacitors (if external) or within semiconductor substrates such as high or low Ohmic silicon substrate, polysilicon, gallium nitride, gallium arsenide, silicon germanium or substances like silicon carbide or indium phosphide.

In another aspect of the invention the Power IC delivers a single output for external powering of a device or circuitry.

In another aspect of the invention the Power IC provides multiple power voltage/amp outputs simultaneously with many uses for external power supplies, and/or embedded power modules. Typical uses would be for charging two mobile phones (i.e. @5DCV@1 A each), charging two tablets (@5DCV@2.5 A), or charging one tablet and one mobile phone simultaneously. More than two devices may be charged or powered at a time. Power from 120 VAC (U.S. wall outlets) to 260 VAC (European/Asian wall outlets) is typically used as the primary power source.

In another aspect of the invention low, medium and high voltages may be externally output.

In another aspect of the invention the package is either monolithic or hybrid with rugged construction with a pinout that possesses enough separation to permit high voltages from one or more of the pins and/or low voltages from one or more of the pins.

In another aspect of the invention the logic inputs are compatible with the Serial communication standards, such as $I^2C$.

In another aspect of the invention the Power IC has separate power output stages allowing for different output voltage/current combinations while maintaining maximum regulation precision for off/on, charge full, or other duty cycle established by the user.

In one aspect of the invention, described below, the isolation is internal sufficient to enable UL/CE/RoHS compliance.

In another aspect of the invention the isolation is internal inside the chip and/or packaging using capacitor, air gap isolation and keep-out space isolation to enable UL/CE/RoHS compliance.

In another aspect of the invention the chip is programmable via a standard Serial interface.

In another aspect of the invention the microprocessor (MPU) contains an onboard A/D converter which could be a 12 bit onboard A/D converter allowing for precise regulation of the output voltages. The MPU also has onboard flash memory enabling storage of desired output voltage levels, current control such as fold-back current limiting, and additional power saving options such as programmable charging endpoint shut-down. It contains a watchdog timer system to detect program failure allowing shut down or automatic reboot.

In another aspect of the invention, the microcontroller can use an internal clock to keep in time with outside world events, such as being able to track, evaluate and then automatically shut of a television at the wall from the hours of midnight to early in the morning, if the user has not used that television set for a prescribed number of days during that time creating additional efficiencies; with the same technique with other consumer and/or non-consumer electronics.

In another aspect of the invention the Power IC chip can be used as a "node" in a larger system converting the "rail" power into low voltages at multiple and throughout a location, for uses such as sensors for heat, light, sound, mechanical control, automated control, and digital control, such as in a Smart Home or Office or machine.

In another aspect of the invention, the Power IC is combined with an internal microprocessor.

In one aspect of the present invention, a power device is provided. The power device includes a power circuit assembly, a first plug assembly, and a second plug assembly. The first plug assembly is coupled to the power circuit assembly for transmitting power from a power source to the power circuit assembly at a first voltage. The second plug assembly is coupled to the power circuit assembly for controllably transmitting power from the power source to the power circuit assembly at a second voltage and at a third voltage.

In another aspect of the present invention, a power device is provided. The power device includes a housing, a power circuit assembly, a first plug assembly, and a second plug assembly. The housing includes an outer surface and an inner surface that defines a cavity therein. The power circuit assembly is positioned with the housing cavity. The first plug assembly is pivotably coupled to the housing and is configured to transmit power from a power source to the power circuit assembly at a first voltage. The second plug assembly is pivotably coupled to the housing and is configured to transmit power from the power source to the power circuit assembly at a second voltage and at a third voltage.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a block diagram of a power circuit for use, for example, in a power supply, according to an embodiment of the present invention;

FIG. 3 is an isometric drawing of a first view of a power circuit having a housing, according to an embodiment of the present invention;

FIG. 4 is an isometric drawing of a second view of the housing of FIG. 3;

FIG. 5 is an isometric drawing of an alternative power circuit housing;

FIG. 6 is an isometric drawing of a side view of the housing of FIG. 3;

FIG. 7 is an isometric drawing of a second side view of the housing of FIG. 3;

FIG. 8 is an isometric drawing of an opposite side view of the housing of FIG. 3;

FIG. 9 is an isometric drawing of an opposite side view of the alternative power circuit housing;

FIG. 10 is another isometric drawing of the housing of FIG. 3;

FIG. 11 is a further isometric drawing of the housing of FIG. 3;

FIG. 12 is an isometric drawing of the alternative power circuit housing;

FIG. 40 is a schematic diagram of an energy well cell that may be used in the switched capacitor two-phase circuit shown in FIGS. 34a, 34b, and 39 and shown in a charge phase, according to an embodiment of the present invention;

FIG. 41 is a schematic diagram of an energy well cell that may be used in the switched capacitor two-phase circuit shown in FIGS. 34a, 34b, and 39 and shown in a discharge phase, according to an embodiment of the present invention;

FIGS. 83 is another isometric view of the housing shown in FIG. 69, according to an embodiment of the present invention;

FIGS. 84-87 are isometric views of the housing shown in FIG. 69, according to an embodiment of the present invention.

Corresponding reference characters indicate corresponding parts throughout the drawings.

DETAILED DESCRIPTION OF INVENTION

Figure 2:
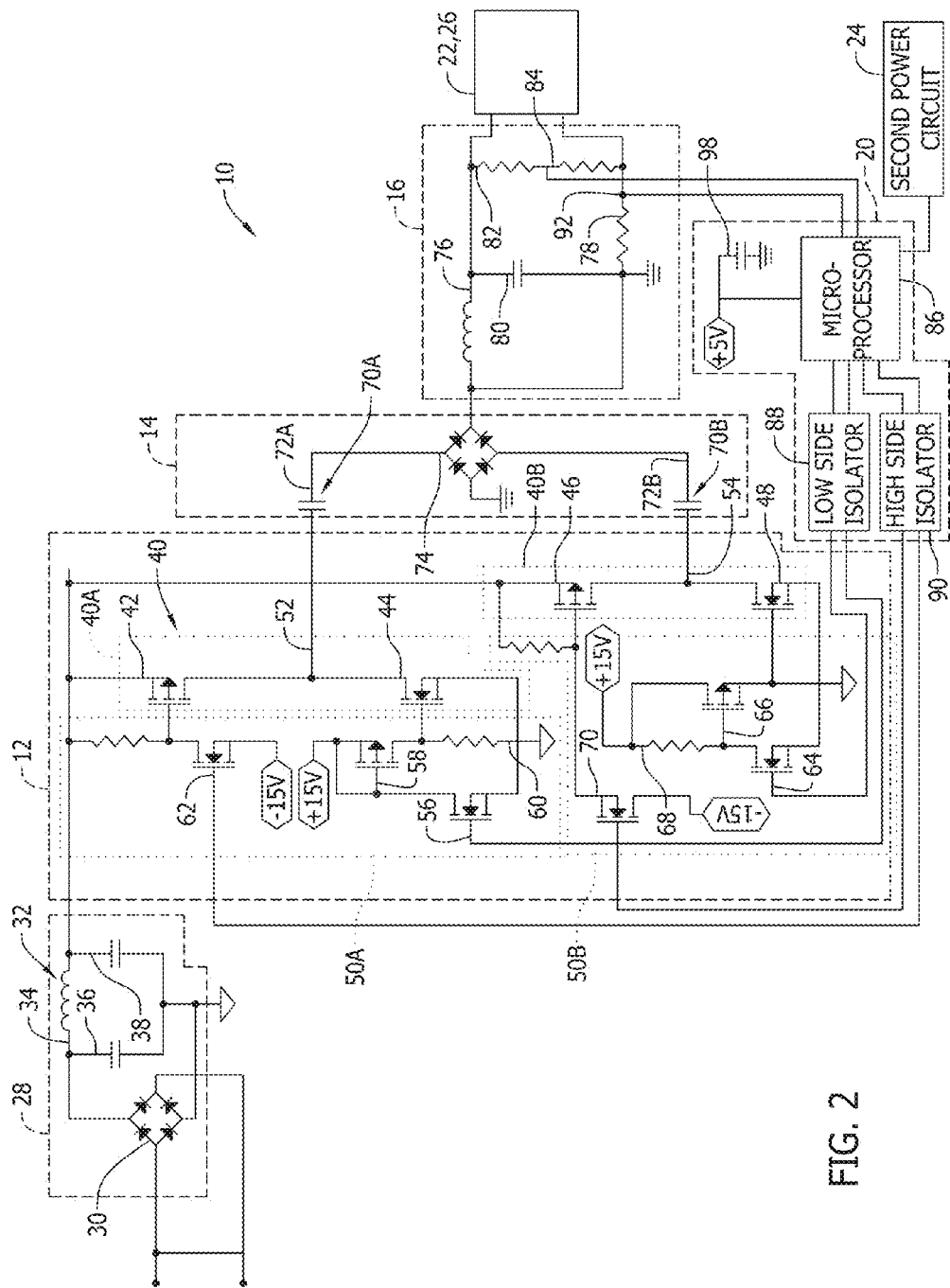
FIG. 2 is a schematic of the power circuit of FIG. 1, according to an embodiment of the present invention.

Referring to the Figures wherein like numerals indicate like or corresponding parts throughout the several views, a power device 2 having a first power circuit 10 is provided. As shown in FIG. 1, the first power circuit 10 includes voltage reduction circuit 11 that includes a switching device 12 and a frequency dependent reactive device 14, and an output section 16 that is connected to the voltage reduction circuit 11.

The first power circuit 10 may be used to convert the power provided by a source of electrical power of a first type to electrical power of a more desirable type. For example, the first power circuit 10 may be used to convert electrical power received from a source of electrical power 18, such as a power grid. The source of electrical power 18 may be provided as an alternating current at a given voltage, e.g., 120 volts at a frequency of 60 Hertz (the North American Standard) or 220-240 volts at a frequency of 50 Hz (the European Standard) to a more desirable voltage. The acceptable input voltage range for the invention is a low of 85 volts to a high of 300 volts at either 50 or 60 Hertz so as to accept a world-wide range of mains power. The output electrical power, at the desired voltage, may be supplied at a direct current, such as 5 volts direct current (VDC) or an AC signal of any desirable waveform.

In one aspect, the first power circuit 10 of the present invention provides a power supply circuit which replaces the transformer of prior art power supplies with the in-line frequency dependent reactive device 14. As discussed more fully below, the frequency dependent reactive device 14, in general, passes an alternating current whose voltage level changes with frequency. In other words the frequency dependent reactive device 14 passes current at varying efficiency which is dependent on frequency. By proper value selection the capacitor can allow a lossless voltage drop. Therefore, the power circuit 10 avoids the inefficiencies of the standard power supply circuit which includes a transformer. The inefficiencies of the prior art transformer based circuits are typically exhibited, at least in part, as excess generated heat.

Returning to FIG. 1, the switching device 12 is coupled to the source of electrical power 18. The switching device 12 is adapted to receive a control signal and to produce an alternating current power signal. The frequency of the alternating current power signal is responsive to the control signal.

As explained more fully below, the control signal is generated by a control element 20 (which may be microprocessor based). In one embodiment, the control signal is a variable frequency. The frequency of the control signal is modified to deliver the desired output power.

The frequency dependent reactive device 14 is electrically coupled to the switching device 12 and receives the alternating current power signal and produces an alternating current output power signal having a reduced voltage level. The frequency dependent reactive device is chosen to achieve a desired voltage of the output power signal relative to the alternating current power delivered by switching device 12.

Returning to FIG. 1, the first power circuit 10 may provide electrical power from the output section 16 through an appropriate power connector or port 22, such as a universal serial bus (USB) port. In the illustrated embodiment, the power device 2 includes a second power circuit 24, which is electrically coupled to the control element 20, and provides output power through a second power connector or port 26. In one embodiment, the second power circuit 24 is similar or identical to the first power circuit 10.

A first embodiment of the first power circuit 10 is shown in FIG. 2. The first power circuit 10 includes an input or rectifying circuit 28. The input circuit 28 is electrically coupled to the source of electrical power 18. The input circuit 28 converts the input electrical power to a DC voltage at a voltage dependent upon the input power. For example, in one embodiment the input power is 120 volts at 60 Hz, and the input circuit 28 converts the input power to approximately 180 volts (DC).

In the illustrated embodiment, the input circuit 28 includes a first full-wave bridge rectifier 30 having first and second input terminals coupled to the high and low sides of the source of electrical power 18. The output terminals of the first full-wave bridge rectifier 30 are coupled to a circuit which includes an inductor 32. The ends of the inductor 32 are electrically coupled to ground through first and second capacitors 36, 38, respectively. The full-wave rectified output of the full-wave bridge rectifier 30 is converted into a DC voltage signal at, e.g., approximately 180 volts by this circuit.

The switching device 12 receives a control signal from the control element 20 and converts the DC voltage output of the input circuit 28 into an alternating current power signal. The frequency of the alternating current power signal is responsive to the control signal.

In one embodiment, the switching device includes a first pair of transistors 40A and a second pair of transistors 40B, both pairs 40A, 40B are arranged in a totem pole arrangement.

In the illustrated embodiment, the first pair of transistors 40A includes a first P-channel MOSFET transistor 42 and a first N-channel MOSFET transistor 44. The second pair of transistors 40B includes a second P-channel MOSFET transistor 46 and a second N-channel MOSFET transistor 48.

Each pair of transistors 40A, 40B is driven by first and second driver circuits 50A, 50B. The driver circuits 50A, 50B are electrically coupled to the control element 20. The driver circuits 50A, 50B receive the control signal and deliver a driver signal to the respective pair of transistors, 40A, 40B.

The first pair of transistors 40A drive the highside 52 of the output of the switching circuit 12 and the second pair of transistors 40B drive the lowside 54 of the output of the switching circuit 12. The output of the first and second pairs of transistors 40A, 40B are 180 degrees out of phase with respect to each other. In other words, when the highside 52 of the output of the switching circuit is high, the lowside 54 of the output of the switching circuit is low. And when the highside 52 of the output switching circuit is low, the lowside 54 of the output of the switching circuit 12 is high.

In the illustrated embodiment, the first driver circuit 50A includes a third N-channel MOSFET transistor 56 coupled to the control element 20, a third P-channel MOSFET transistor 58 coupled to the third N-channel MOSFET transistor 56 and a resistor 60 coupled between the third P-channel MOSFET transistor 58 and ground. The first driver circuit 50A also includes a fourth N-channel MOSFET transistor 62 coupled between the control element 20 and the first P-channel MOSFET transistor 42.

In the illustrated embodiment, the second driver circuit 50B includes a fifth N-channel MOSFET transistor 64 coupled to the control element 20, a fourth P-channel MOSFET transistor 66 coupled to the fifth N-channel MOSFET transistor 64 and a resistor 68 coupled between the fourth P-channel MOSFET transistor 66 and a positive rail voltage, e.g., +15 volts. The second driver circuit 50B also includes a sixth N-channel MOSFET transistor 68 coupled between the control element 20 and the second P-channel MOSFET transistor 46.

In the illustrated embodiment, each pair of transistors 40A, 40B consist of a P-channel MOSFET 42, 46 in a highside configuration over a N-channel MOSFET 44, 48 in a totem pole configuration. In this embodiment, the square wave outputs of the driver circuits 50A, 50B are in phase, but offset as to the DC level.

In an alternative embodiment, the first and second driver circuits 50A, 50B (and isolators 88, 90) may be replaced by integrated circuit (IC) drivers. Additionally, each pair of transistors 40A, 40B may be replaced by a pair of N-channel transistors in a totem pole configuration. In this arrangement, the square wave outputs of the IC drivers are 180 degrees out of phase.

The frequency dependent reactive device 14 includes at least one pair of reactive element like 70A, 70B in the illustrated embodiment. Since both the highside 52 and the lowside 54 are driven, the frequency dependent reactive device 14 includes first and second reactive elements 70A, 70B. In the illustrated embodiment, the first and second reactive elements 70A, 70B are capacitors 72A, 72B. The capacitors 72A, 72B may be nano-capacitors, and may be based upon ferroelectric and core-shell materials as well as those based on nanowires, nanopillars, nanotubes, and nanoporous materials.

In practice, the frequency of the control signal from the control element 20 controls the frequency of the alternating current power signal. For example, generally the switching circuit 14 creates an alternating current having a peak voltage based on the output voltage of the input circuit 28 and having a frequency based on the control signal. Since the value of the capacitors 72A, 72B are chosen based on the frequency of the alternating current power signal, the amount of power utilized from the source of electrical power 18, and thus, the efficiency of the power circuit 10, 24 can be controlled.

In one embodiment, the output power signal is a DC voltage at a target voltage, e.g., 5 volts. As shown in FIG. 2, the frequency dependent reactive device 14 may also include a second full-wave rectifier 74 to transform the alternating current signal from the capacitors 72A, 72B into a DC voltage.

The output subsection 16 of the power circuit 10 includes filters, and conditions the output of the switching circuit 14. The output section 16 includes an inductor 76 and a capacitor 80.

The output section 16 also includes a voltage divider, comprised of resistors 82, 84. The output of the voltage divider is fed to the control element 20 (see below).

In the illustrated embodiment, the control element 20 includes a microprocessor 86 and a lowside isolator 88 and a highside isolator 90.

The two highside isolator outputs are 180 degrees out of phase with each other. The two lowside isolator outputs are also 180 degrees out of phase with each other. The isolators 88, 90 disassociate the devices being charged from the source of electrical power 18. The purpose of this isolation is to eliminate shock hazards to the user.

Using the voltage divider circuit 82, 84, the control element 20, i.e., the microprocessor 86 can sense the actual voltage delivered (which can vary based on, e.g., manufacturing tolerances in the circuit components). The voltage output of the voltage divider circuit 82, 84 is input to an A/D input of the microprocessor 86. The control element 20 can also sense the current being delivered through sense resistor 78. Based on the sensed voltage and current delivered, the control element 20 can modify the frequency of the control signal to fine tune and more accurately control the output of the power circuit 10.

In one aspect of the present invention, the microprocessor 86 or control element 20 monitors the output power signal (through the voltage divider circuit 82, 84) and adjusts the control signals to the switching device 12 and the frequency dependent reactive device 14 to keep the power output within specification. The control element 20 includes the microprocessor 86 and an associated control program. The output of the voltage divider circuit 82, 84 is used to calculate/modify the frequency of the output signal(s), i.e., the frequency is increased if more voltage is required and lower if less voltage is required.

The control program may compensate for different output load conditions, component tolerances, component parameter variations at different operating points, and component changes due to temperature. The control program also monitors several operating parameters to turn the switching device off, which removes power from the output, if a condition that is unsafe or out of the operating range is detected.

In general, the control loop monitors the output power signal and adjusts the frequency of the switching device to make the output power signal stay within its operating limits. The control loop uses the nominal characteristics of the frequency dependent reactive element 14 for control decisions. For example, if the output power signal is below the operating limit, the frequency is changed to deliver more power to the output. The control loop performs other tasks like: a slow startup sequence to keep from overpowering an attached load, and fault monitoring and handling.

In one aspect of the present invention, the impedance of capacitors 72A, 72B can be represented as ideal capacitors defined as:

$$Z = \frac{1}{2\pi f C},$$

Where f represents the frequency of the control signal in Hertz and C is the value of the capacitor in Farads. Since the value of the impedance is inversely proportional to the frequency used, a capacitor value is selected that will produce the lowest required impedance at the highest desirable signal frequency. In the present invention, the lowest possible impedance is desired with the lowest possible input voltage ($V_i$), highest current load ($I_{max}$), and maximum acceptable switching frequency ($f_{max}$).

The purpose of the capacitors 72A, 72B are to supply the secondary with an attenuated voltage source with which the secondary side will further regulate to the desired output. The signal applied to the capacitor, Vi, minus the desired voltage on the secondary side $V_s$ is equal to the voltage attenuation of the capacitors 72A, 72B. The current through each capacitor 72A, 72B is equal to the current demanded by the load on the secondary. The desired Z of the capacitor is found using the following equation:

$$Z = \frac{(V_i - V_s)}{I_{max}}.$$

The proper value of the capacitor can be calculated using the ideal capacitor equation using Z and $f_{max}$.

The capacitor value gives the total attenuation capacitance needed. If full isolation is required, then two capacitors are used to isolate both sides of the AC signal. These two capacitors will be in a series connection, and capacitors in series add in this relationship:

$$C = \left(\frac{1}{C_a} + \frac{1}{C_b} \cdots \frac{1}{C_n}\right)^{-1}$$

For balancing of the circuit the two constituent capacitors $C_c$ are of equal value. Therefore, $$C = \left(\frac{1}{C_c} + \frac{1}{C_c}\right)^{-1} = \frac{C_c}{2}, \text{ and}$$

$$C_c = 2 * C.$$

The value of $C_c$ is the value of the actual components placed in the circuit.

With reference to FIGS. 3-16, in one embodiment of the present invention, the power device 2 is contained within a housing 100. In the illustrated embodiment, the housing 100 is comprised of a pair of half shells (first and second half-shells 100A, 100B) which form a cavity in which the power device 2 is located. The pair of half shells 100A, 100B may be held together by clips, an adhesive, or fasteners, any suitable fastening means, and the like, or combinations thereof. In the illustrated embodiment, the power device 2 includes two power circuits 10, 24 which provide power to the first and second ports 22, 26 which are shown as USB ports which are located on the first and second half-shells 100A, 100B, respectively. It should be noted that while in the illustrated embodiment, two USB ports are shown, it should be recognized that either more or less ports may be provided, and may be either based on a USB standard or other standards and connectors, like that used in notebooks and laptops.

The housing 100 has a first end 102A and a second end 102B. Each end 102A, 102B may controllably form an electrical plug 104A, 104B. The electrical plugs 104A, 104B may conform to different international standards. For example, in FIG. 10, the first electrical plug 104A is a North American standard plug formed by the first end 102A and a first pair of prongs 106A and the second electrical plug 104B is a European standard plug formed by the second end 102B and a second pair of prongs 106B. With respect to FIG. 12, either plug may be configured to meet any other standard such as the Australian standard (formed by the alternative end 104B' and the alternative prongs 106C).

In practice, the device 2 has three modes: a storage mode, a first mode, and a second mode. In the storage mode, both sets of prongs 106A, 106B, 106C are contained within the housing 100 (as shown in FIG. 3-9).

In the first mode, the prongs 106A comprising the first electrical plug 104A are extended through a first set of apertures 108A in the first end 102A (see FIG. 10)

In the second mode, the prongs 106B, 106C comprising the second electrical plug 104B, 104B' are extended though a second set of apertures 108B, 108B' in the second end 102B, 102B' (see FIGS. 11 and 12).

With respect to FIGS. 3-9, 13, and 15, the power device 2 includes actuation device 110. The actuation device 110 includes a button 112, a prong receiving apparatus 114, and a dust cover 116. The prong receiving apparatus 114 includes first and second slots which receive first and second double ended prong structures 118, 120. Each double ended prong structure 118, 120 forms one of the pairs of each set of prongs, as shown. The prong structures 118, 120 are electrically coupled to the first and second power circuits 10, 24.

The button 112 is affixed or formed on an opposite side of the dust cover 116. The button 112 extends through, and is movable along, a slot 122 formed in the housing 100. Actuation of the button 112 in either direction along the slot 122 extends one of the pairs of prongs 106A, 106B, 106C through the respective apertures 108A, 108B, 108B'.

Figure 13:
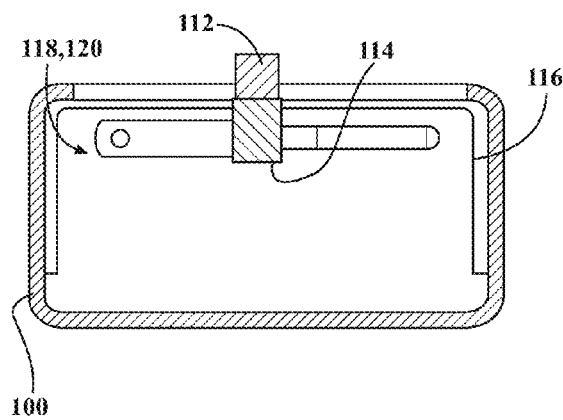
FIG. 13 is a cutaway drawing of the power circuit housing of FIG. 3; and, FIG. 14 is a schematic of a LED circuit, according to an embodiment of the present invention.

As shown in FIG. 13, the dust cover 114 wraps around the inner surface of the housing 100. The lower portions 124 of the dust cover 114 covers or blocks the apertures to prevent or minimize entry of dust and other contaminants into the housing 100. As the button 112 is manipulated towards one end of the slot 122, the respective prongs 106A, 106B, 106C are moved towards and extend through the apertures 108A, 108B, 108C. At the same time, the dust cover 110 is also moved. A respective upper portion 126 of the dust cover 110 is moved towards the respective apertures 108A, 108B, 108C such that a respective set of apertures 128, 130 in the dust cover are generally aligned with the apertures, thereby allowing the prongs 106A, 106C, 106C to pass therethrough.

Figure 14:
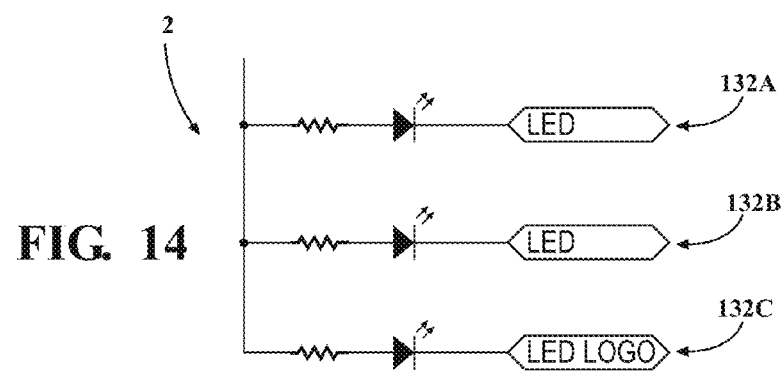
Figure 15:
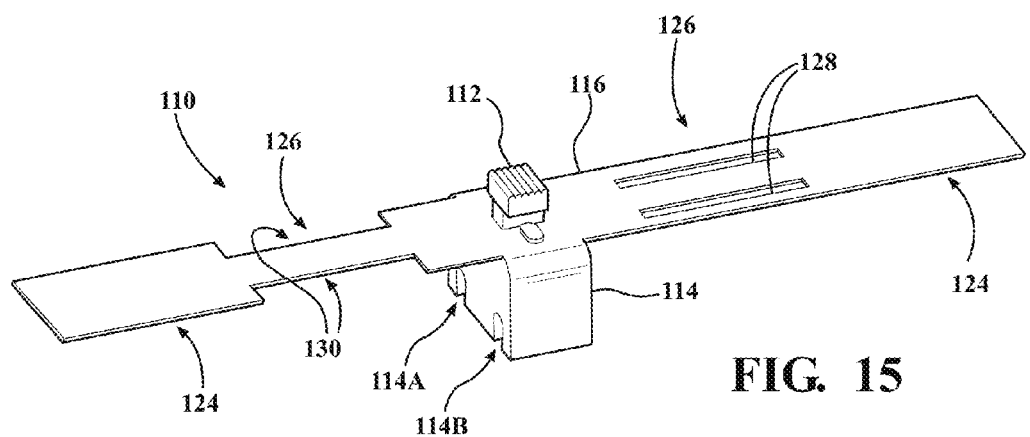
FIG. 15 is a drawing of a dust shield associated with the housing of FIG. 3, according to an embodiment of the present invention.
Figure 16:
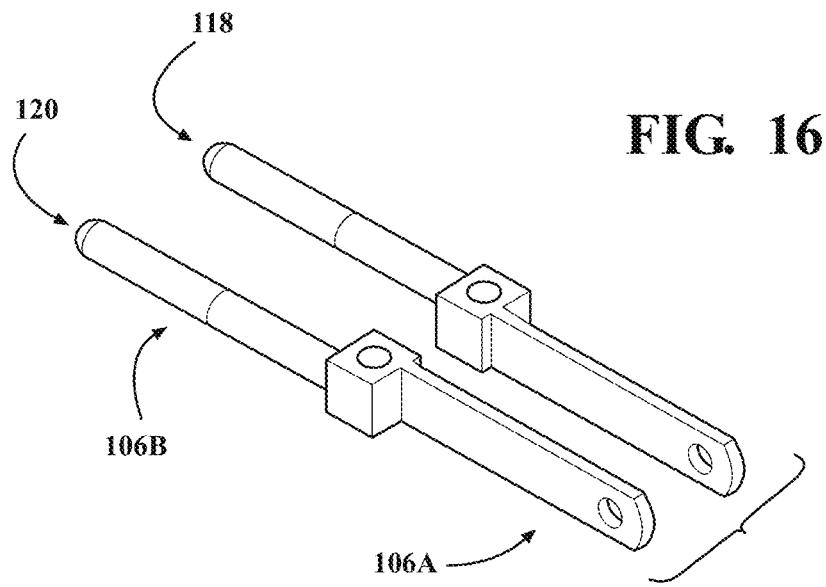
FIG. 16 is an illustration of a prong element for use with the dust shield of FIG. 15.

With reference to FIG. 14, in one embodiment the power circuits 10, 24 includes three separate LED circuits 132A, 132B, 132C (each comprising a resistor in series with a LED, as shown). The first and second LED circuits 132A, 132B are used to illuminate the first and second USB ports 22, 26, respectively. The third LED circuit 132C is located behind a logo 134 located on each side of the housing 100.

Lighting of the logos 134 using the third LED circuit 132C, in one embodiment, is used to power is being applied to the device being power or charged through one of the ports. Lighting of the ports may be used to confirm that the attached device (not shown) is being charged. A pulsing scheme may be implemented in order to communicate the current relevant state of charge. For example, the LED (for the respective USB port) may be rapidly pulsed when the device being charged is in a low state of charge with the pulse rate diminishing as the device approaches full charge.

Figure 17:
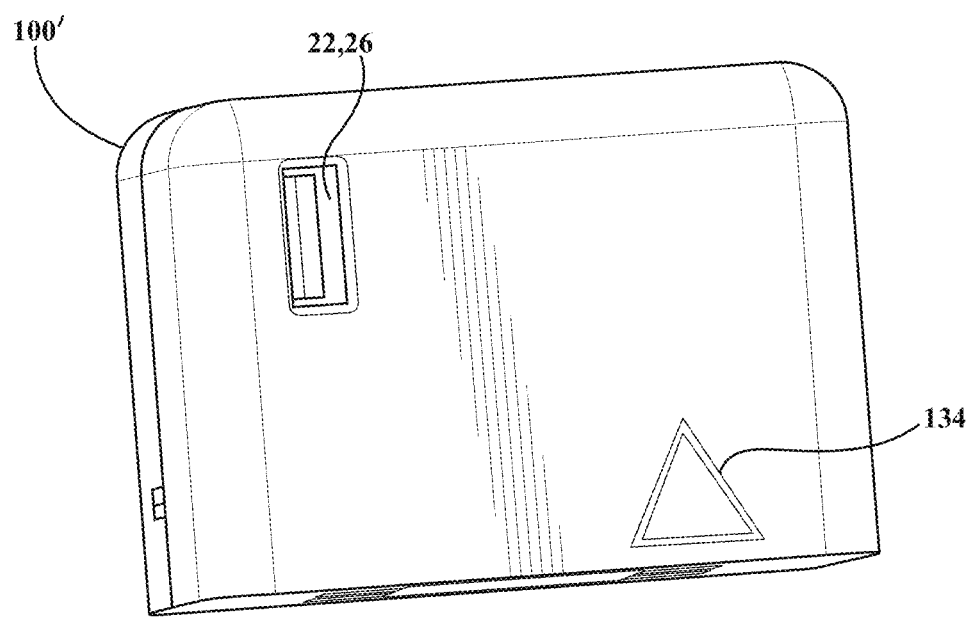
FIG. 17 is a first view of an alternative housing for use with the power circuit, according to an embodiment of the present invention; and, FIG. 18 is a second view of the alternative housing of FIG. 17.
Figure 18:
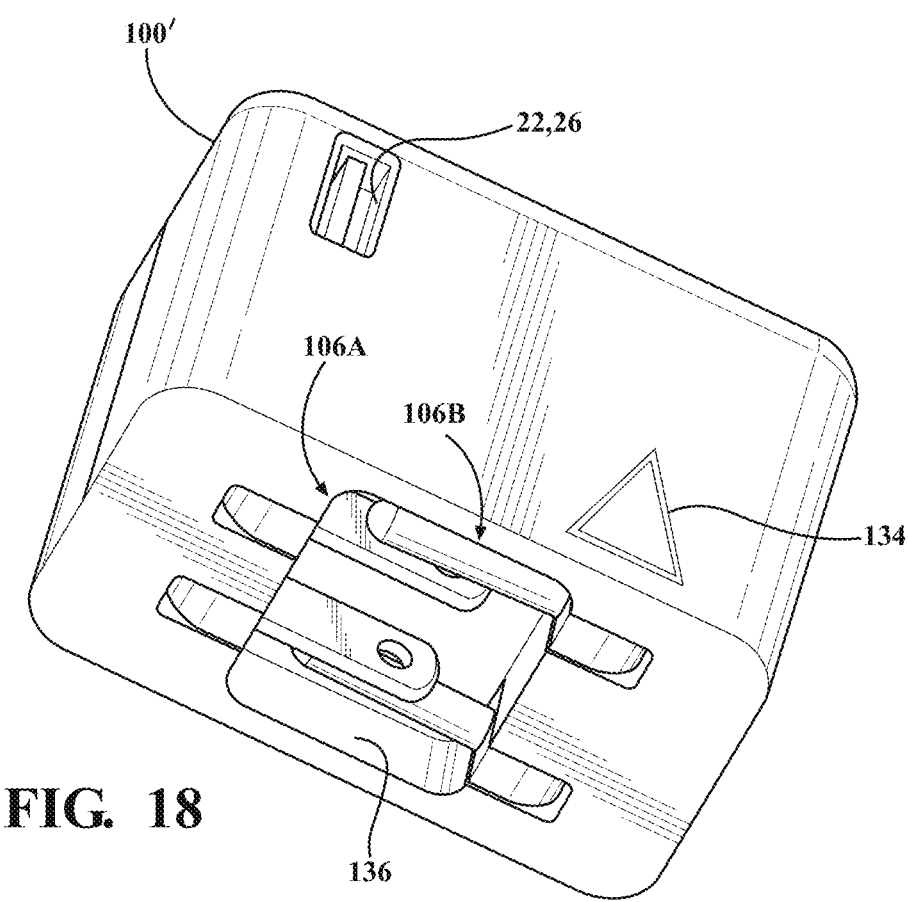

With reference to FIGS. 17 and 18, an alternative embodiment of the housing 100' is shown. The alternative housing 100' includes first and second USB ports 22, 26 (located on opposite sides thereof) and a logo 134. Separate pairs of prongs 106A, 106B are rotatably coupled to the housing 100' and electrically coupled to the power device 2.

Figure 20:
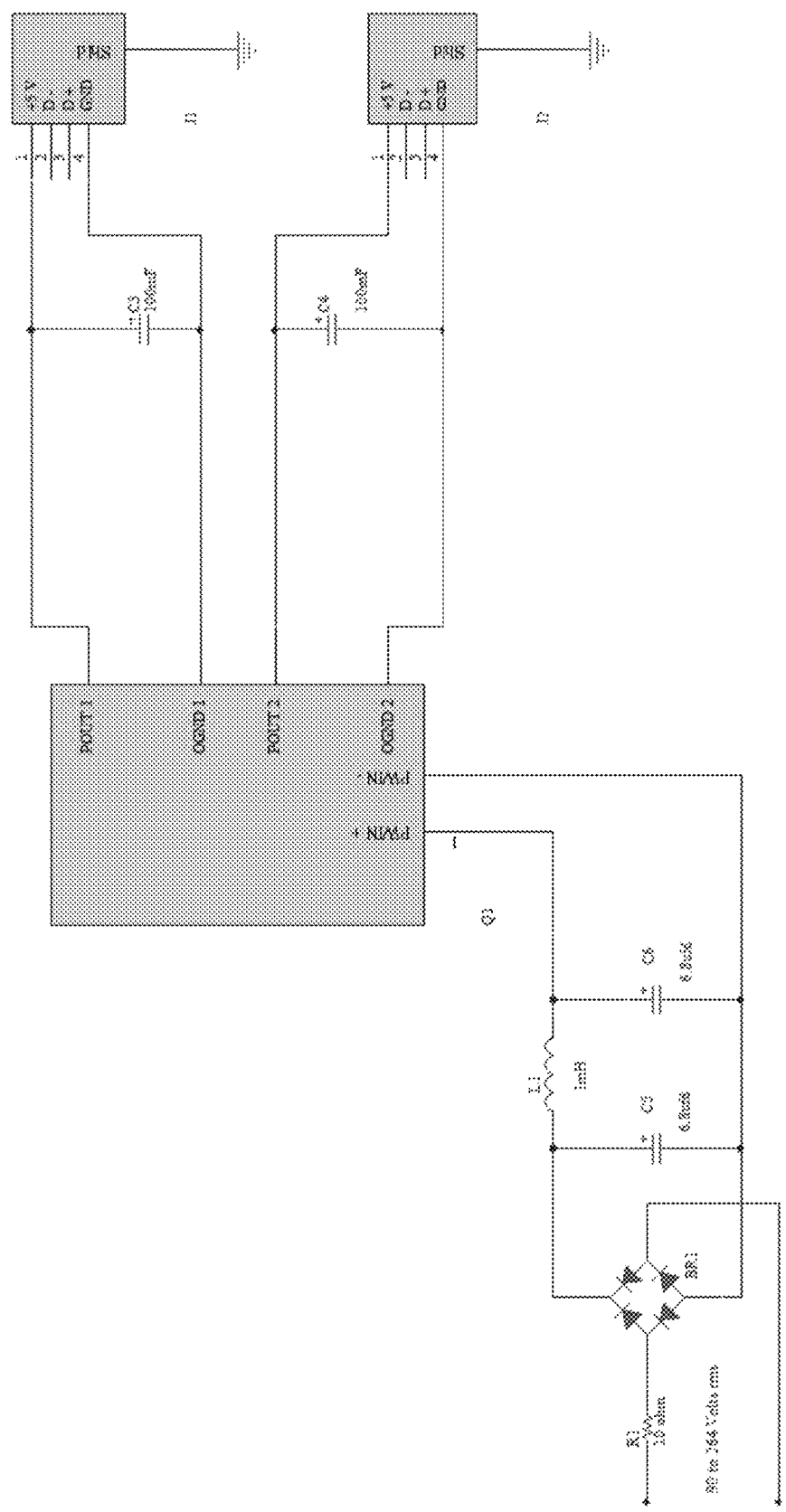
FIG. 20 is a circuit diagram with a Power IC PSSoC used to create the external and internal power outputs.
Figure 21:
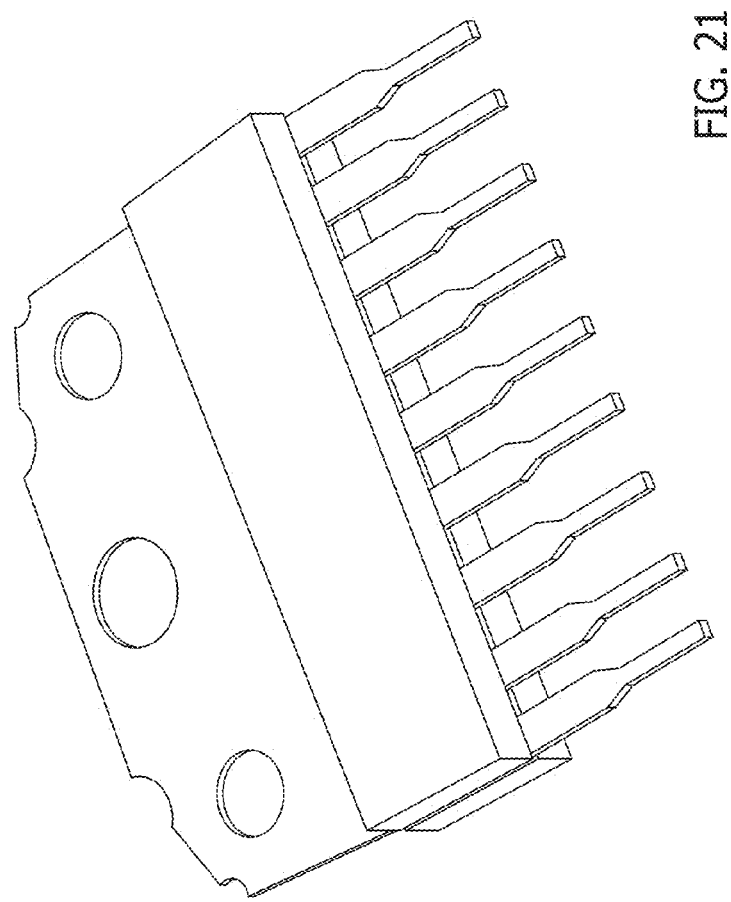
FIG. 21 is a circuit diagram with a Power IC PSSiP with the microprocessor packaged within the hybrid chip.

An alternative approach is to "shrink" the capacitor based power supply into an integrated semiconductor (Power IC) as either the PSSoC or PSSiP as described herein. One method, which is called herein an Alternative Voltage Energy well Subdivision Ladder 140 ("Fish Ladder") process, can be integrated into a semiconductor chip that exists on a circuit. (FIG. 20). The PSSoC possesses the microcontroller, capacitors and MOSFETS can exist internally in the monolithic Power IC chip, or externally in the package. (FIG. 21). Alternatively, the microprocessor can be used in conjunction with the Power IC in the same package (PSSiP).

Figure 22:
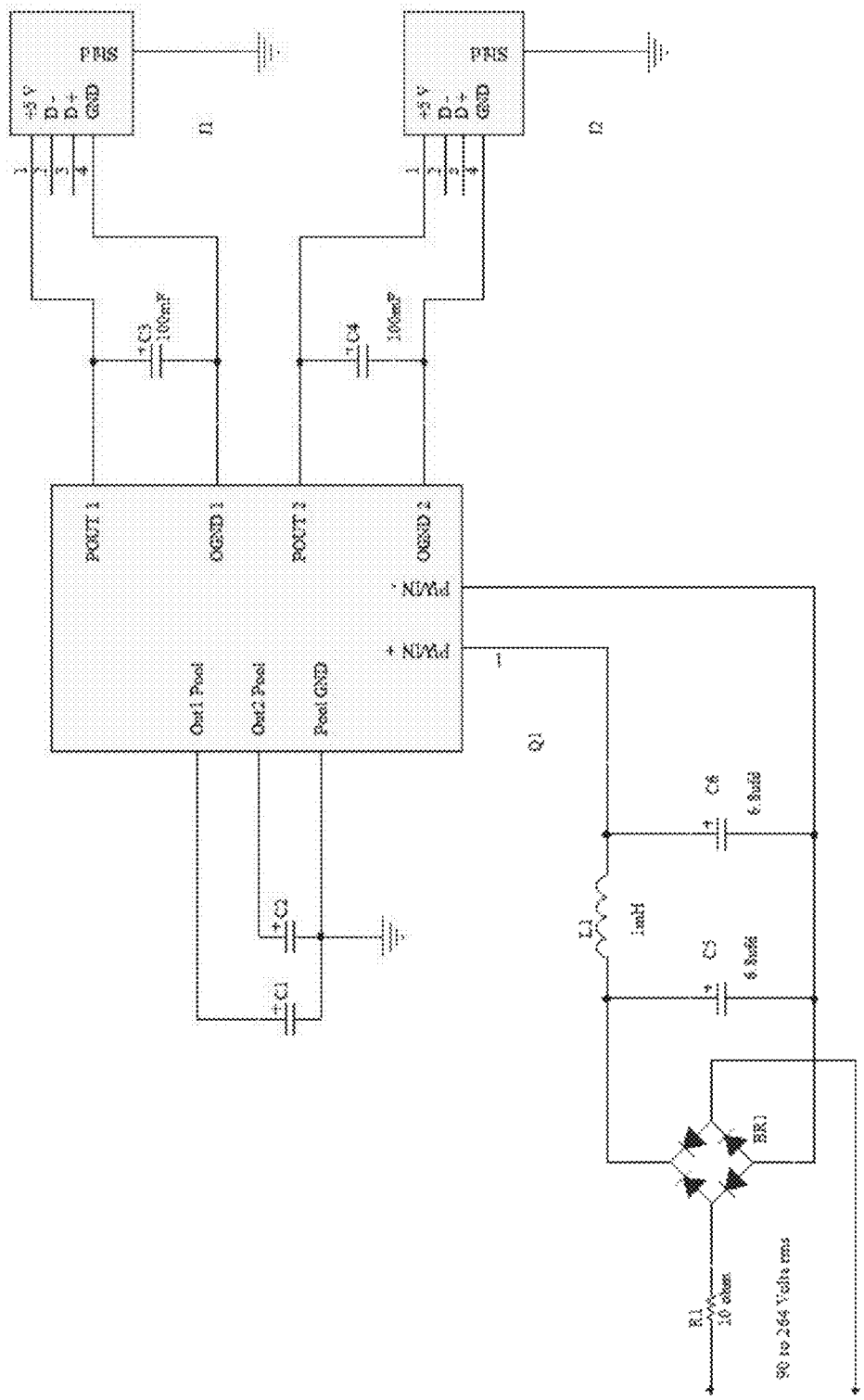
FIG. 22 depicts that one or more of the capacitors may be external.

In addition, one or more of the capacitors may be external. (FIG. 22).

Figure 23:
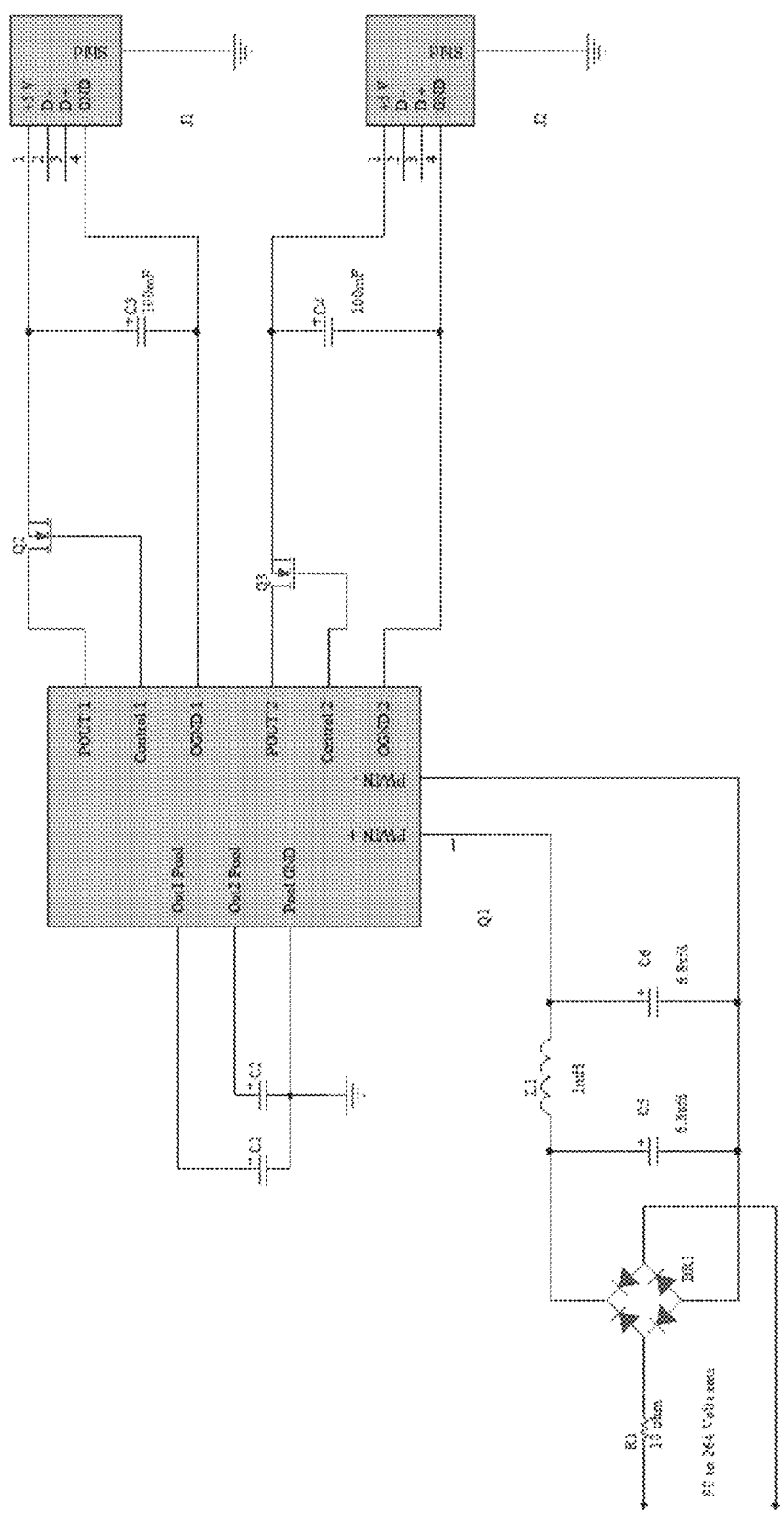
FIG. 23 depicts one or more of the capacitors and one or more of the MOSFETs may be external.

Alternatively, one or more of the capacitors may be external. (FIG. 23).

Alternatively, one or more of the capacitors and one or more of the MOSFETs may be external. (FIG. 23).

Figure 24:
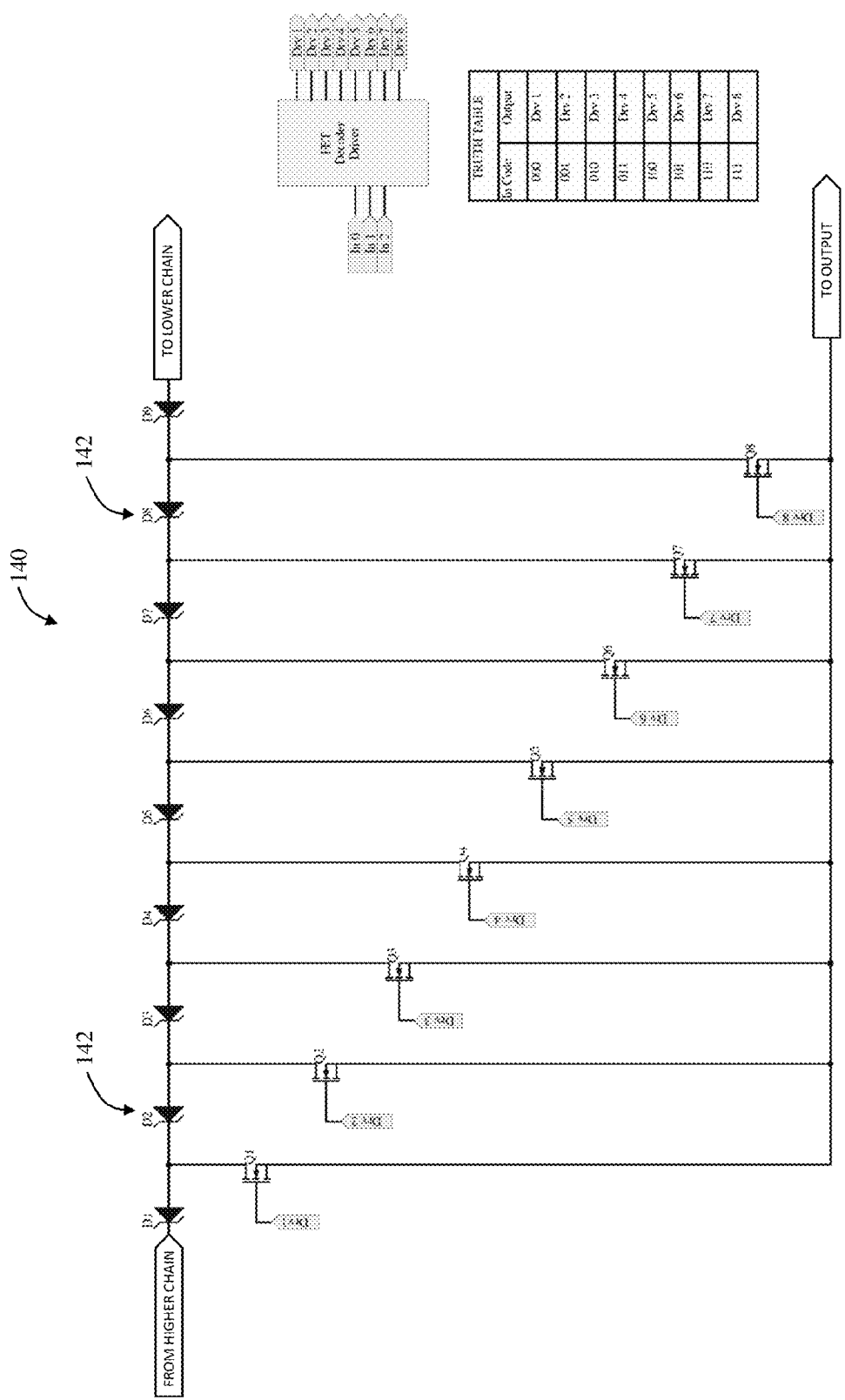
FIG. 24 depicts the zener based Energy well Fish Ladder.

In this Energy well Fish Ladder approach the VAC is first rectified and filtered. (FIG. 20). The current then enters the semiconductor chip as VDC and is subdivided into segregated Energy well cells 142 (i.e. capacitors and/or batteries or other energy storage devices), through the use of a "ladder" subdivision tree, of equal or unequal Energy well cells 142, which are set in ranges of different voltages in any voltage division, from very small to large (i.e. 0.10V, 1V, 5V, and etc.). The higher voltage wells are on the inrush side of the chip and then step down to the lower voltage wells on the output side of the chip. This permits the higher voltage from the rail to enter on the incoming portion of the semiconductor chip and the lower voltage output from the chip as shown in the capacitor Energy well Ladder 140 (FIG. 24). Internally in the chip there would be a multiplicity of the Energy well Ladders 140, as a draw from one part of the ladder would affect the lower energy well cells 142, thus, making parasitic problems if multiple Energy well Ladders were not used. This Energy well Fish Ladder tree can consist of a stack of zener diodes, (FIG. 24), a stack of forward biased diodes (FIG. 25), or resistors a stack of capacitors (FIG. 26). Resistors may not be as efficient because of potential power losses. However, in the case of either zeners or diodes you have the advantage of fixed and repeatable voltage drop. This allows for the voltage drop to be equally distributed through the use of enough diodes and capacitors/batteries to completely drop of the 180 VDC in the case of use 110 VAC.

The Energy Well could provide the full conversion from 110 VAC/24-VAC or could be augmented with a "Second Stage" conversion, i.e. ending the Energy Well conversion at 25V and the make the further reductions, as necessary down to the desired voltage/current with a highly efficient Buck Converter.

Figure 27:
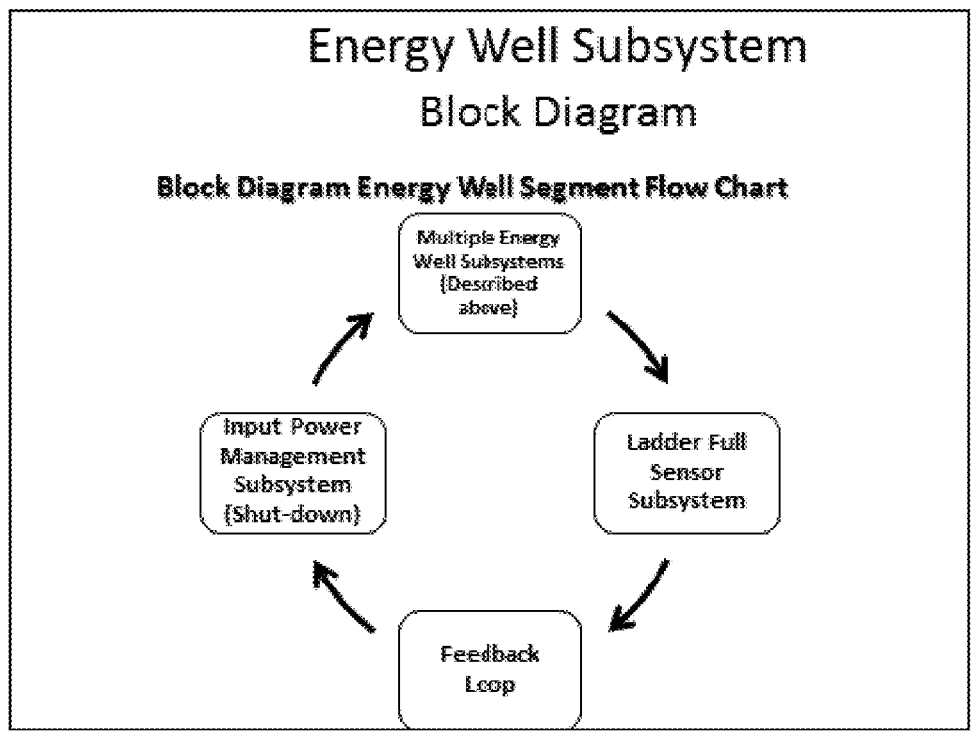
FIG. 27 depicts the Power IC Block Diagram.

This chip method uses multi-stages as is shown on the block diagram, (FIG. 27), which are (i) Input Power Management Subsystem (which also controls the shutdown of inrush power), (ii) Multiple Energy well Filling Subsystem (where the energy is held pending outrush scheme), and (iii) Ladder Full Subsystem (where the varying voltages of power is held on the "tree" until released) and (iv) Feedback Loop (where the inrush current is either opened for each ladder or closed).

Once this division has been accomplished the energy at each node must be stored, at least temporarily in the Energy wells, before further conversion can be accomplished.

Figure 28:
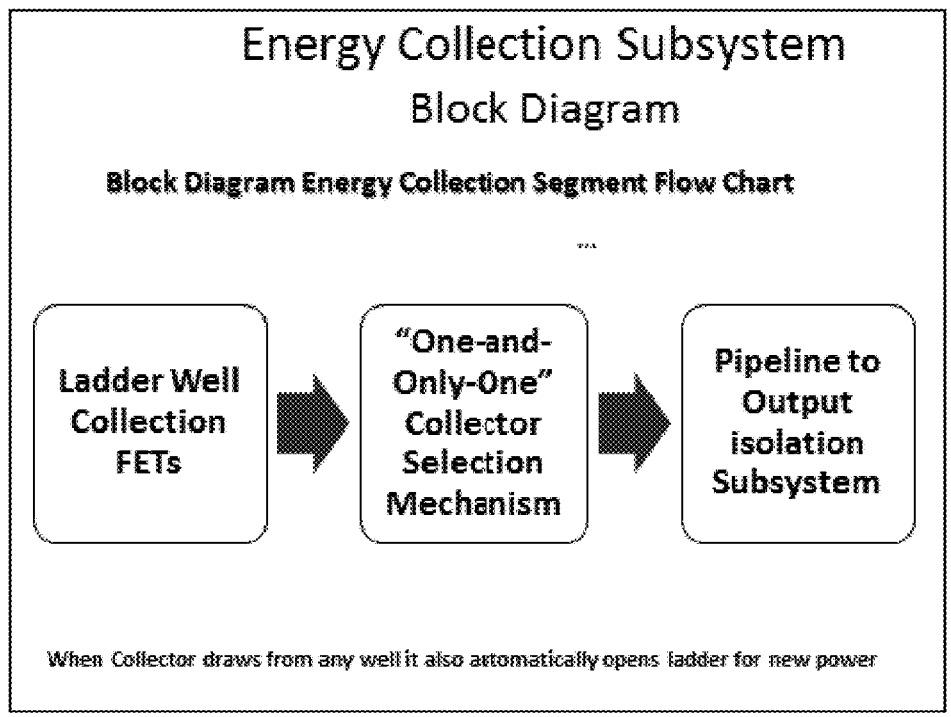
FIG. 28 is a block diagram of the Energy Collection Subsystem.

As shown in FIG. 28, the Subsystems work with the Energy Collection Subsystem where the Ladder Wells collect rail electricity via the collection FET's. Then the "one and only one" collector mechanism is activated (FIG. 28) which collects the energy from the precise Energy well or combination of Energy wells needed for the specific output(s). Thereafter, the energy is piped through the FET gateways to the capacitor based Isolation Subsystem (FIG. 28).

In addition, there must be an "Addressing Scheme" in order to connect the Energy well Ladder tree to energy wells and then the energy from the wells to an output an addressing scheme of some sort is required. This is intimately connected to the method of voltage conversion. Therefore, various conversion schemes and their addressing schemes are described below.

Figure 29:
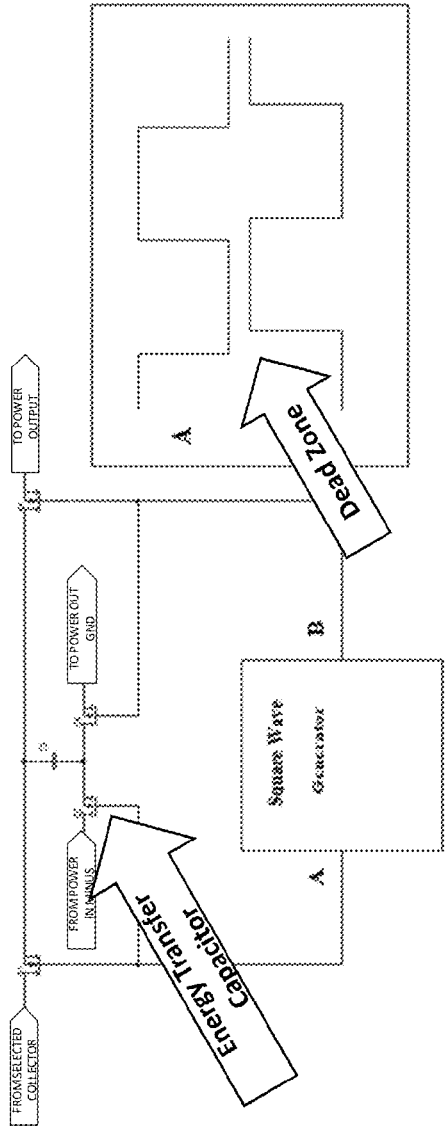
FIG. 29 is a schematic diagram of the Internal Isolation Subsystem.
Figure 31A:
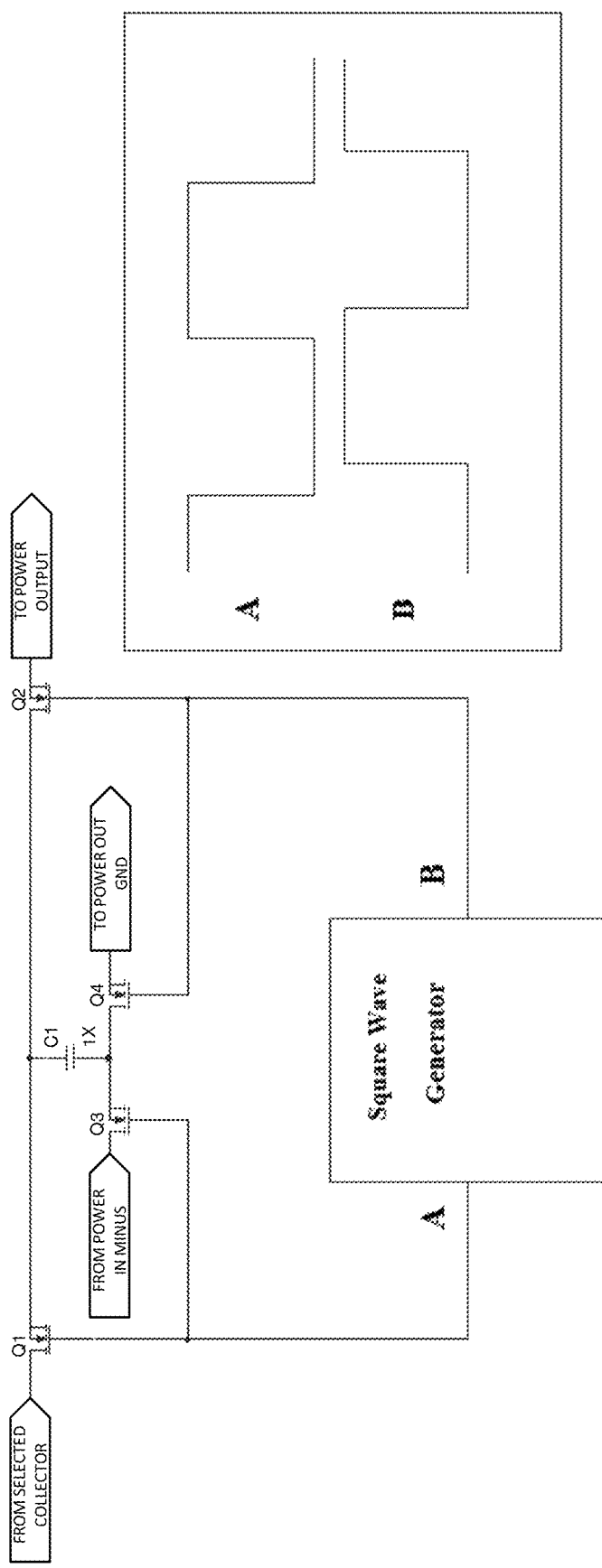
FIG. 31a is a schematic diagram of an energy well cell including the Dial-a-Voltage Scheme.

In addition there should be an Output Isolation Subsystem, which is shown in FIGS. 29 and 31*a*. The FIG. 29 circuitry is explained as follows, first, an embedded capacitor is utilized for energy transfer and power isolation. The Quad FET's as shown then switch the capacitor from the collector output to the chip output. The capacitor is optimized as outlined above, for the most efficient energy transfer, resulting in the chip output isolation scheme current capability is a function of the capacitor's switch rate.

The entire system is then accountable to a "Fail Safe" semiconductor subsystem which operates in tandem but separately from the Energy well Subsystem. This Fail-Safe subsystem operates at a very high clock speed as an "override" mechanism to shut down input power on separate clock in case of overheating problems, isolation problems, or other internal integrity problems. The current limiting is not a "resistor" but is true shut off/shut-down of the inrush to the energy well ladders 140. This prevents the Ladders from destruction when full or overheating or other problem. The Fail Safe subsystem also permits the energy well cells 142 to be filled up, with energy "trapped" within ladder, and mechanism to shut-off from input source, creating an internal "boot strap" proposition.

Figure 30:
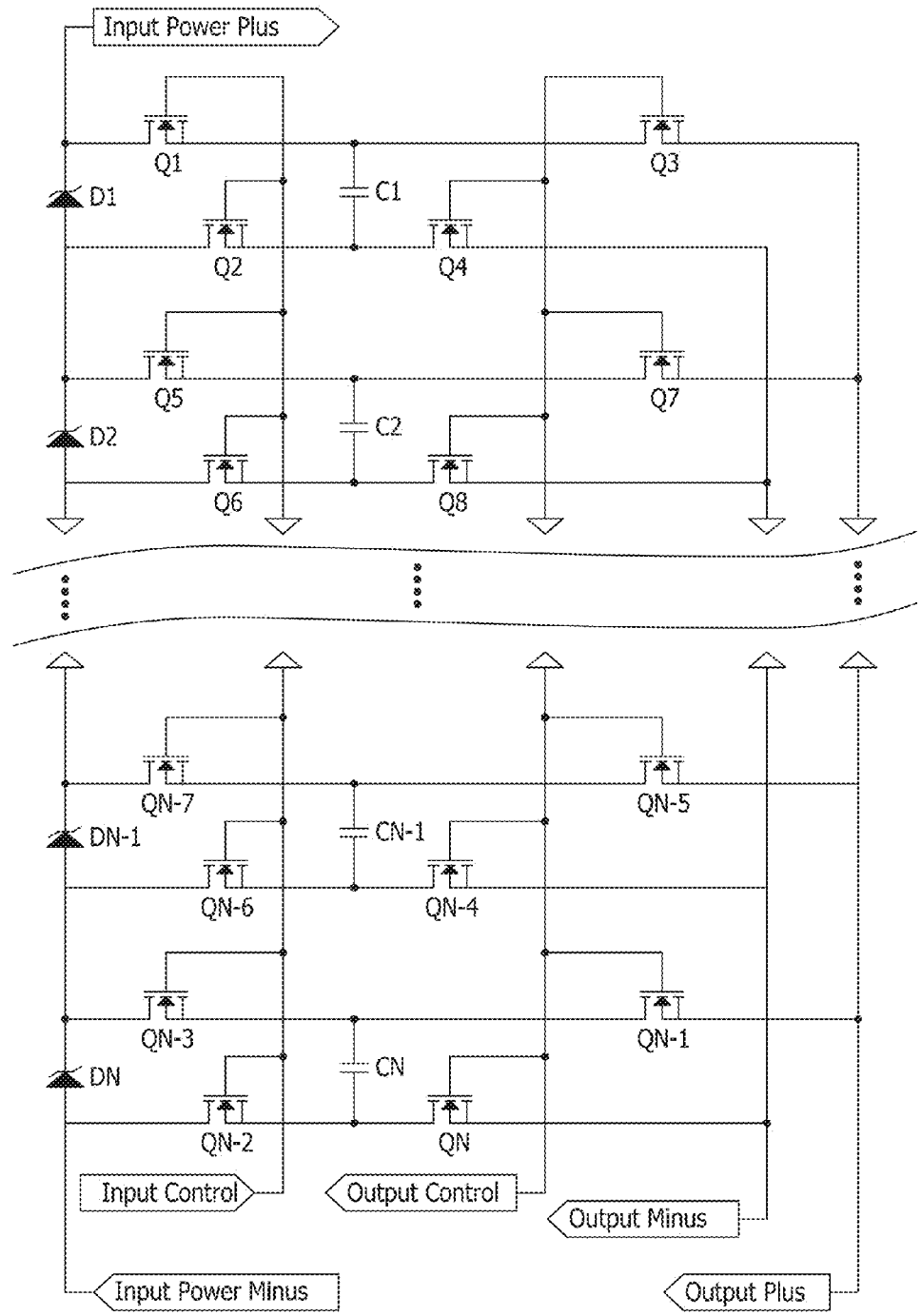
FIG. 30 is a schematic diagram of the Bulk Transfer Scheme.

In current invention incorporates several methods of creating the energy output from the Power IC. The first is a "Bulk Conversion Scheme" (FIG. 30). (The following numbered references are from FIG. 30). The Bulk Conversion Scheme is a concept which uses FETs (Q1 thru QN) to alternately connect an array of capacitors (C1 Thru CN) in series to extract power from the input tree (D1 thru DN) and then in parallel to transport the energy to the output.

By examining the first energy well cell 142 one can extrapolate to all of the others. In the input state Q1 and Q2 are turned on and Q3 and Q4 are turned off. This connects capacitor C1 across the diode D1. Whatever voltage that is dropped across the diode by the input tree is therefore applied to the capacitor C1 charging it up. To make the transition to the output state, first FETs Q1 and Q2 are turned off. This isolates the capacitor C1 from its position on the input tree. Then after a suitable interval, known as dead time, FETs Q3 and Q4 are turned on to attach the charged capacitor C1 to the output. Dead time is required to assure that under no circumstances is the input connected to the output; therefore, isolation is rigidly maintained. This connection allows capacitor C1 to discharge its energy load to the output circuitry (detailed later) After a suitable period of time, defined as the time required for capacitor C1 to discharge, FETs Q3 and Q4 are turned off disconnecting C1 from the output circuitry. Another dead time period is observed for the same reason of guaranteed isolation. The process is then repeated. All of the low side output FETs (Q4, Q8, QN, QN−4, etc.) are connected together to create a consolidated output minus signal. All of the high side output FETs (Q3, Q7, Q−1, QN−5, etc.) are also connected together creating a consolidated output plus signal. When in the output state all of the capacitors (C1 thru CN) are connected together in parallel. All of the other cells are identical to the one just described. If, for example, 180 VDC were impressed across the input tree and the diodes were 6 volt zeners, then 30 cells (6×30=180) would be required to drop the 180 VDC.

All of the input FETs (Q1, Q2, Q5, Q6, QN-2, QN-3, etc.) have their respective gates connected together. All of the output FETs (Q3, Q4, Q7, Q8, QN, QN-1, etc.) also have their respective gates connected together. This allows for a single input control and a single output control to exist. In the case of the above example when the circuit is in the input state all thirty capacitors would be charged at once. Each capacitor is charged to the same 6 volt level because all of the diodes (D1 thru DN) produce an identical 6 volt drop. When the circuit is in the output state all of the capacitors (C1 thru CN) are connected in parallel thus pooling their energy together. In the example above this will provide 6 volts output with a current capacity of thirty (30) times the current received by each capacitor from its respective input.

This process is analogous to the way that a transformer operates, and can trade a high voltage at relative low current applied to its primary and deliver a low voltage at a relatively high current at its output. The amount of power (volts times amps) delivered to the load is the same amount as delivered to the primary minus the associated losses dissipated as heat. The same physics principle applies to the circuit described above. The primary difference is that the entire circuit can live on one integrated circuit die thereby being vastly smaller than a transformer with similar power capability. Another significant difference is the substantially improved energy efficiency through the use of low loss FETs.

In another aspect of the invention there exists what is called in the invention a "Stair Step Conversion Scheme (SSCS)." This Scheme is a variation of the Bulk Conversion method. In some cases, the noise produced by the bulk switching of all of the capacitors at the same is unacceptable. In this case the alternative is to transfer the energy of one Energy well cell 142 (capacitor) at a time. This is accomplished by utilizing the decoding method in the Dial-A-Volt scheme described below. The tradeoff is that the bulk transfer method is faster but the noise (caused by current surges) is much higher. The SSCS method has a slower cycle time but generates less noise as each individual capacitor is delivering its energy to the output at a different point in time therefore individual current surges are much lower.

Figure 25:
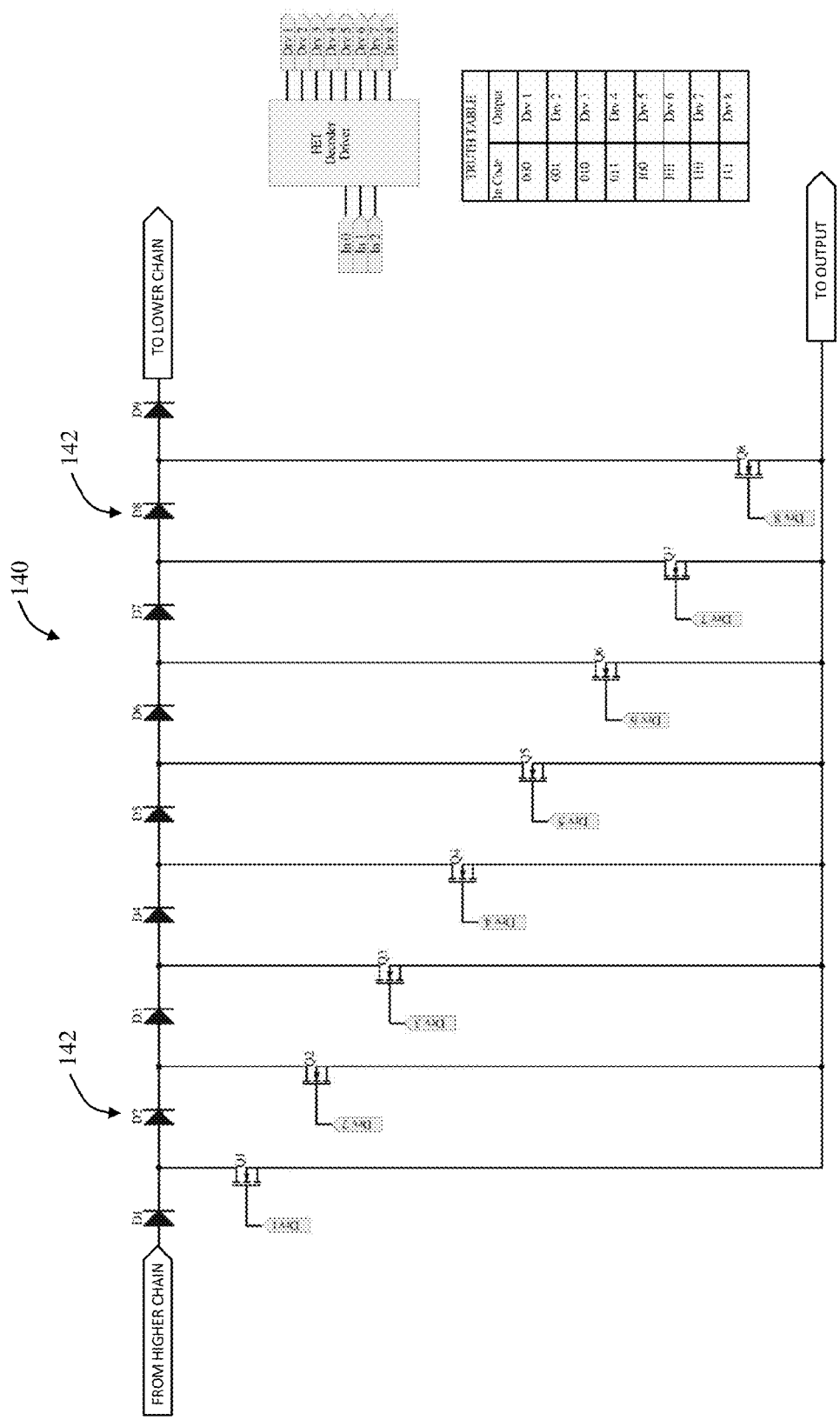
FIG. 25 depicts the forward biased diodes based Energy well Fish Ladder.
Figure 26:
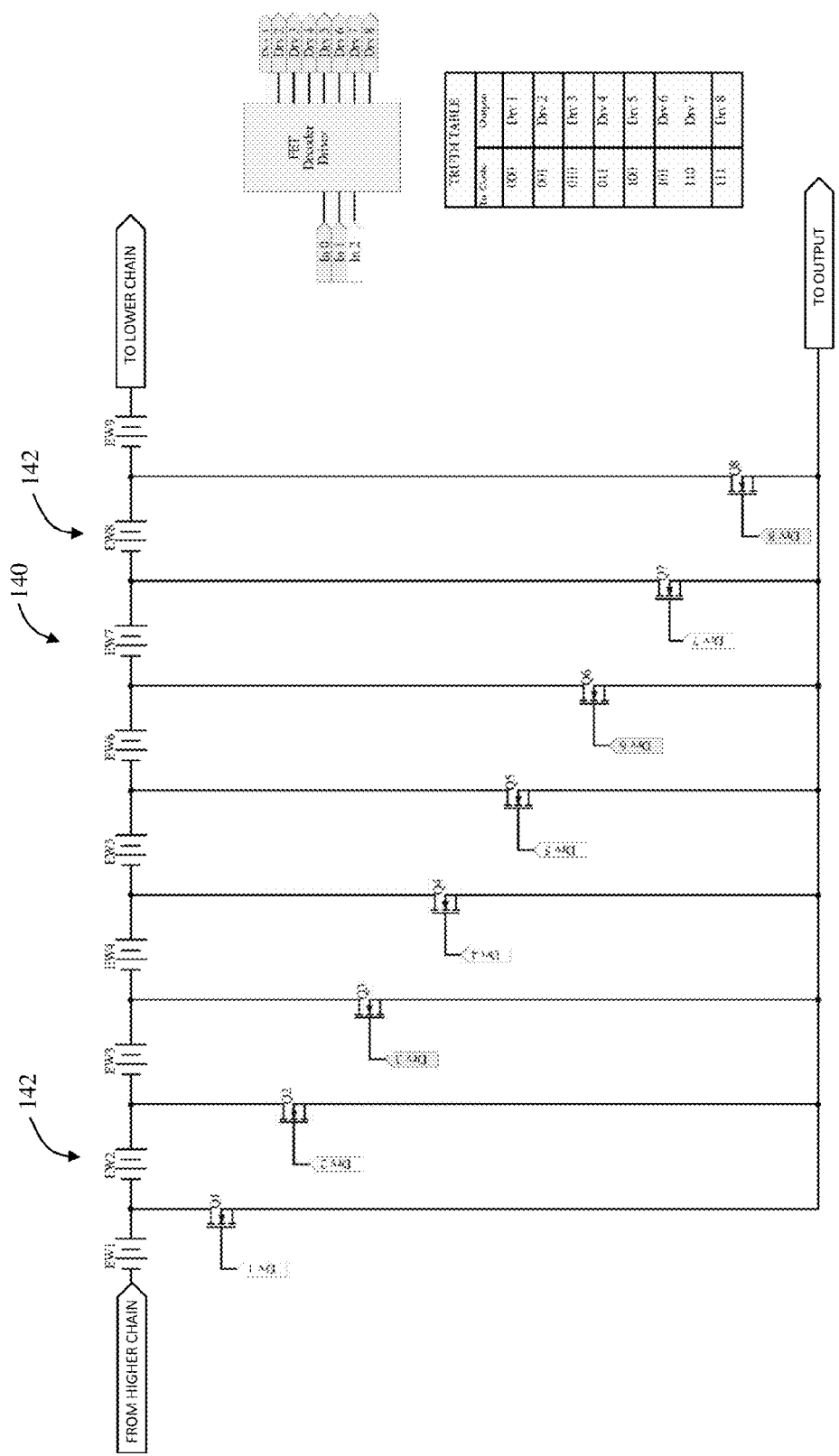
FIG. 26 depicts the capacitor or battery based Energy well Fish Ladder.

In another aspect of the invention the Energy well ladder subsystem 140 uses a method such as the "Truth Table" incorporated into FIGS. 24, 25, and 26.

In another aspect of the invention there is a "dial-a-voltage" concept made possible by the energy well ladder subsystem 140. This concept (FIGS. 24, 25, 26) uses FETs (Q1 thru QN) to select a single energy well cell 142 to transport the energy to the output processing circuit. These FETs are controlled by a standard memory matrix which defines a single location from a particular address. Selection of one provides a voltage that can be regulated by the intelligence within the PSSoC/PSSiP for "dialing" a desired voltage on one or more outputs.

In (FIG. 24) a single eight (8) diode subsection is depicted. Each FET (Q1 thru Q8) is controlled by an output of the FET Decoder Driver. The associated Truth Table describes which FET is enabled by the 3 line binary code applied to its inputs. The outputs of the FETs are all bussed together allowing the any selected wells voltage to connect to the output. Larger trees are constructed by stacking one subsection on top of the other and adding additional logic to enable an active bank.

In another aspect of the invention there is a "Switched Capacitor Output Isolator," (FIG. 31a).

This subsystem first connects the capacitor (C1) to the selected FET's output (Q1) and input power minus (Q3). This allows C1 to be charged to the selected voltage. To make the transition to the output state, first FETs Q1 and Q3 are turned off. This isolates the capacitor C1 from its position on the input Energy well Ladder tree. Then after a suitable interval, known as dead time, FETs Q2 and Q4 are turned on to attach the charged capacitor C1 to the output. Dead time is required to assure that under no circumstances is the input connected to the output; therefore, isolation is rigidly maintained. This connection allows capacitor C1 to discharge its energy load to the output circuitry. After a suitable period of time, defined as the time required for capacitor C1 to discharge, FETs Q2 and Q4 are turned off disconnecting C1 from the output circuitry. Another dead time period is observed for the same reason of guaranteed isolation. The process is then repeated for the desired current output.

Figure 31B:
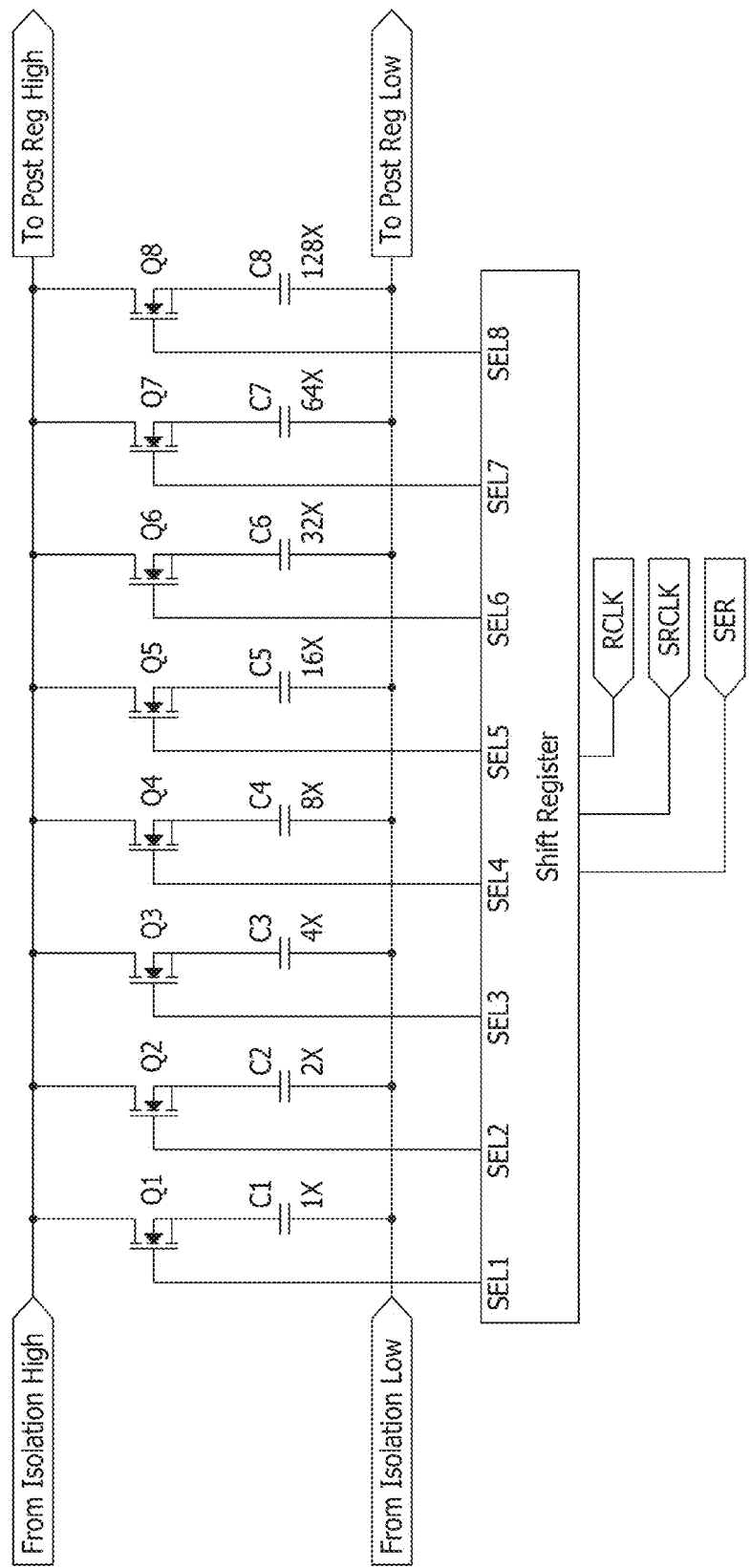
FIG. 31b is a schematic diagram of an Energy well Fish Ladder including a shift register, according to an embodiment of the present invention.
Figure 31C:
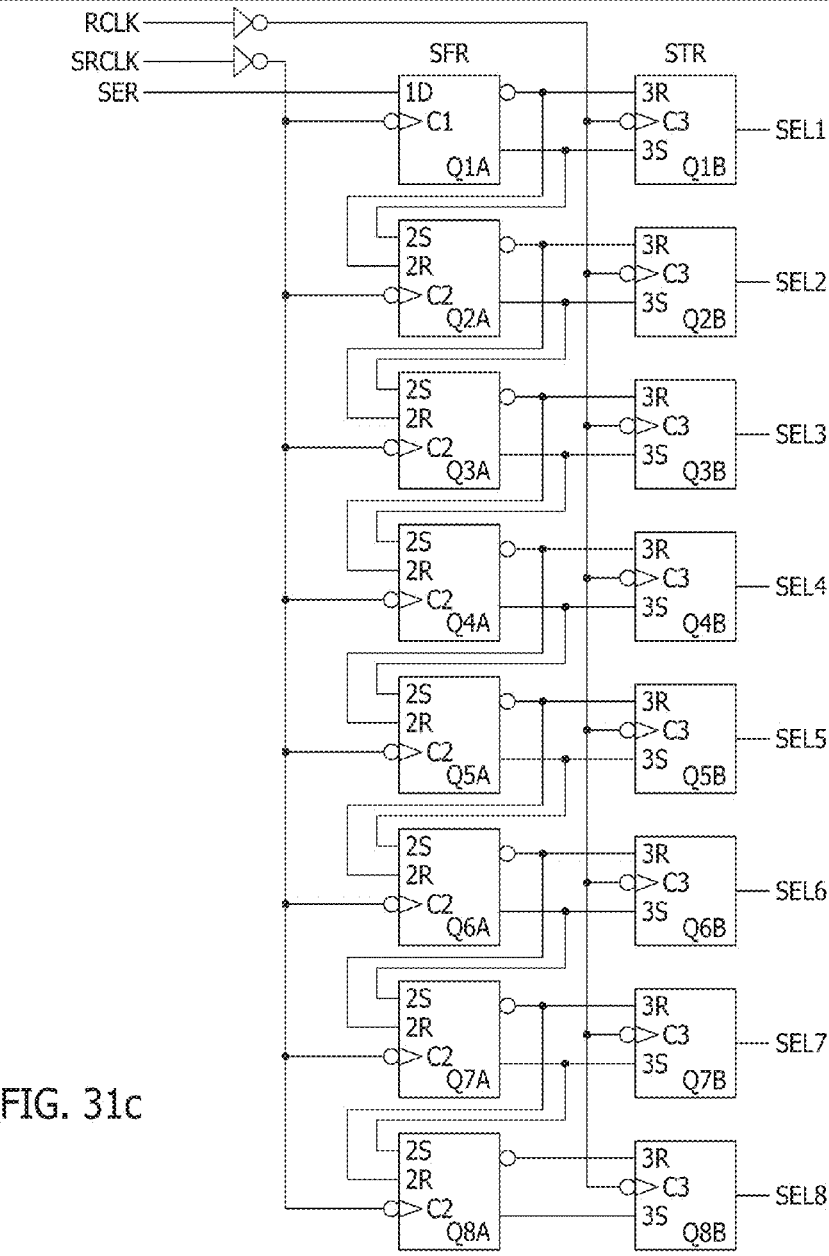
FIG. 31c is a functional schematic of a shift register that may be used with the Energy well Ladder shown in FIG. 31b.
Figure 31D:
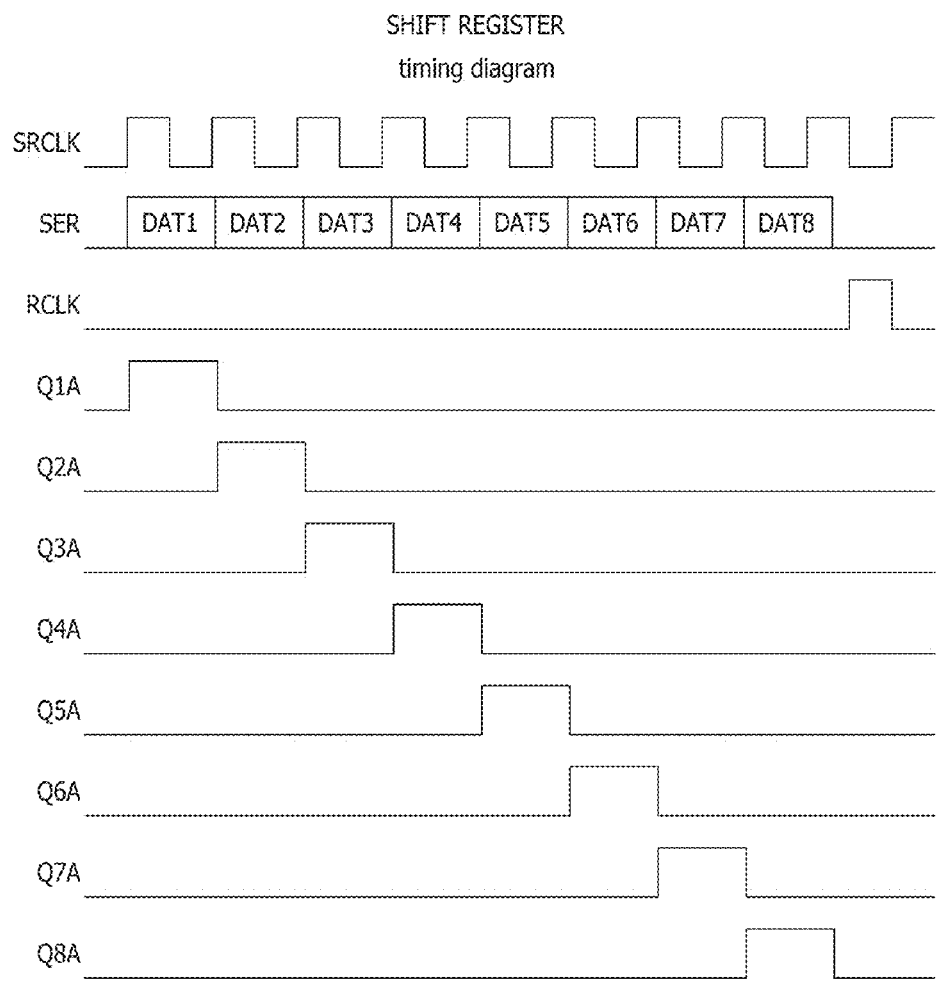
FIG. 31d is a timing diagram of the shift register shown in FIG. 31c.

FIG. 31b is a schematic diagram of an Energy well Fish Ladder 140 including a shift register. FIG. 31c is a functional schematic of a shift register that may be used with the Energy well Ladder 140. FIG. 31d is a timing diagram of the shift register shown in FIGS. 31c. In one embodiment, a method of converting a high level input DC voltage to a lower level one involves utilizing a single switching capacitor such as, for example, energy well cell 142 along with a size adjustable energy storage pond such as, for example, Energy well Fish Ladder 140 in a collaborative effort to manage the desired voltage. The single switched capacitor is analogous to a fire hose spitting small quantities of high pressure water into a pond. The high pressure water stream has its pressure dissipated by the much larger pond absorbing its dollop of water while not significantly increasing its water level. Similarly, the single switching capacitor, although charged to a high voltage by its input, contains a limited quantity of energy overall. This is swallowed quickly by the energy pond into which it is discharged, not affecting the voltage level of the pond to any significantly degree.

The water pond's size affects the speed at which the fire hose squirting into it can raise its water level. A small pond will see its water level increase much faster than a larger one. In a similar fashion, a small energy pond will maintain a higher voltage level when being charged by the single switching capacitor at any given rate.

Therefore a system composed of an adjustable sized energy pond can deliver an output voltage inversely proportional to its size and its current delivery related to the clocking rate of the switching capacitor delivering new energy.

Referring to FIG. 31a the switched capacitor, C1, with an arbitrary value designated as 1×, can be attached to input high by Q1 and input low by Q3 respectively. Both of their gates are tied together (A) making the attachment possible by raising this point high. Likewise, Q2 is used to connect to the Energy Pond's high Input and Q4 to connect to the Energy Pond's low input. Both of their gates are connected to (B) meaning that if that point is raised high that C1 will be attached to the output.

Isolation between Input and output is maintained by never allowing Q1, Q3 to be "on" when Q2, Q4 are "on" or visa-versa. This is done by enforcing what is known as "break before make" switching. This is accomplished by making sure that an appropriate dead time is established between the time that one pair of the FETs are switched "off" before the other pair are turned "on".

As shown in FIG. 31b, the Sizable Energy Pond includes FETs Q1 thru Q8 paired with C1 thru C8 in a binary fashion. C1 has a value of 1×, C2 has a value of 2×, C3 has a value of 4×, C4 has a value of 8×, C5 has a value of 16×, C6 has a value of 32×, C7 has a value of 64×, and C8 has a value of 128×. This means that the Pond's energy size can be varied by a capacitance value of 1× to 256× in 1× increments.

The adjustable capability is provided through the use of a Shift Register (shown in FIGS. 31c and 31d) illustrates a Block Diagram of the function and a Truth Table to describe its operation. A single Byte (8 Bits) may be used to represent the Energy Pond's capacitance status. Loading this Byte in to the Shift register is accomplished by presenting it, high Bit first, one bit at a time to SER, which is clocked into the Shift Register, Q1A thru Q8A, bit by Bit using SRCLK (shown in FIG. 31d). Each positive transition of SRCLK allows the state of SER to be shifted to the next stage (Q1A to Q2A, Q2A to Q3A, etc.). After 8 clock cycles, RCLK is strobed latching the data into Storage Register Array (Q1B thru Q8B) (Q1A to Q2B, Q2A to Q2B, etc.).

The outputs of Q1B thru Q8B are connected to the gates of Q1 thru Q8 and therefore determine the capacitance level of the Energy Pond. This process is repeated anytime the size of the Energy Pond requires alteration.

This ability allows for the "Dial-A-Volt" capability. When the size of the Energy Pond is reduced, its voltage level increases for any fixed rate of energy transfer by the switching capacitor C1. So the primary function of Energy Pond adjustment is to fix the desired output voltage, while the clock rate of the switched capacitor subsystem is utilized to maintain current output levels at the desired voltage.

FIG. 32a-32d are schematic diagrams of an energy well cell, according to an embodiment of the present invention.

Another method of converting a high DC input Voltage to a lower one involves utilizing a single high voltage charge storage capacitor in conjunction with an adjustable charge storage capacitor in a collaborative effort to manage the desired voltage. The single high voltage capacitor is analogous to a narrow but deep bucket pouring a quantity of water into a broad but shallow pond. The same amount of water is held in both reservoirs but since the broader pond is wider than the deep bucket, the potential energy (pressure of the water from the height of the water column) held in the pond is lower. If these two containers of fluid are connected via a pipe they will equalize until there is no difference in height between the two containers resulting in most of the fluid transferring into the larger reservoir. Likewise, if a single high voltage capacitor contains a fixed charge, and this charge is transferred to a larger capacitor, the resulting voltage on the larger capacitor is smaller than the initial voltage on the high voltage capacitor, and the voltage on the resulting system will be at rest and equal on the two capacitors which are essentially now in parallel.

By varying either the size of the high voltage capacitor or the reservoir capacitor one can adjust the ratio of the capacitances and therefore the ratios of the output to the input voltage. The equation below and circuit (shown in FIG. 32a) demonstrate this. $V_{Load}$=final Voltage on system, $V_{source}$=initial voltage on $C_H$. The position of J1=J2.

$$V_{Load} = \frac{C_1}{C_1 + C_2} \times V_{Source} \qquad \text{Equation 1}$$

Therefore, a system composed of an adjustable sized reservoir capacitor, C2, can deliver an output voltage, $V_{Load}$, proportional to the value of the high voltage capacitor and the total system capacitance. Its current delivery would be proportional to the frequency that the switches are actuated.

Figure 32A:
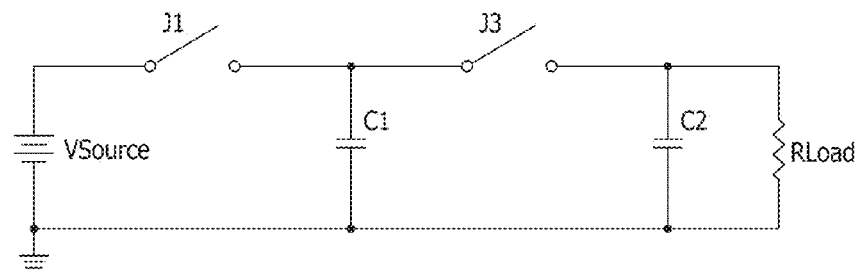
FIGS. 32a-32d are schematic diagrams of an energy well cell, according to an embodiment of the present invention.
Figure 32B:
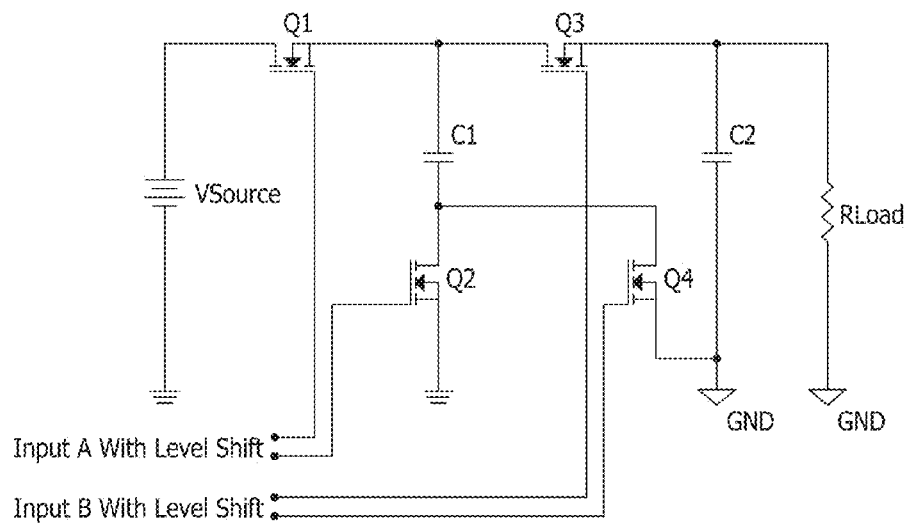

Referring to FIG. 32b, one can see that switched capacitor, C1, with an arbitrary value designated as 1×, can be attached to input high by Q1 and input low by Q2 respectively. Ideally the gates of Q1 and Q2 are driven such that if Q1 is on Q2 is on and if Q1 is off Q2 is off. Likewise, Q3 is used to connect to the reservoir capacitor's high Input and Q4 to connect to the reservoir capacitor's low input so that there is a return ground path. The Q3 and Q4 gates are driven such that such that if Q3 is on Q4 is on and if Q3 is off Q4 is off.

Isolation between Input and output is maintained by never allowing Q1, Q2 to be "on" when Q3, Q4 are "on" or visa-versa. This is done by ensuring break before make switching. To accomplish this appropriate dead-time between Q1/Q2 and Q3/Q4 "on" states must be ensured.

Figure 32C:
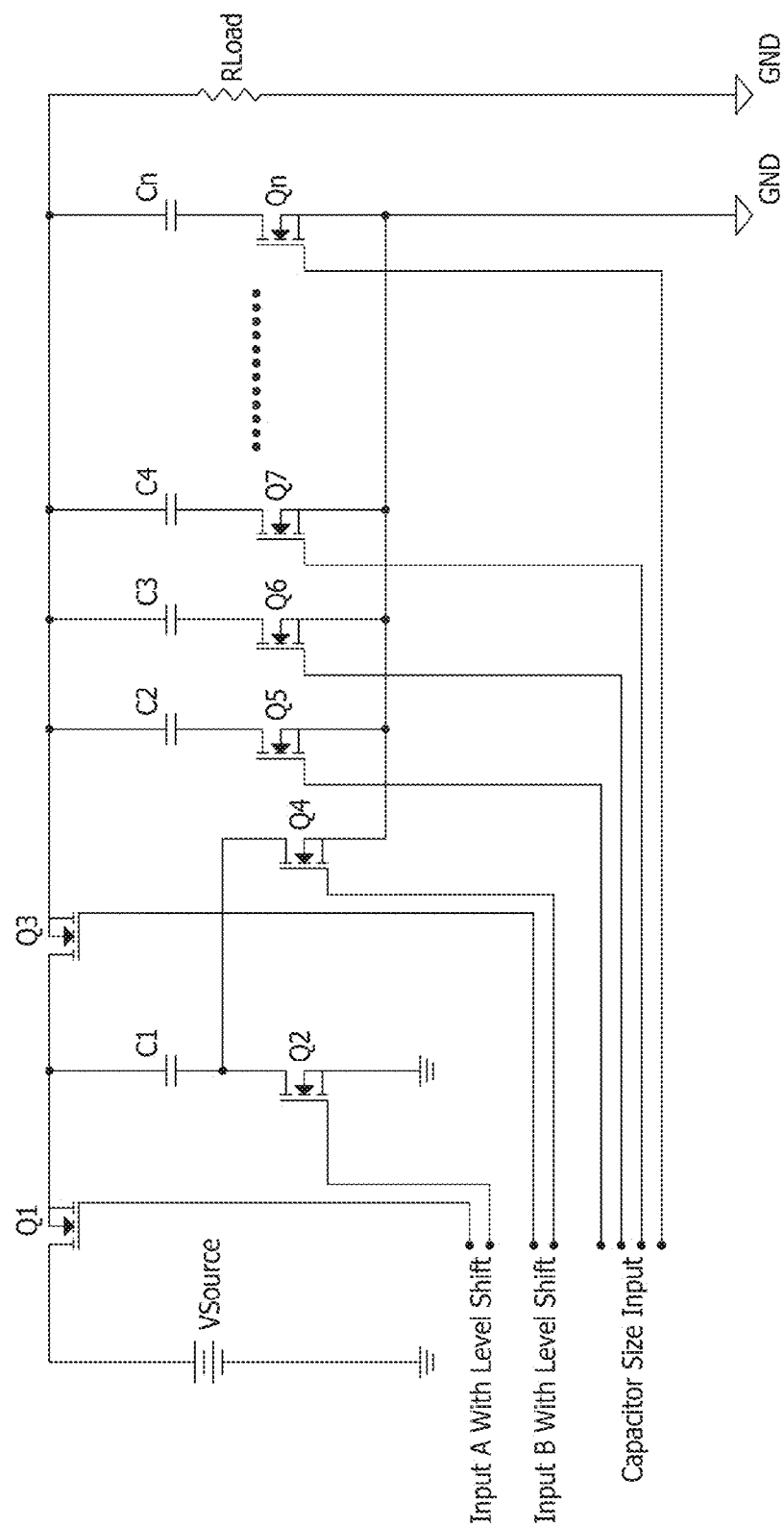

The schematic of the sizable reservoir capacitor is shown in FIG. 32c. It is composed of FETs Q5–Qn paired with C2–Cn in a binary fashion. C1=C2, C3=C1*$2^1$, C4=C1*$2^2$, . . . , Cn=C1*$2^n$.

The capacitor size control inputs could be controlled through a number of methods. Since this device is a power device, it is likely that an onboard serial interface such as I²C or PM/SMBus would be present. In such case, the selection could be triggered as soon as the data is clocked into the appropriate register from the I²C master.

It is unlikely that there would ever be a need for a very large array of capacitors unless very tight control (C2<C1) on the resulting reservoir capacitor is desired. Therefore, another likely scenario for the control of these selection FETs would be directly through I/O of a host microcontroller or microprocessor with appropriate ADC/comparator based feedback loop or a supervisor microcontroller in the IC itself. With this setup, the initial value of the array can be changed according to input Voltages and load conditions etc. Likewise, the value of the reservoir capacitor could be changed at the same rate as the switching speed of the IC without having to provide a faster clock than the switching signals driving Q1-Q4.

Figure 32D:
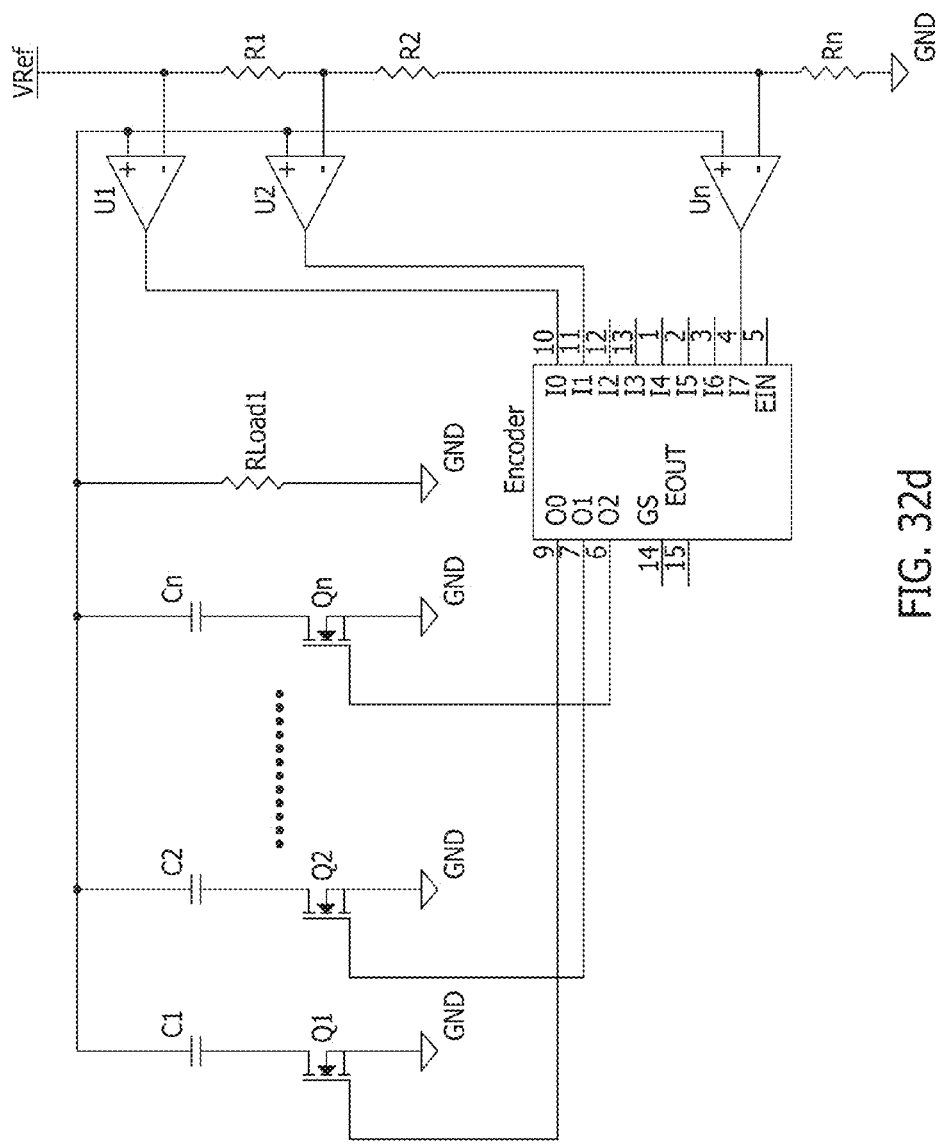

FIG. 32d illustrates an analog embodiment where the reservoir capacitor is selected using a series of comparators. A binary encoder then turns on the appropriate FETs to add to the circuit. Assuming the previously stated values of the capacitors being a series of $2^n$, for n capacitors, there would need to be $2^n$ comparators for full control of the circuit. Likewise if it is determined that all capacitors can be the same value then the number of comparators is equal to the number of capacitors. This would provide the highest speed selection method and it is likely that hysteresis and high pass filtering in addition to the bulk output capacitor would need to be performed.

The Energy Well System 140 described above may also be configured to deliver an amount of charge to the load in every clock cycle equal to $Q_{out}=I_L T_{Ck}$. The amount of charge delivered by the source in every clock cycle is $Q_{in}=C_i V_{source}/N=C_i V_{out}$, $N=V_{source}/V_{out}$=a ratio of 63 (i.e. to get from 311 VDC to 5 VDC). In addition, the amount of charge available at the output in every clock cycle is $Q_a=C_i V_{source}=NC_i V_{out} \to Q_{out}$. The average current delivered by the source is $I_{source}=Q_{in}/T_{ck}=C_I V_{source}/NT_{ck}$. As an example, if $Q_{out}=Q_a$ $I_{source}NT_{ck}=I_L T_{ck} \to I_{source}=I_L/N \to P_{in}=P_{out}$ then efficiency is ideally 100%.

In one embodiment, the equivalent output resistance of the power circuit 10 is $R_{eq}=T_{ck}/NC_i$ when considering that $R_L=V_{out}/I_L=5$ V/5 A=1Ω then $V_{out}=R_i/R_L+R_{eq}$ and $V_{source}/N=R_LC_i/NC_iR_L+T_{ck}=V_{source}$. Considering the minimum acceptable output voltage one would use the formula $V_{out,\ min}$ which would be $C_i=V_{out,\ min}T_{ck}/R_LV_{source}-V_{out,\ min}NR_L$. Then assuming that $V_{out,\ min}=4$ V, $T_{ck}=20$ µs→$C_i=1.5$ µF it would be that N external capacitors are needed. And then, the chip requires 2N=126 extra pins to connect the capacitors, thus requiring a large package (e. g. a BGA package).

Thus, as the typical specific capacitance in CMOS technology ranges from 0.1 fF/µm² (polypoly capacitors) to 5 fF/µm² (MIM capacitors) or ceramic capacitors can be considered. In addition a bi/substrate can be considered, such as a layer of Silicon Carbonate, with Gallium Nitrate or Silicon Dioxide bi/substrata's also can be considered. Or alternatively, Gallium Nitrate or Gallium Arsenide could be used. Or a process like a 311V SoI BCD could be used for the semiconductor, which would permit the integration on one die of the microcontroller, timer/quartz and the high voltage switch capacitor "Energy Well" convertor. All of these options are necessary because of the capacitance needed with the low $R_{on}$ MOSFETS required.

Considering that $C_i$ has to sustain 5 V and that a high-voltage process is required, a specific capacitance of the order of 0.5 fF µm2 can be assumed.

Considering a maximum area of 10 mm² for the capacitors, the maximum value of $C_i$ is: $C_i=0.5$ fF/µm²×10 mm²/63=80 pF. Consequently, with $V_{out,\ min}=4$ V then $T_{ck}=R_LC_iV_{source}-R_LNC_iV_{out/V\ out}=1.2$ ns→$f_{ck}=850$ MHz. However, at 850 MHz switching losses would be significant, so a switching of under 850 MHz would be required for maximum efficiency. Considering $C_G=10$ pF, $P_{sw}=13$ W, which is the desired result for the cell phone charger.

Figure 33:
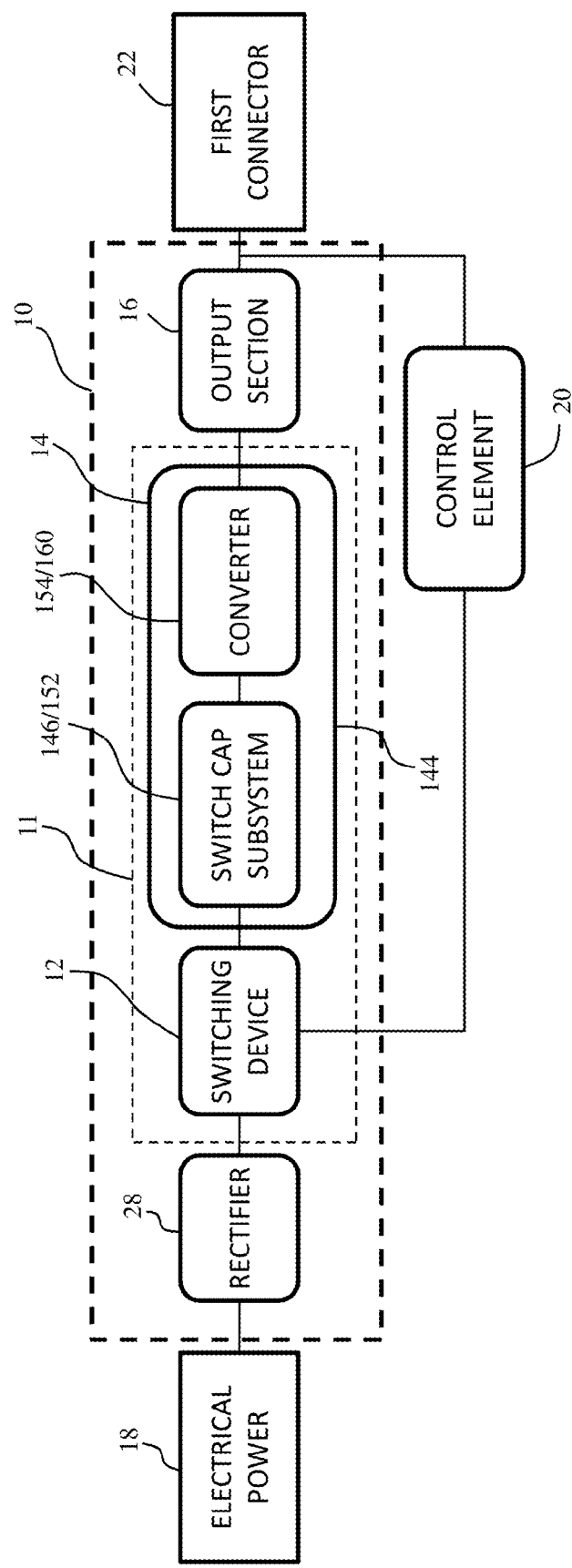
FIG. 33 is another block diagram of the power circuit shown in FIG. 1, according to an embodiment of the present invention.
Figure 34A:
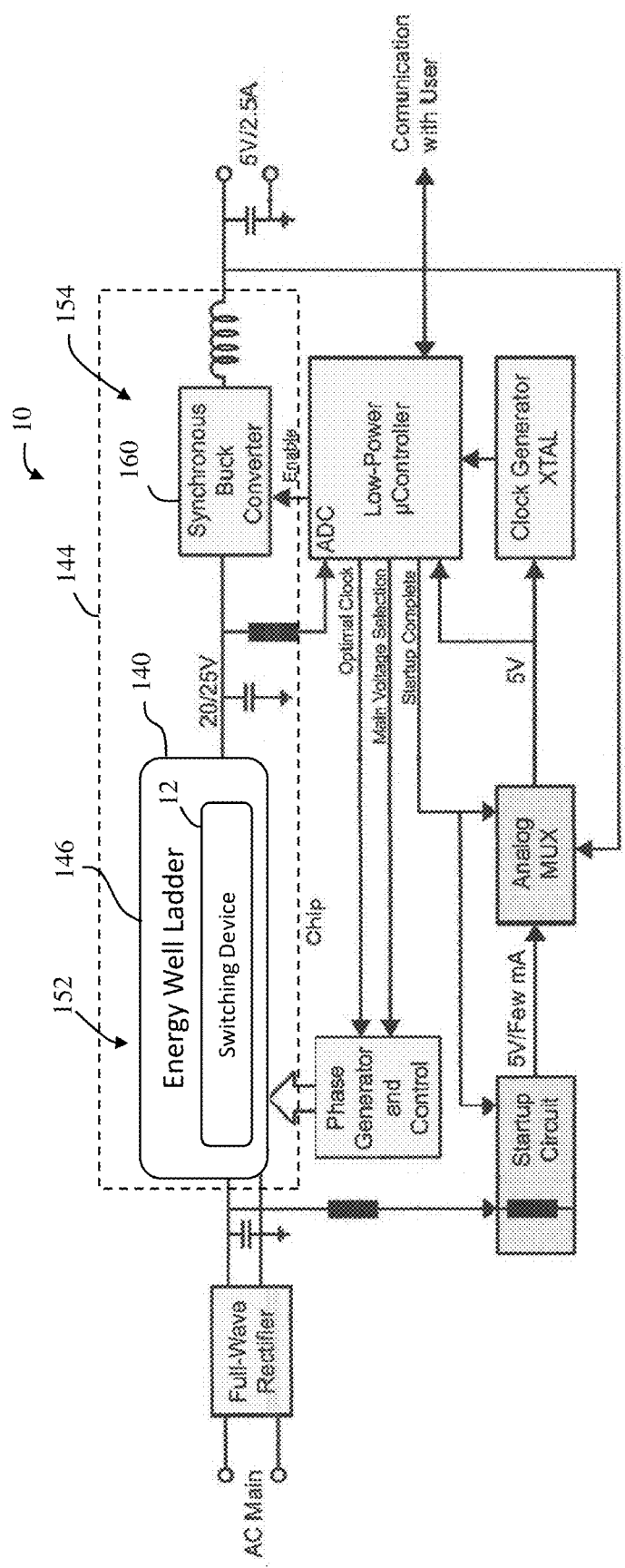
FIGS. 34a and 34b are schematic diagrams of a switched capacitor two-phase circuit that may be used with the power circuit shown in FIG. 33.
Figure 34B:
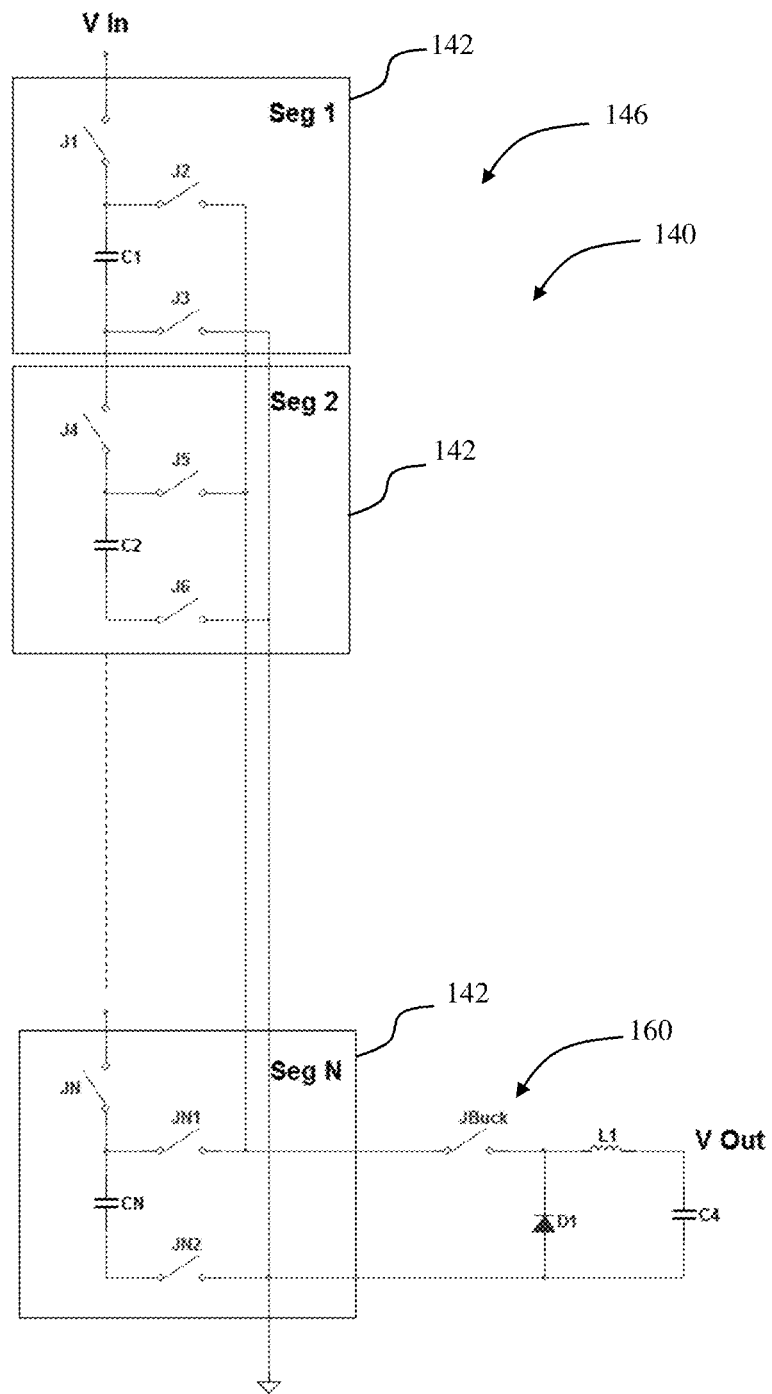

FIG. 33 is a block diagram of the power circuit 10 including a switched capacitor two-phase circuit (SCTP) 144, according to an embodiment of the present invention. FIGS. 34a and 34b are schematic diagrams of the switched capacitor two-phase circuit 144.

Figure 35:
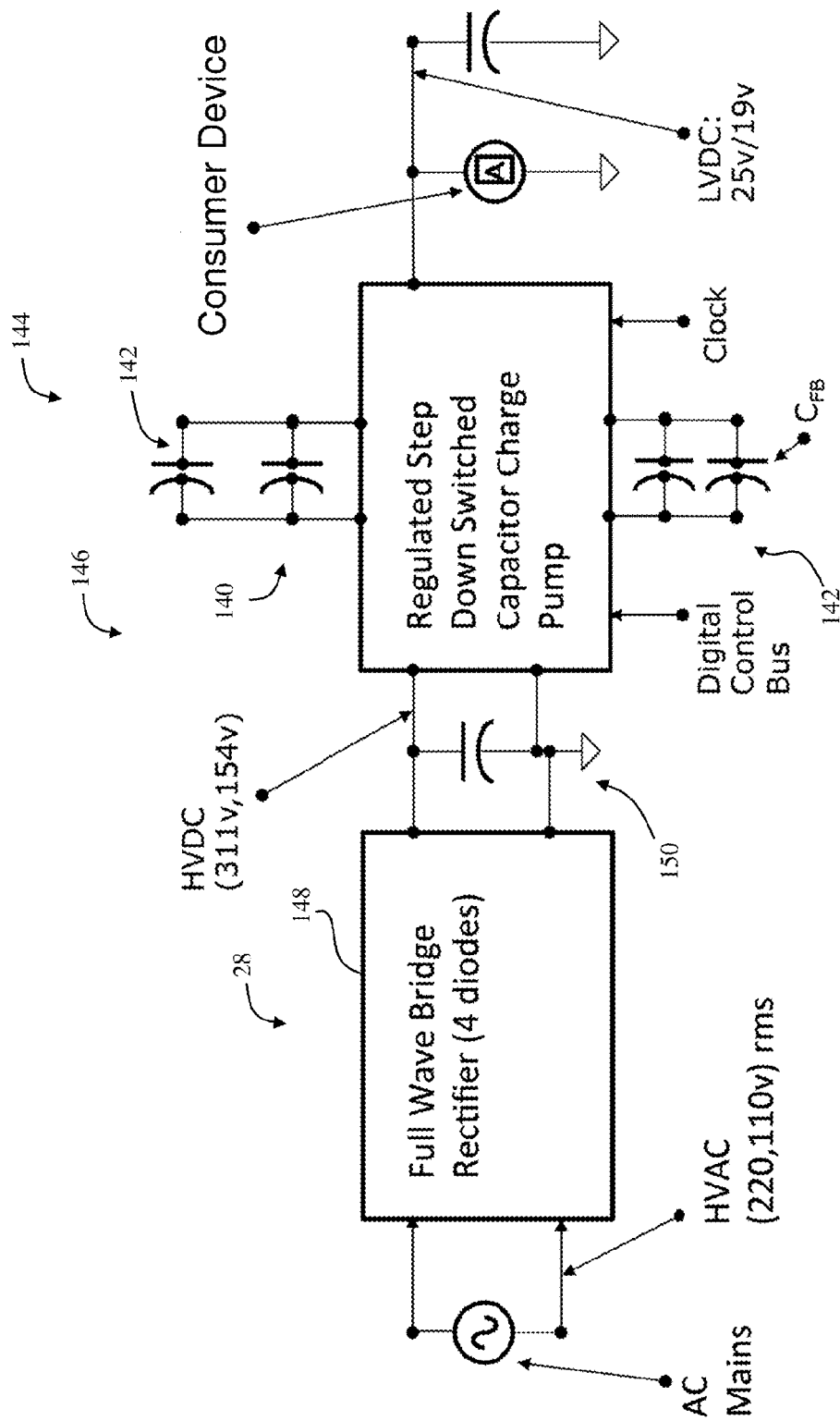
FIG. 35 is a block diagram of the power circuit shown in FIG. 33 and including a phase one switched capacitor subsystem circuit, according to an embodiment of the present invention.

FIG. 35 is a block diagram of the power circuit 10 including a phase one switched capacitor subsystem circuit 146 with the rectification which can be used for laptop charging correlating to the circuit 10 minus the output section 16. In the first phase, the Switch Capacitor process is employed, with its output set to the chosen range, in this example between 19V and 25V, then a secondary reduction circuit is employed (phase two), such as a Buck Converter to achieve the final desired output of, for example, 5V at 2.4 A, which can charge cell phone and/or tablets. If a higher voltage/current is required, such as one that would charge/power a laptop, then the output could either employ just the First Phase, or include a Second Phase circuit that achieved the final desired output of 19.2V at 3 A to 5 A.

Figure 36:
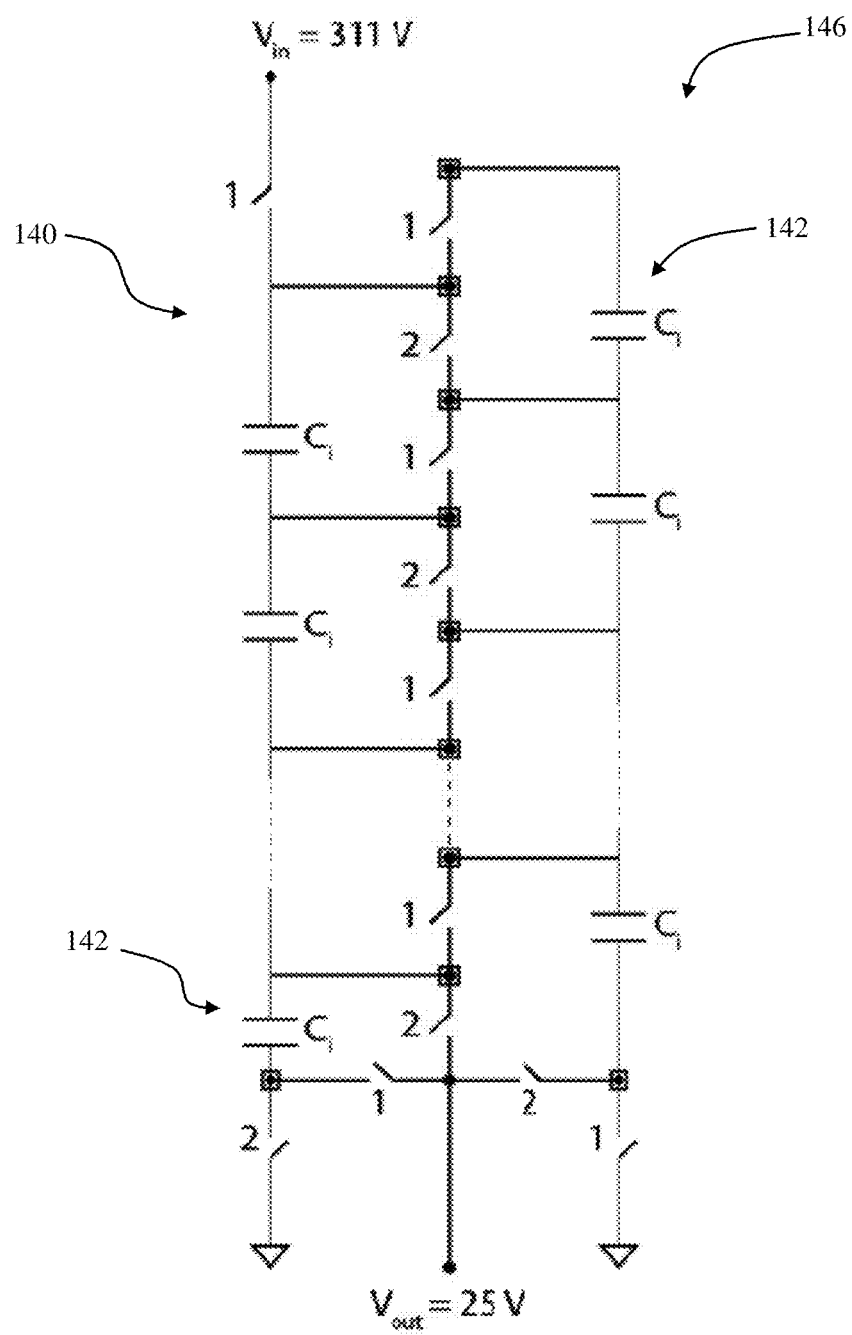
FIGS. 36-37 are schematic diagrams of a switched capacitor subsystem that may be used with the switched capacitor two-phase circuit shown in FIGS. 34a-34b.
Figure 37:
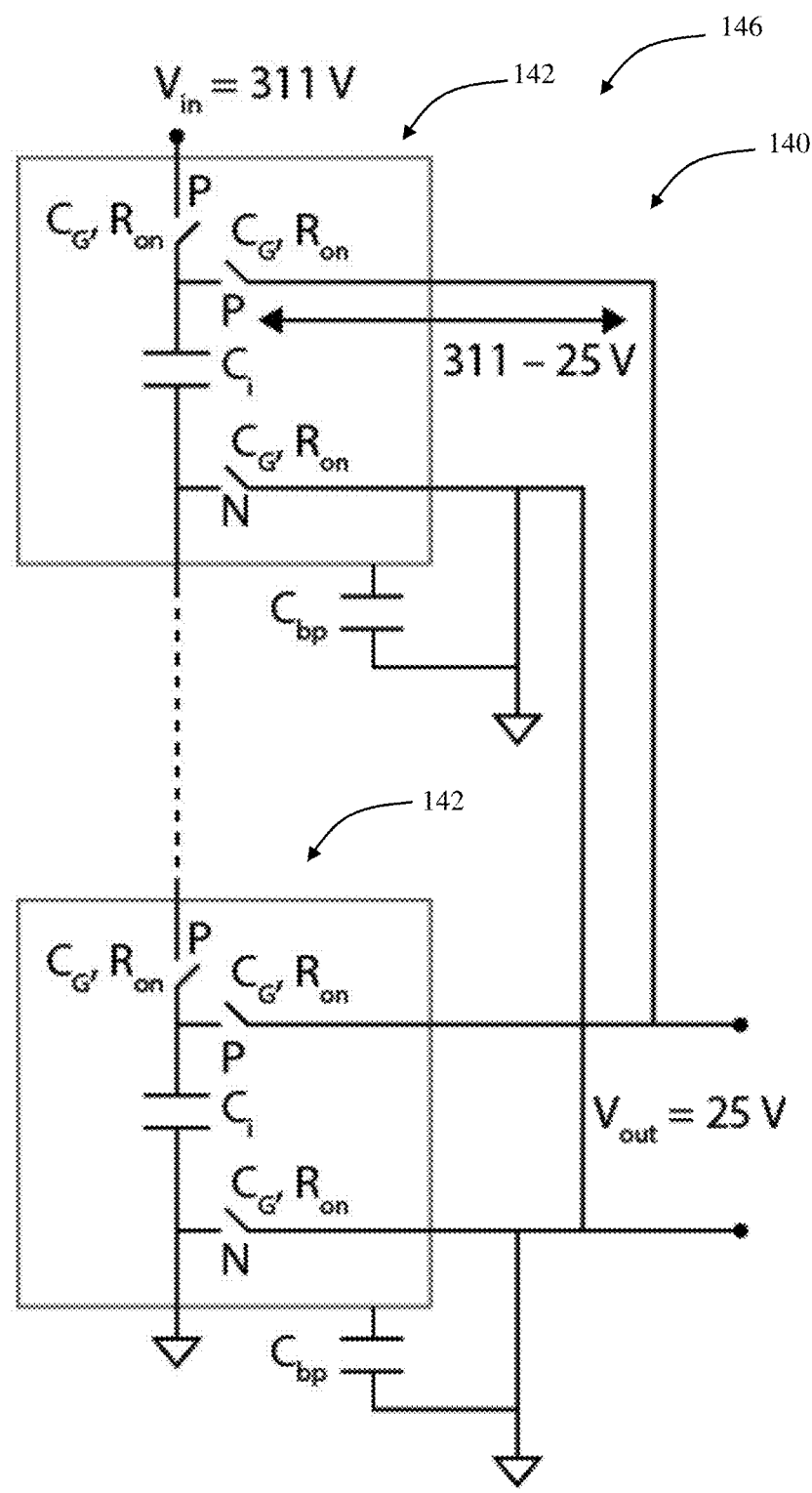
Figure 38:
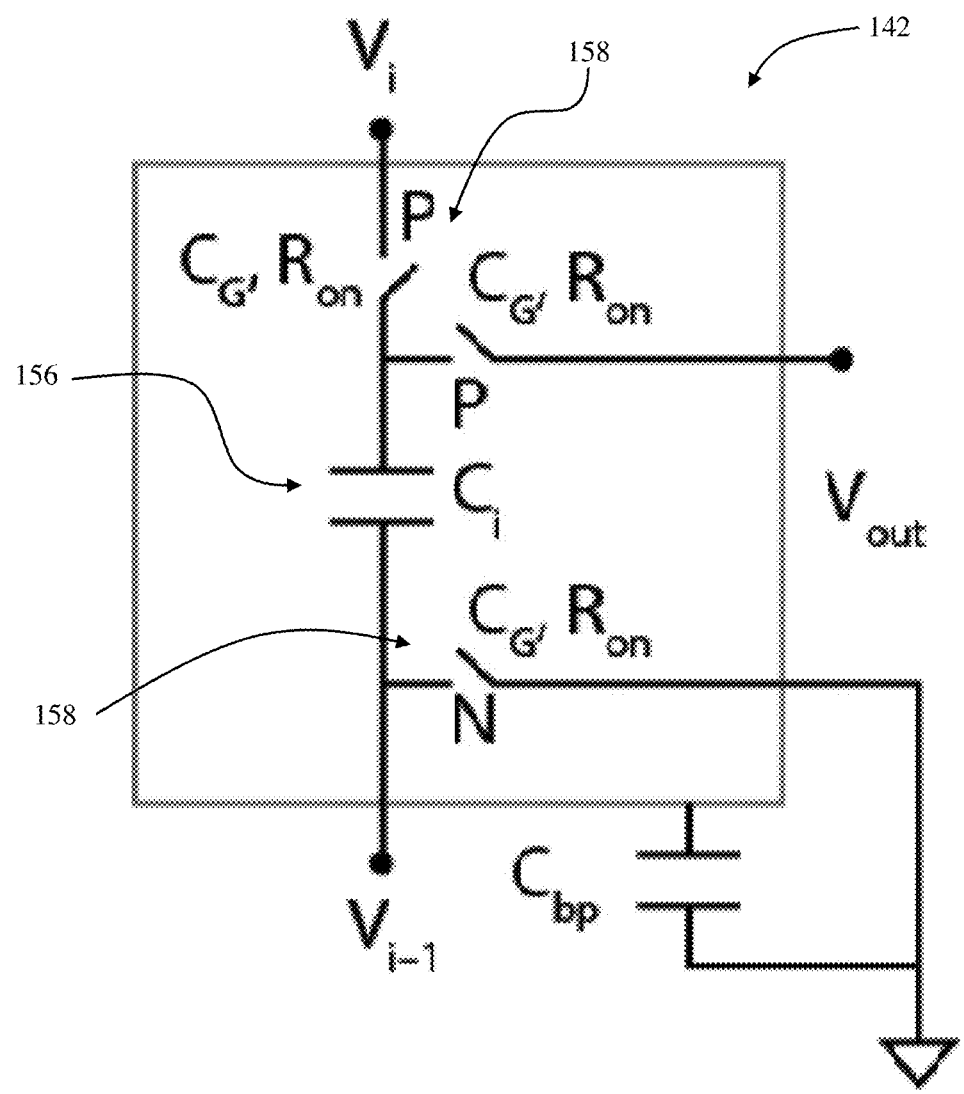
FIG. 38 is a schematic diagram of an energy well cell that may be used with the switched capacitor two-phase circuit shown in FIGS. 34-37.

FIGS. 36-37 are schematic diagrams of the switched capacitor subsystem 146 that may be used with the switched capacitor two-phase circuit 144. FIG. 38 is a schematic diagram of an energy well cell 142 that may be used with the switched capacitor two-phase circuit 144. In the illustrated embodiment, as shown in FIG. 33, the power circuit 10 includes the rectifier circuit 28 that is electrically coupled between the power source 18 and the voltage reduction circuit 11, and the output section 16 that is coupled between the voltage reduction circuit 11 and the first connector 22. In another embodiment, power circuit 10 may not include the output section 16, and the voltage reduction circuit 11 may be coupled directly to the first connector 22. In the illustrated embodiment, the rectifier circuit 28 includes a full wave bridge rectifier 148 that is connected to a filter capacitor 150 (shown in FIGS. 35 and 39). The rectifier circuit 28 is configured to receive the AC input power signal from the power source 18, generate a DC input power signal and channel the DC input power signal to the voltage reduction circuit 11. In one embodiment, the rectifier circuit 28 receives the AC power input signal having a first input voltage level and generates a DC input power signal having a second input voltage level that is approximately equivalent to the AC power input signal in a fixed DC signal. In another embodiment, the rectifier circuit 28 may take an AC signal and generate a DC input power signal having a second input voltage level that is different than the first input voltage level. In a further embodiment, the power circuit 10 may not include the rectifier circuit 28 and the voltage reduction circuit 11 is configured to receive a DC input power signal from the electrical power source 18 for a direct DC-DC conversion.

In the illustrated embodiment, the voltage reduction circuit 11 is configured to receive the DC input power signal having an input voltage level from the rectifier circuit 28 and generate a DC output power signal having an output voltage level that is less than the input voltage level. Referring to FIG. 33, the voltage reduction circuit 11 includes the switching device 12 and the frequency dependent reactive device 14. The frequency dependent reactive device 14 includes the switched capacitor two-phase circuit 144. The switched capacitor two-phase circuit 144 (shown in FIG. 34a) includes a first-phase voltage drop circuit 152 and a second-phase voltage drop circuit 154. The first-phase voltage drop circuit 152 is configured to receive the DC input power signal at the input voltage level and generate an intermediate first phase DC power signal having a first output voltage level that is less than the input voltage level. The second-phase voltage drop circuit 154 is configured to receive the intermediate first phase DC power signal at the first output voltage level and generate a second phase DC output power signal having a second output voltage level that is less than the first output voltage level.

The first-phase voltage drop circuit 152 includes the switched capacitor subsystem 146. The switched capacitor subsystem 146 includes a plurality of energy well cells 142 (shown in FIG. 38) arranged into the energy well ladder 140 (shown in FIG. 34b) and configure to receive the DC input power signal from the rectifier circuit 28 and generate the intermediate DC power signal. The switched capacitor subsystem 146 includes a plurality of energy well cells 142 that are coupled together in series to form the energy well ladder 140 having one or more final regulation energy well cells 142. In addition, the switching device 12 (shown in FIG. 34a) is electrically coupled to each energy well cell 142 (shown in FIG. 38) in the energy well ladder 140 to operate each energy well cell 142 and the energy well ladder 140 to facilitate converting the DC input power signal to the intermediate first phase DC power signal. More specifically, as shown in FIG. 38, each energy well cell 142 includes one or more capacitors 156 and a plurality of FETs 158 that are electrically coupled to each capacitor 156. Each FET 158 is electrically coupled to the control element 20 (shown in FIG. 33) and is configured to selectively channel power to and from the capacitors 156 creating a reduction in voltage within subsequent energy well cells 142 in the energy well ladder 140.

In one embodiment, the energy well ladder 140 is operated with the Bulk Conversion Scheme describe above to generate the DC intermediate power signal having the first output voltage level. For example, during operation the control element 20 operates each FET 158 within a corresponding energy well cell 142 to alternately connect the energy well cells 142 in series to extract power from the input tree (D1 thru DN, shown in FIG. 30) and then in parallel to transport the power to the second-phase voltage drop circuit 154. By alternately connecting the energy well cells 142, the control element 20 operates the energy well ladder 140 to generate the DC intermediate power signal. For example, in the illustrated embodiment, the first-phase voltage drop circuit 152 may be configured to receive the DC input power signal having an input voltage level equal to approximately 311V. The control element 20 selectively operates each energy well cell 142 within the energy well ladder 140 to generate the DC intermediate power signal and discharge the DC intermediate power signal having a first voltage level equal to approximately 25V. In another embodiment, the energy well ladder 140 may be operated using the Stair Step Conversion Scheme, the Dial-A-Volt scheme, the Switched Capacitor Output Isolator scheme, and/or any suitable operating scheme to enable the first-phase voltage drop circuit 152 to function as described herein.

The second-phase voltage drop circuit 154 includes a DC-DC converter 160 that is coupled between the first-phase voltage drop circuit 152 and the output section 16. The second-phase voltage drop circuit 154 is configured to receive the intermediate DC power signal from the first-phase voltage drop circuit 152, generate the DC output power signal from the intermediate DC power signal, and discharge the DC output power signal to the output section 16 and/or the first connector 22. In the illustrated embodiment, the DC-DC converter 160 is a Buck converter, however in alternative embodiments, the Buck converter may be replace by a SEPIC, Push-Pull, Ç uk or other high efficiency DC to DC converters. The Buck converter 160 is configured to receive the intermediate DC power signal from the first-phase voltage drop circuit 152 from the final energy well capacitor and reduce the power voltage level of the intermediate DC power signal by a predetermined voltage amount to generate the DC output power signal. The final energy well capacitor circuit is coupled with the output "holding" capacitor, which together act as a capacitor divider which keeps the voltage fixed. For example, the Buck converter 160 receives the intermediate DC power signal from the final capacitor cell at the first output voltage level and generates the DC output power signal at the second output voltage level by a further reduction of the Buck converter. For example, in one embodiment, the Buck converter may be configured to receive the intermediate DC power signal at a first voltage level which has been reduced to approximately 25V and further reduce the generated DC output power signal to a second voltage level equal to approximately 5V, and channel the DC output power signal to the output section 16 and/or the first connector 22. In another embodiment, the DC-DC converter 160 may include a Ç uk converter, a SEPIC Converter, a Push-Pull Converter, a modified Ç uk converter (shown in FIGS. 58-60), a modified SEPIC Converter (shown in FIGS. 64-66), a modified Push-Pull Converter (shown in FIGS. 61-63), and/or any suitable DC-DC converter that enables the power circuit 10 to function as described herein.

In the illustrated embodiment, the control element 20 operates the first-phase voltage drop circuit 152 to reduce the power voltage level of the DC input power from the input voltage level to the first output voltage level. The second-phase voltage drop circuit 154 receives the intermediate DC power signal at the first output voltage level, generates the DC output power signal at the second output voltage level, and channels the DC output power signal to the output section 16.

Figure 39:
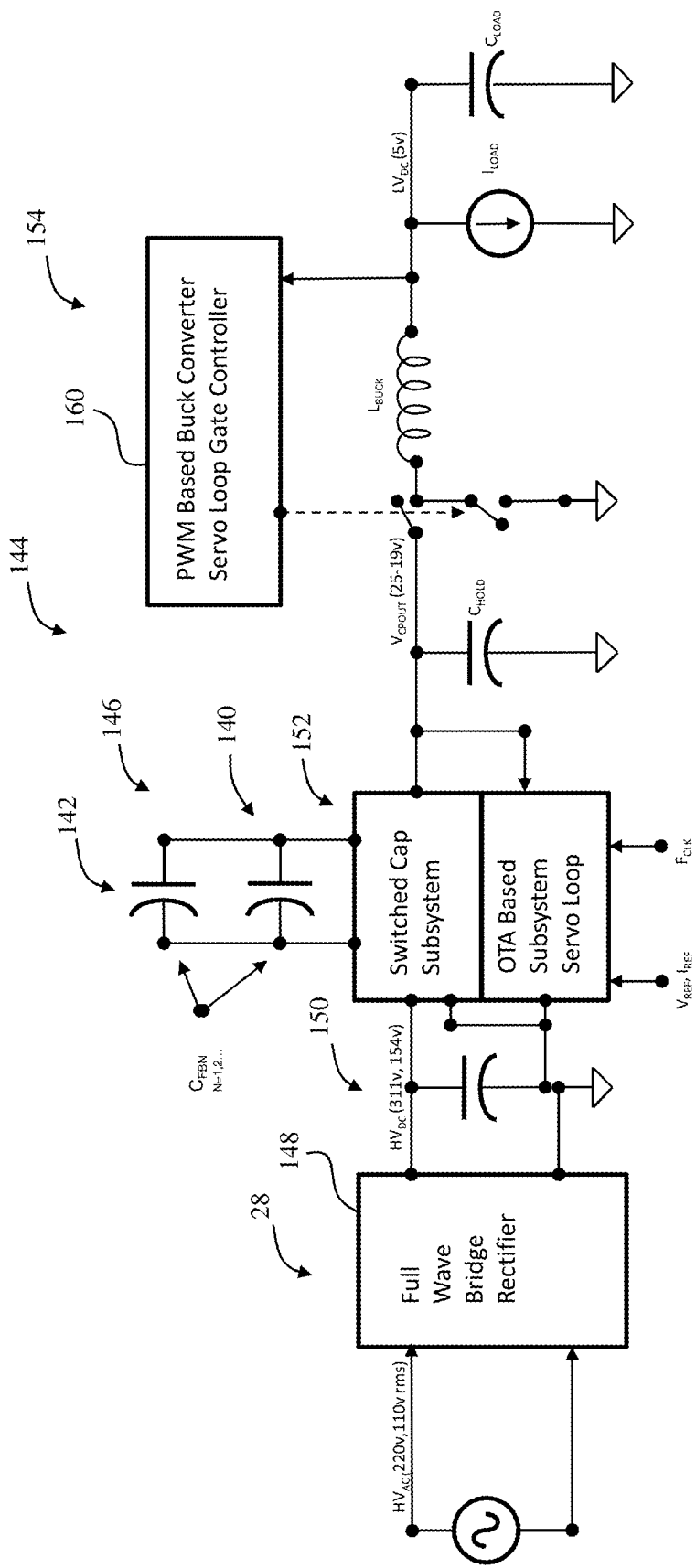
FIG. 39 is another schematic diagram of the switched capacitor two-phase circuit shown in FIGS. 34a and 34b, according to an embodiment of the present invention.

FIG. 39 is another block diagram of the switched capacitor two-phase circuit 144. FIG. 40 is a schematic diagram of an energy well cell 142 in a charged phase. FIG. 41 is a schematic diagram of an energy well cell 142 in a discharged phase.

In the illustrated embodiment, during operation, the switched capacitor subsystem 146 causes each energy well cell 142 to use a fixed clock rate. Moreover, the charge time period for charging an energy well capacitor $C_{FB1}$ from the source and the discharge time period into the output capacitor $C_{HOLD}$ is fixed. The energy well cell 142 controls output voltage by varying the charge rate of $C_{FB1}$. This is accomplished through the use of $R_{MOSFET}$. The $R_{MOSFET}$ acts like a resistor, whose resistance is a function of the bias voltage applied at its gate. An operational amplifier compares the predefined $V_{REF}$ to the cells output, $V_{CPOUT}$ and delivers the difference voltage as that bias. When the voltage at $V_{CPOUT}$ is below the intended output voltage for the cell the effective resistance of $R_{MOSFET}$ is reduced, allowing $C_{FB1}$ to achieve a higher state of charge in the fixed time that it is allotted. Conversely, the effective resistance of $R_{MOSFET}$ can be increased to lower the state of charge on $C_{FB1}$ if the output voltage at $V_{CPOUT}$ needs to be reduced. This allows for each cell to maintain a fixed and controllable voltage drop (as determined by $V_{REF}$).

By stacking multiple energy well cells 142 in series it is possible to achieve a substantial voltage drop while assuring that each individual energy well cell 142 remains within expected limits despite fluctuations in input voltage or changes in power requirements of the load.

For high efficiency, this design's primary switched capacitor subsystem 146 reduces the voltage from rail voltages (120 VAC to 264 VAC) to about 25 VDC, therefore a traditional buck convertor is connected to the end of the chain to deliver the necessary additional voltage drop to achieve the desired output voltage. This is also a convenient place to add isolation, if required, to the system. This may include the use of a transformer based buck convertor (not shown).

Regulation Loop Operation. As shown in FIGS. 39-41, during the charging phase (shown in FIG. 40), the fly back capacitors are charged with a current which is a function of the differential voltage between $V_{CPOUT}$ and $V_{REF}$. The current is controlled by an Operational Transconductance Amplifier (OTA) driving a MOSFET transistor. During the charging phase the $C_{HOLD}$ capacitor supplies current ($I_{BUCK}$) to the buck converter.

During the discharging phase (shown in FIG. 41), the flyback capacitor and the $R_{MOSFET}$ are connected in series with the hold capacitor $C_{HOLD}$. The top plate of the $C_{FB1}$ is grounded. This attenuates the voltage at $V_{CPOUT}$ node. The servo loop senses the voltage at $V_{CPOUT}$ and applies a proportional current such that the output voltage is maintained while the providing current to the buck converter. The charging frequency is kept constant. The charging and discharging phases are non-overlapping phases derived from $F_{CLK}$.

If the output voltage is lowered (due to excessive current draw) then the OTA output voltage goes up (during charging phase) which reduces $R_{MOSFET}$ thus drawing more current from the supply. This additional charging current ($I_{ch}$) is supplied to the output hold capacitor bringing the voltage up to the desired level during discharging phase. Once the voltage is brought up to the required level, the OTA output voltage goes down increasing $R_{MOSFET}$. This lowers the current drawn from the supply thus maintaining regulation.

In the illustrated embodiment, the regulation loop operation described herein may be used to control one or more energy well cells 142 within the switched capacitor subsystem 146, which are each selected to optimize the switched capacitor two-phase circuit 144. For example, in one embodiment, the regulation loop operation control may be used to selectively control the charging and discharging of the last two energy well cells 142 within the energy well ladder 140. In another embodiment, each energy well cell 142 may be operated with the regulation loop operation control to selectively charge and discharge each energy well cell 142 within the energy well ladder 140.

Figure 42:
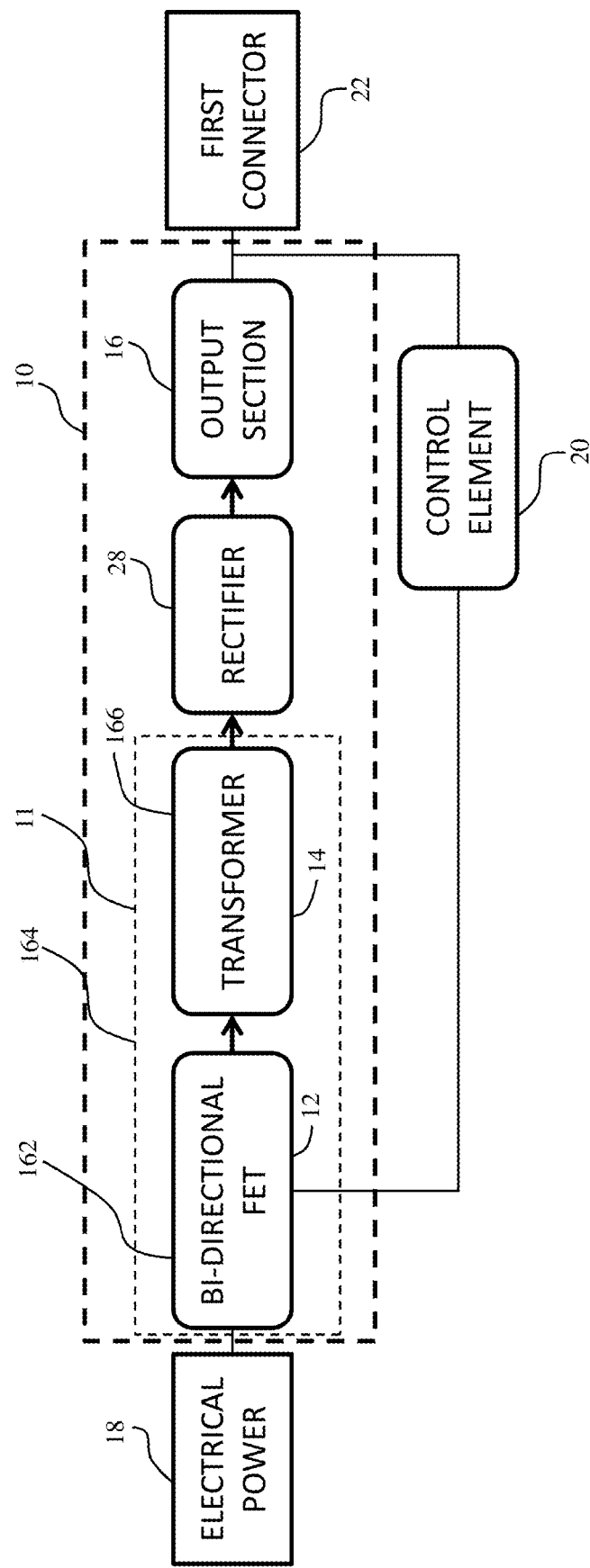
FIG. 42 is another block diagram of the power circuit shown in FIG. 1, according to an embodiment of the present invention.
Figure 43:
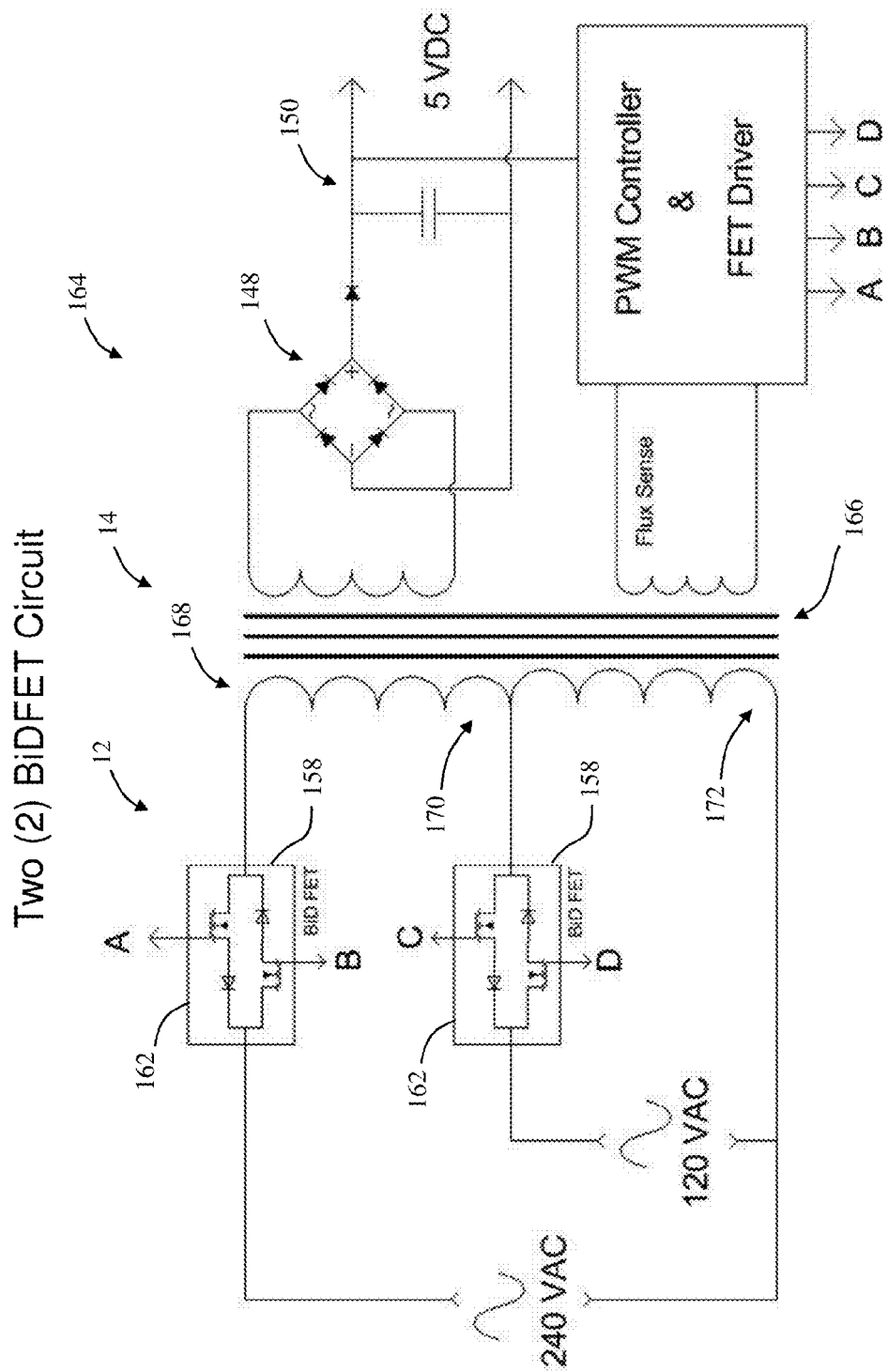
FIG. 43-52 are schematic diagrams of a BiDFET circuit that may be used with the power circuit shown in FIG. 42, according to an embodiment of the present invention.
Figure 51:
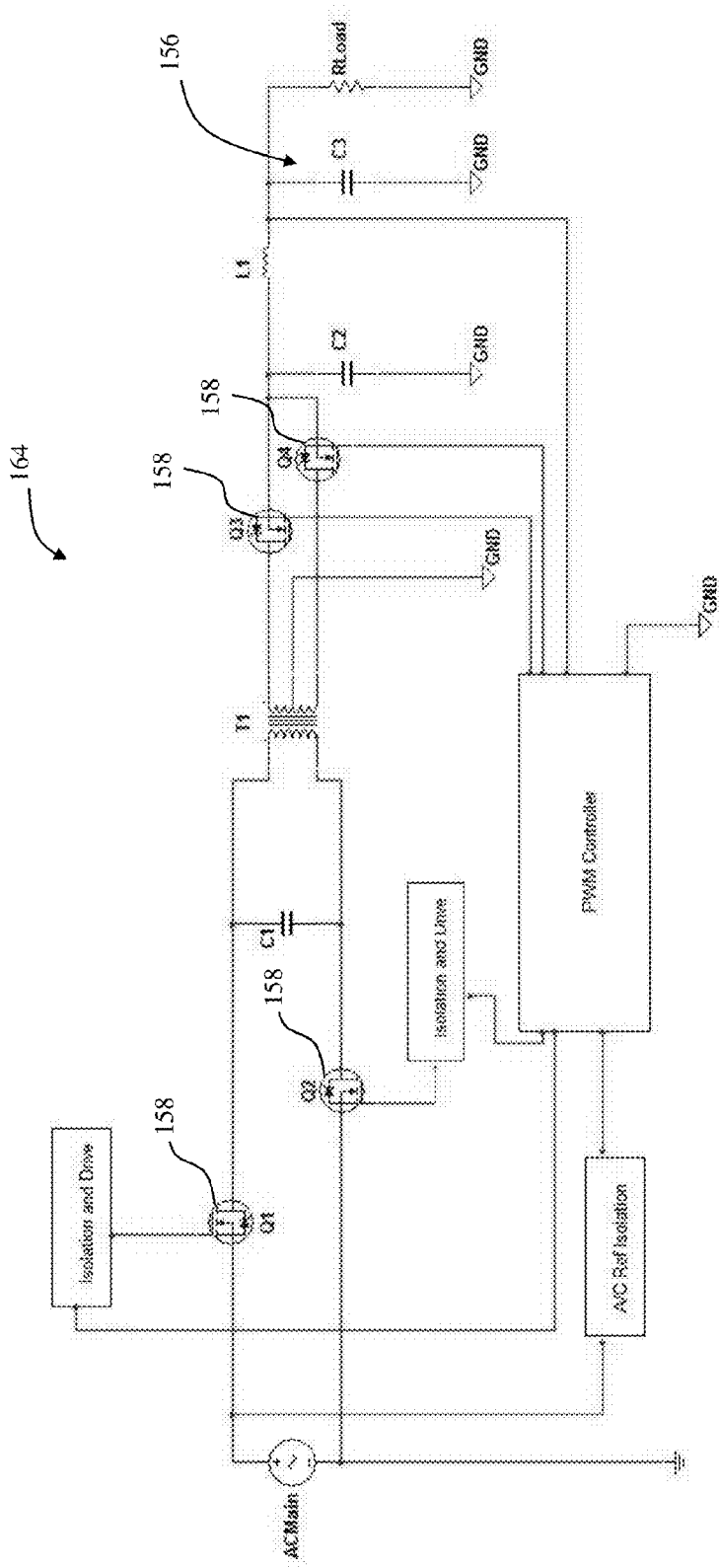
Figure 52:
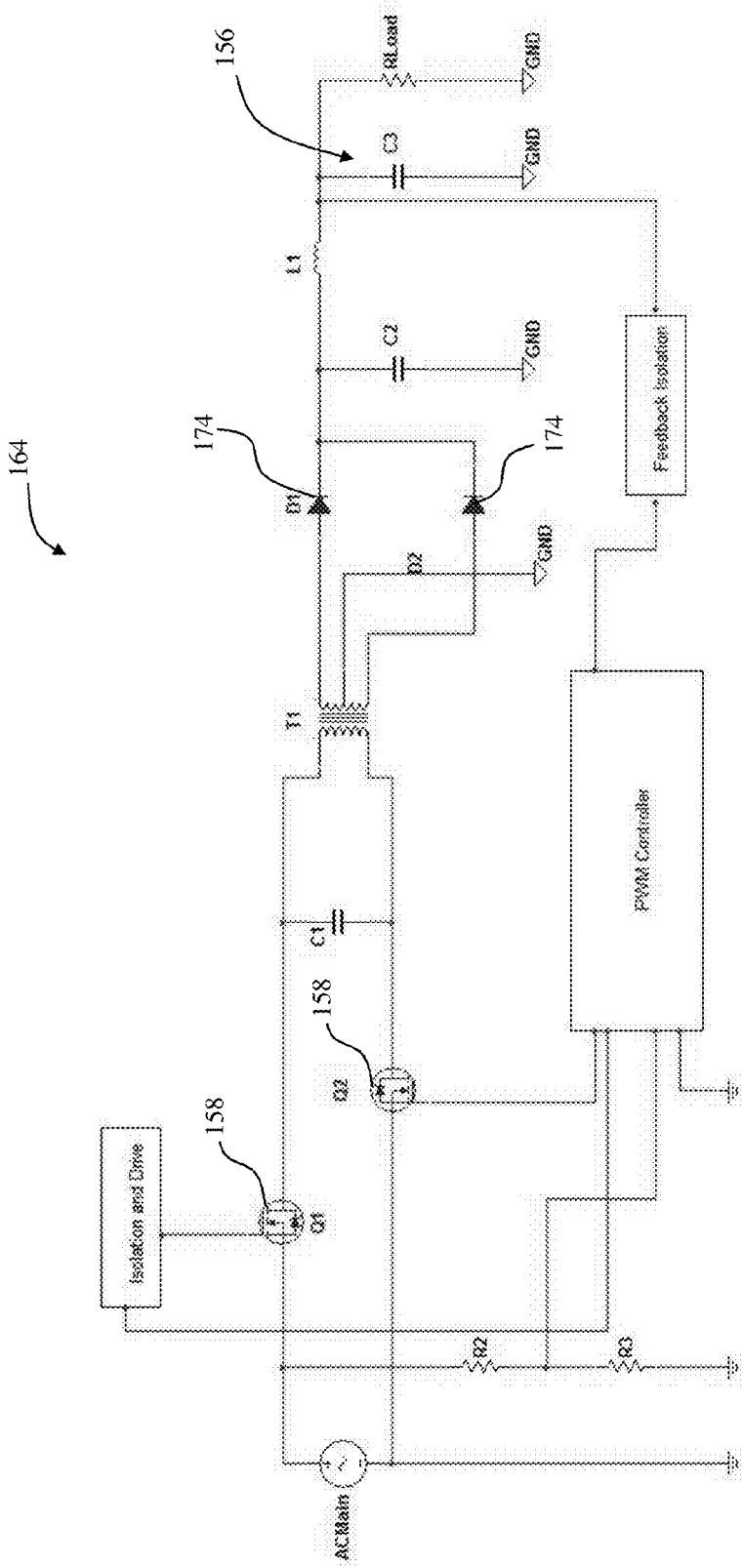
Figure 53:
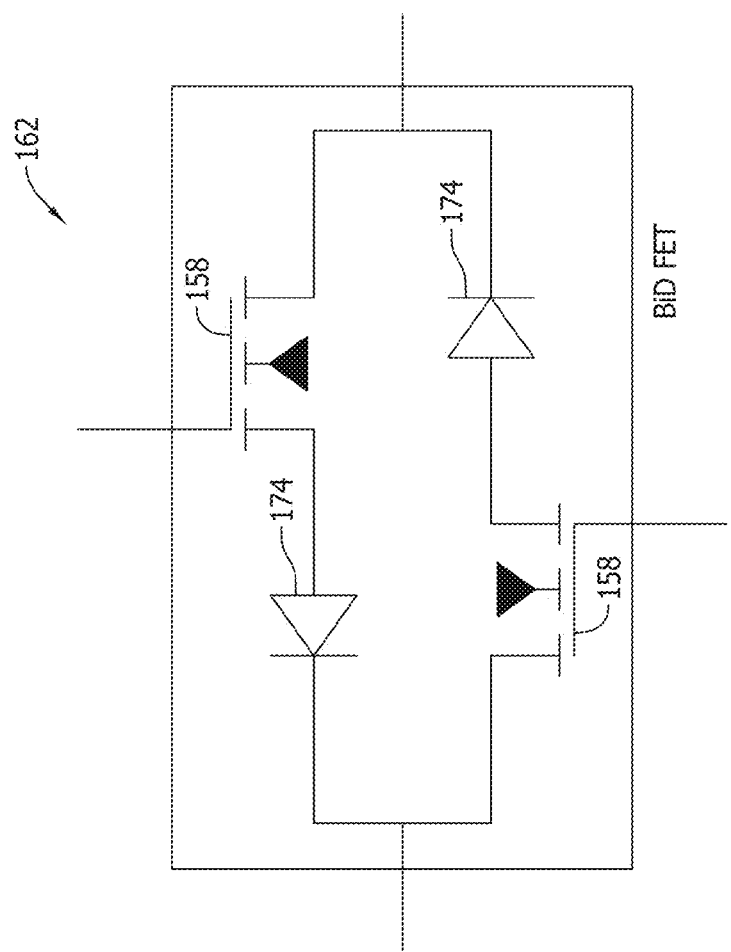
FIG. 53 is a schematic diagram of a bi-directional field effect transistor (BiDFET) that may be used with the power circuit shown in FIGS. 42-52, according to an embodiment of the present invention.

FIG. 42 is another block diagram of the power circuit 10 including a bi-directional field effect transistor (BiDFET) 162, according to an embodiment of the present invention. FIGS. 43-52 are schematic diagrams of a BiDFET circuit 164 that may be used with the power circuit 10. FIG. 53 is a schematic diagram of a BiDFET 162 that may be used with the BiDFET circuit 164. In one embodiment, the power circuit 10 may include the voltage reduction circuit 11 that is connected between the power source 18 and the rectifier circuit 28. The voltage reduction circuit 11 is configured to receive the AC input power signal at an input voltage level and generate an AC output power signal at an output voltage level that is less than the input voltage level. The rectifier circuit 28 receives the AC output power signal from the voltage reduction circuit 11, generates a DC output power signal at the output voltage level, and transmits the DC output power signal to the output section 16 and/or the first connector 22. In the illustrated embodiment, the switching device 12 includes a plurality of FETs 158 that are connected to the frequency dependent reactive device 14. The control element 20 operates the FETs 158 to generate a modified AC power signal that is channeled to the frequency dependent reactive device 14. The frequency dependent reactive device 14 includes a transformer 166 that is connected to the switching device 12 and is configured to receive the modified AC power signal from the switching device 12, reduce the input voltage level, and generate the AC power output signal having a reduced output voltage level.

Figure 44A:
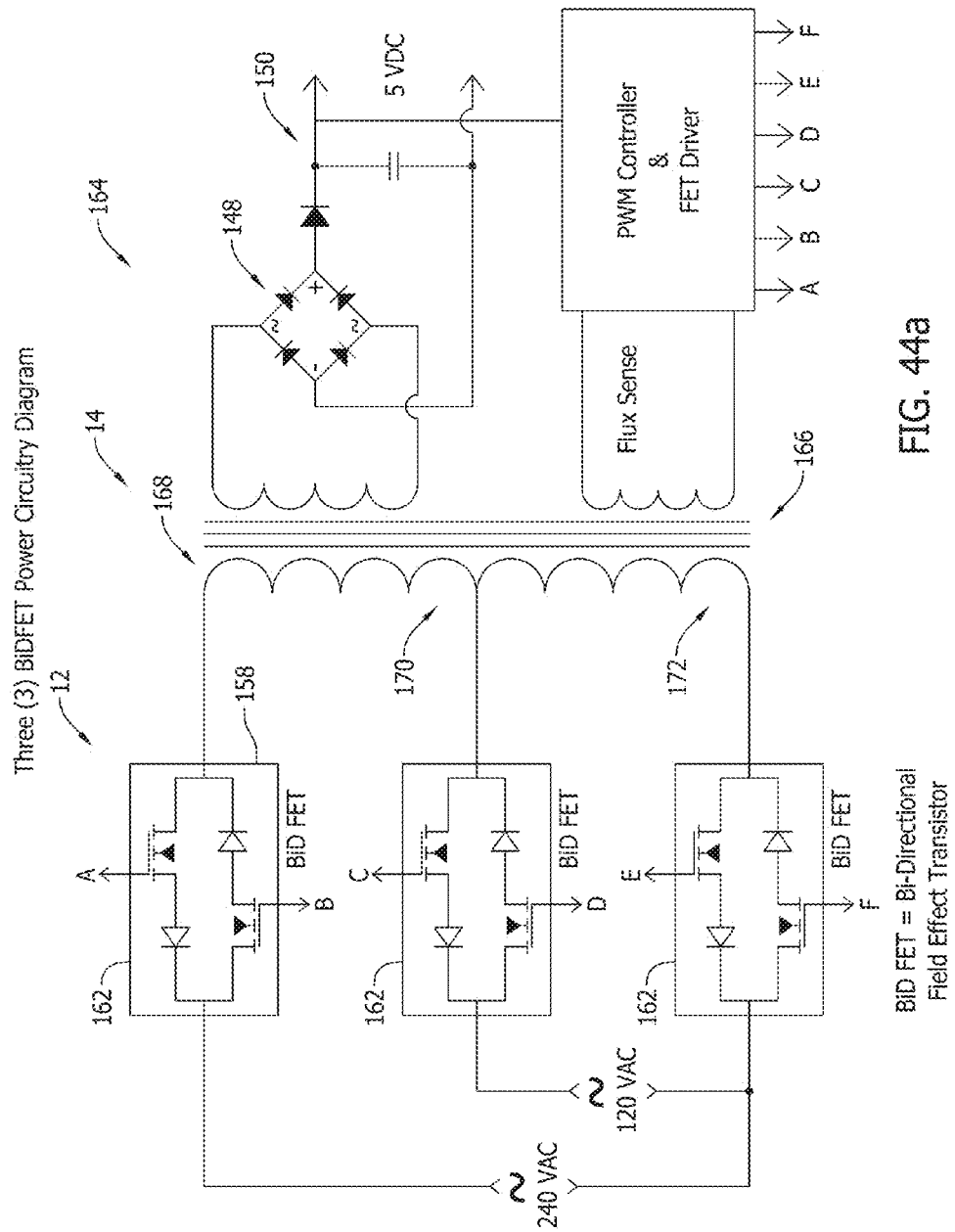
Figure 44B:
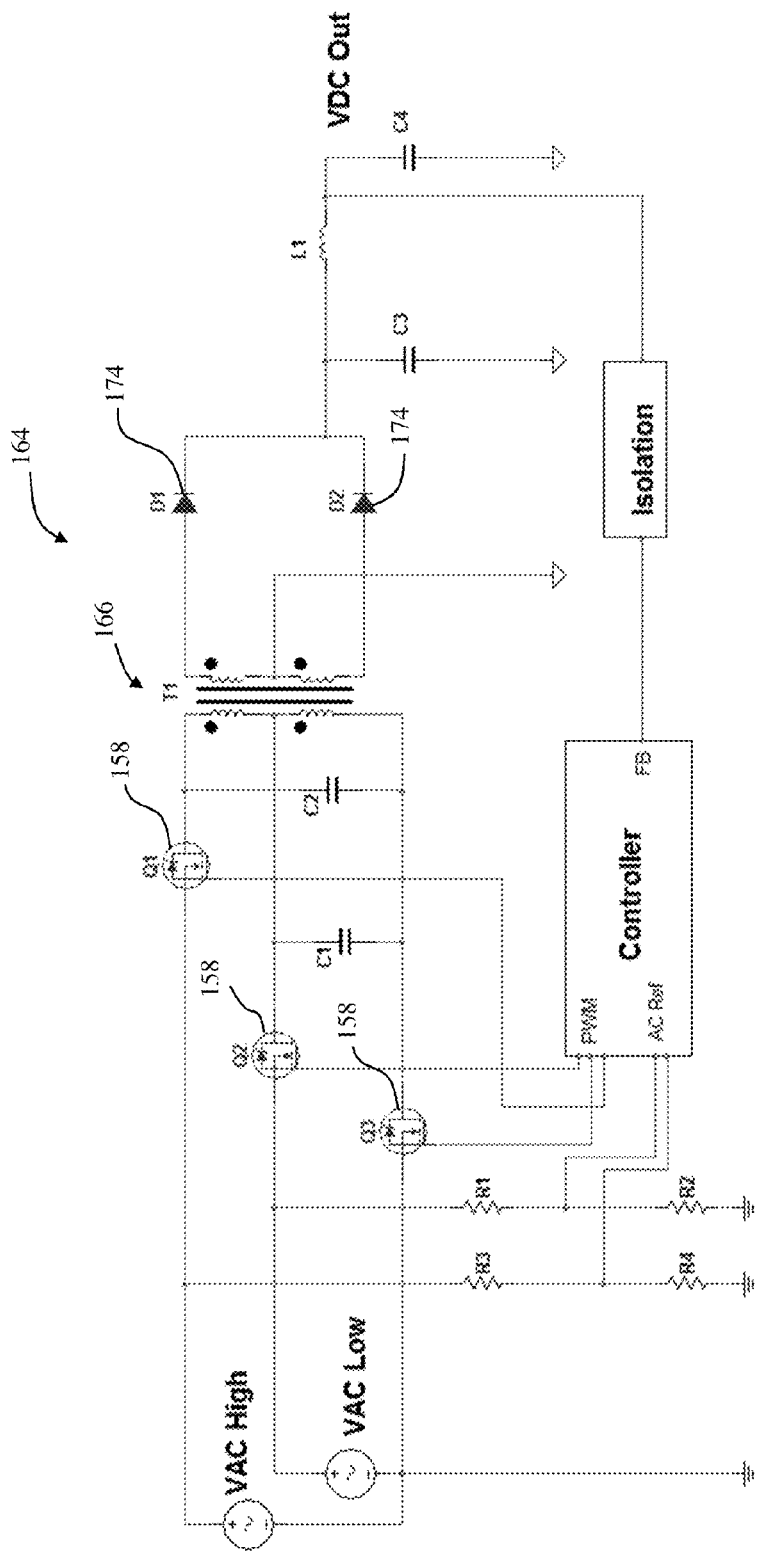

In the illustrated embodiment, the switching device 12 includes one or more BiDFETs 162 that are connected to the frequency dependant reactive device 14. In one embodiment, the power circuit 10 may include a transformer 166 that includes high-end tap 168, a center tap 170, and a low-end tap 172. The power circuit 10 may also include three BiDFETs 162 that are connected to each of the high-end tap 168, a center tap 170, and a low-end tap 172. The transformer 166 is center tapped, such that with the three BiDFETs 162 either as separate components or built as integrated into a single IC's permitting the conversion from either 240/260 VAC can be made (using the top tap on the transformer), and the conversion from 110/120 VAC can be made by utilizing the center tap on the transformer. As shown in FIGS. 44a and 44b, one of the BiDFETs 162, is a "common" BiDFET and the other two BiDFETs 162 are configured to receive inputs from both 110AC and 240AC, respectively. The power circuit 10 is configured to operate the BiDFETs 162 to receive input power at varying voltage levels. For example, the power circuit 10 may include a 110 VAC BiDFET 162 placed on the center tap 170, a 240 VAC BiDFET 162 at the high-end tap 168, and a common BiDFET 162 or ground on the low-end tap 172 of the transformer. This enables the power circuit 10 to generate the DC output power signal having a output voltage level (i.e. 6 VAC) at the same current regardless of which mains voltage is selected (110 VAC/240 VAC). In another embodiment, the switching device 12 may include two BiDFETs 162 (shown in FIG. 43) that are connected to the center tap 170 and the high-end tap 168. In addition, the BiDFETs 162 may also be used with transformerless circuits such as, for example, the power circuit 10 shown in FIGS. 2 and 33.

Referring to FIG. 53, in the illustrated embodiment, each BiDFET 162 includes two field effect transistors (FET) 158 that are connected in parallel back to back. In one embodiment, the BiDFET 162 includes one or more diodes 174 in their respective drains. The FETs 158 are selected as a function of a suitable breakdown voltage such as 650 volts for units designed to operate in a 120 VAC or 240 VAC environment. The diodes 174 are selected with the same breakdown voltage as the FETs 158. In addition, the diodes 174 are connected to the respective drains of each FET 158 and may be connected to the sources instead of drains. The diodes 174 are configured to protect the corresponding FET 158 from the high reverse voltage that could be extant via the AC inputs half cycle that is opposite of the BiDFETs 162 normal operating voltage. In one embodiment, the BiDFET 162 may include two MOSFETS back to back pointed in the opposite direction with each half of the BiDFET 162 having a forward biased diode in series with the drain. The point of the diode, if not incorporated into the BiDFET 162, is to protect the BiDFET 162 when there exist high level reverse voltages. In another embodiment, the BiDFET 162 may include an opto triac and/or two SCR's back to back. The opto triacs may be configured to vary the signal frequency, switch at high speeds, and be "turned-off". In another embodiment, the switching device 12 may include a combination BiDFET layout that includes one diode 174 attached to one of the BiDFET's drain with the other diode 174 placed off the source of the companion BiDFET 162.

In the illustrated embodiment, the BiDFET 162 is configured to be normally used in any location within the power circuit 10 that a Triac might be used, with the added advantage that the BiDFET 162 can be turned off. Thus, the BiDFET 162 does not have two drawbacks that Triacs possess. The BiDFET 162 can switch at high operating frequencies and may be turned off unlike Triacs which, when once turned on, can only turn off when the applied voltage is reduced to zero.

Figure 45A:
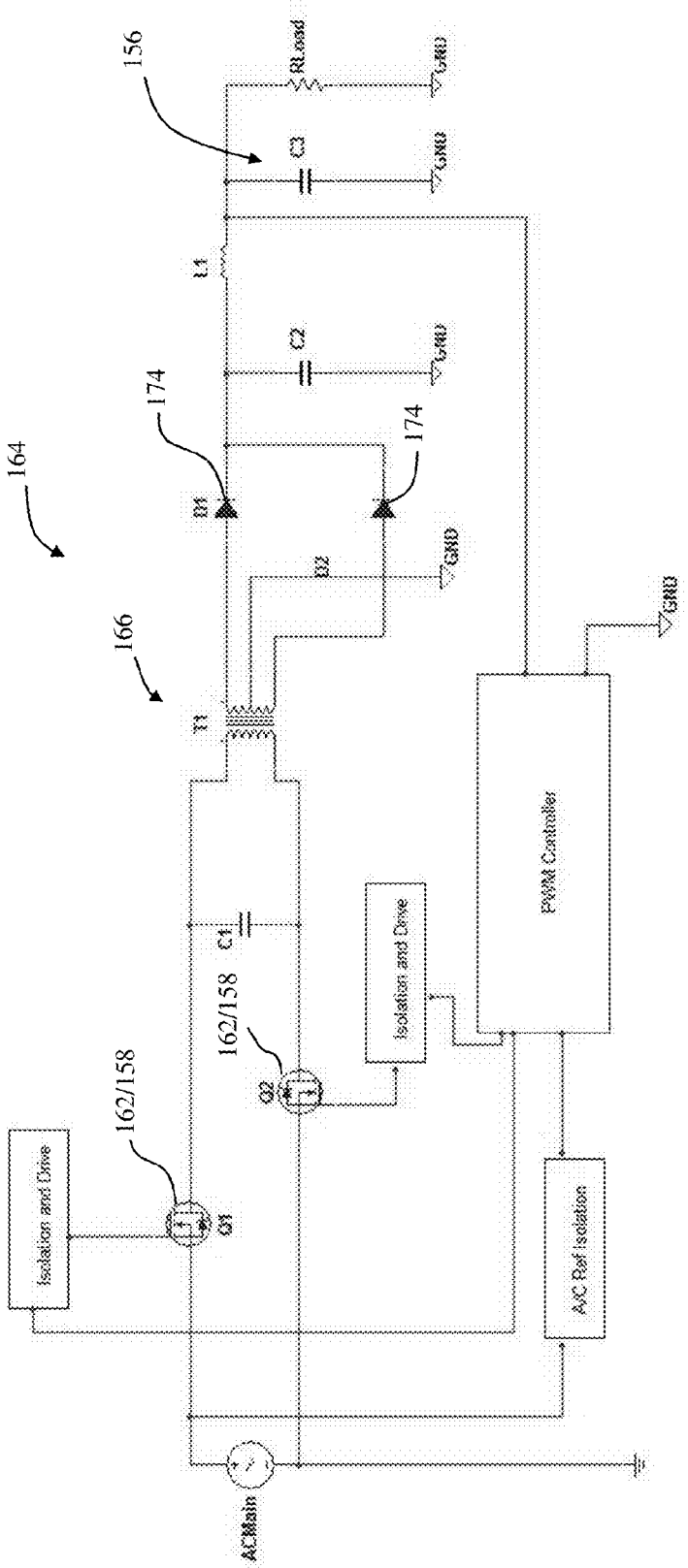
Figure 45B:
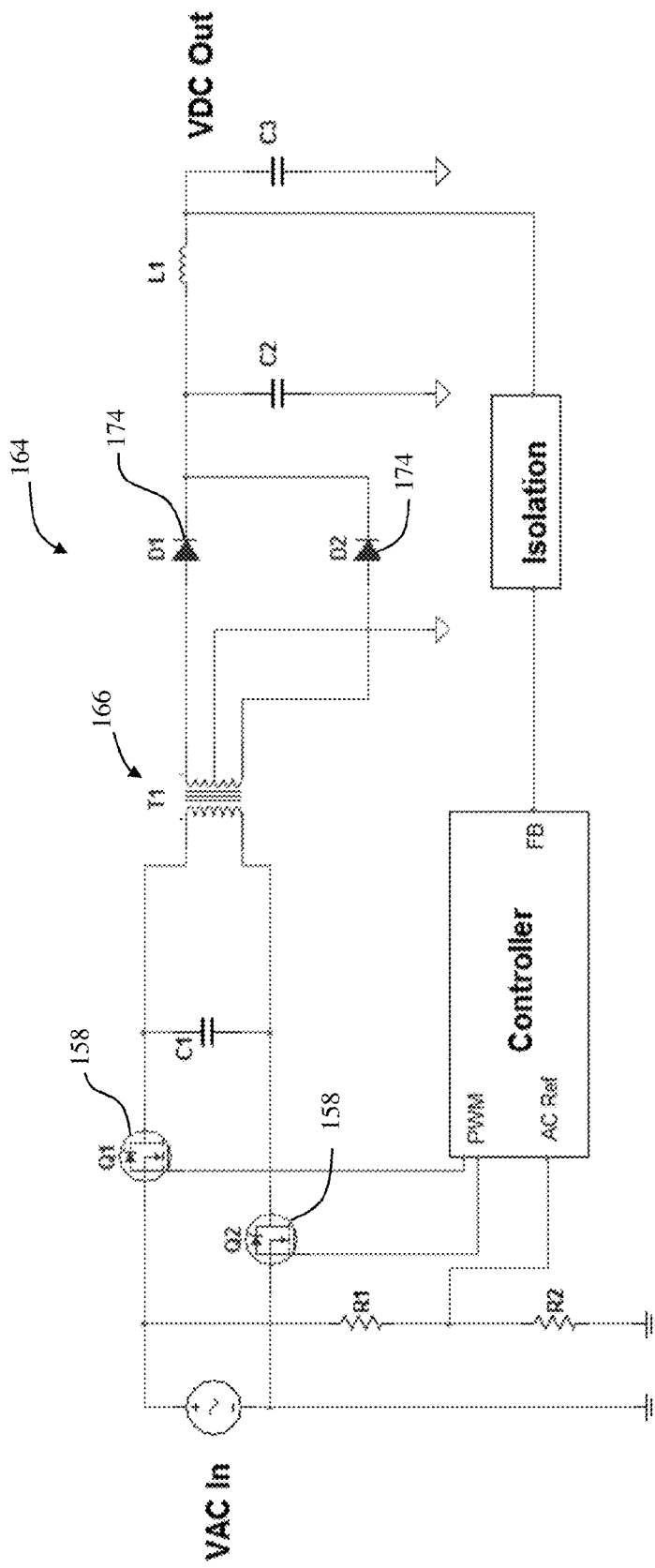
Figure 45C:
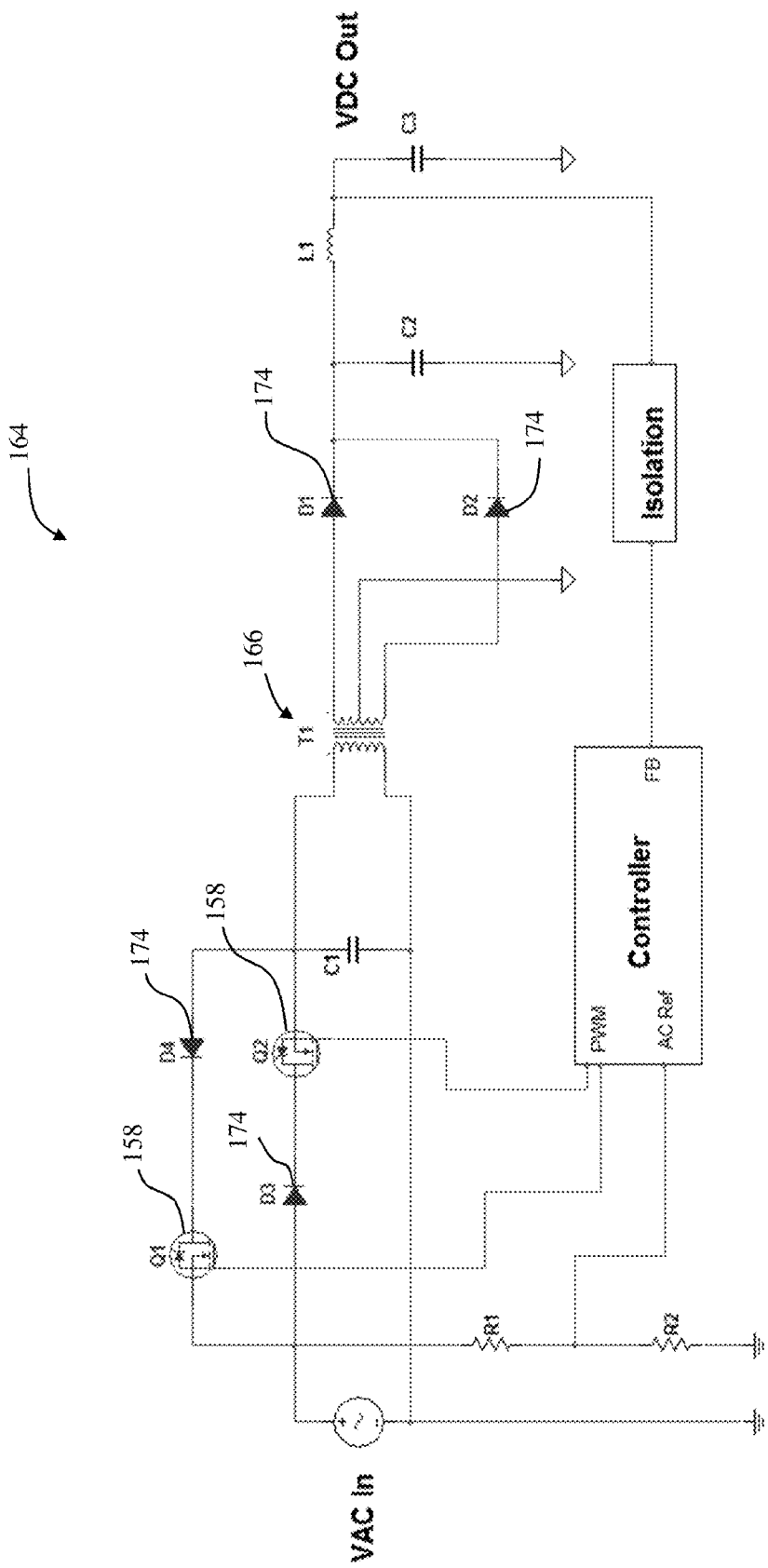
Figure 46:
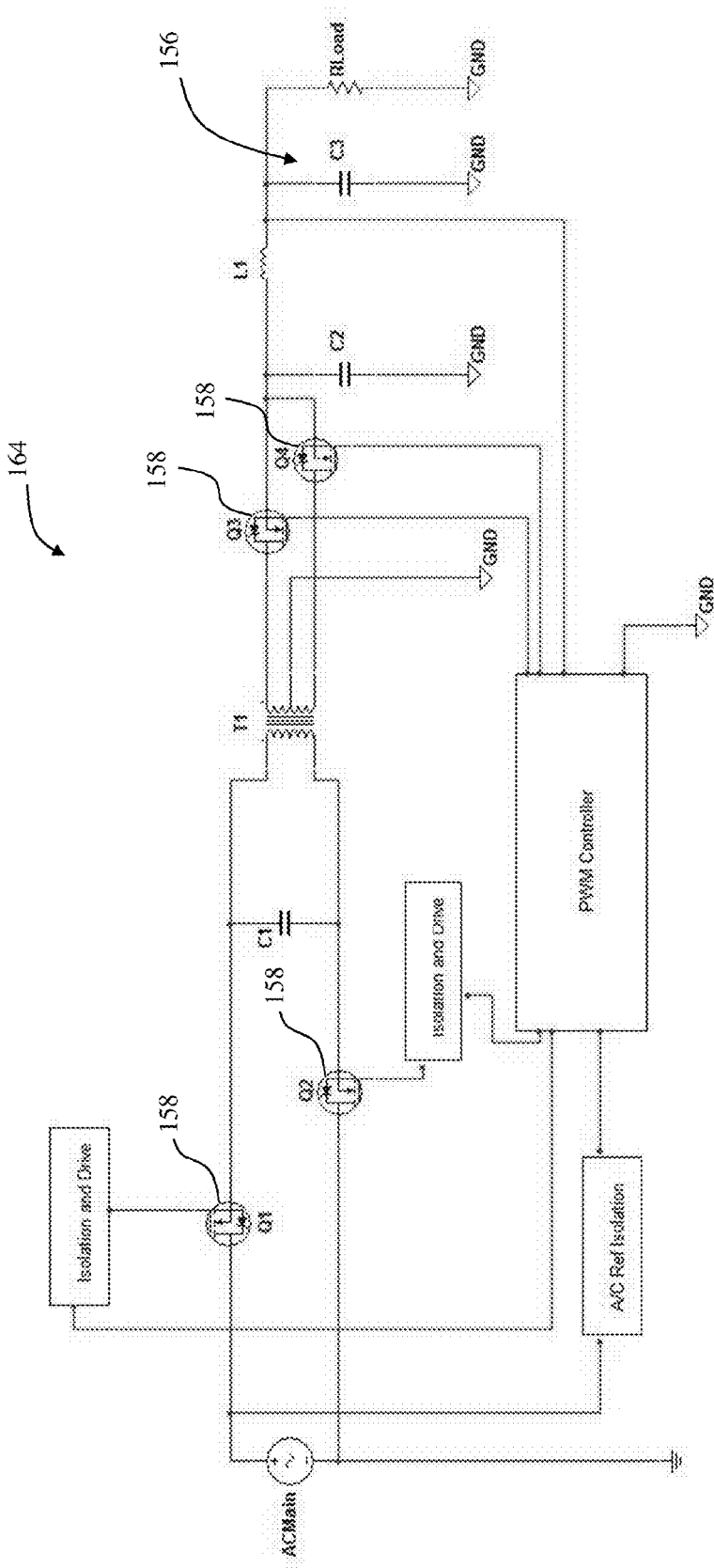
Figure 47:
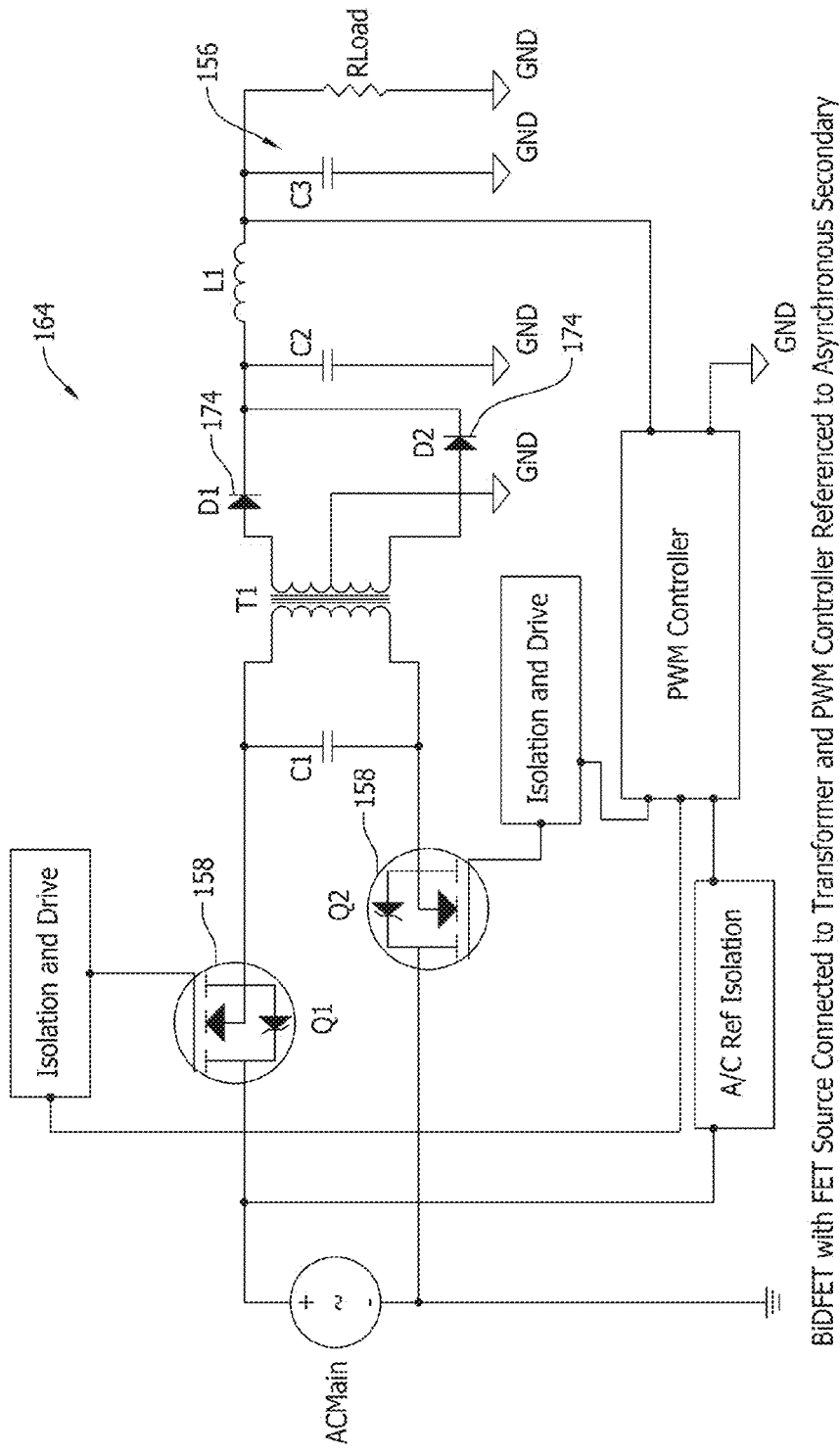
Figure 48:
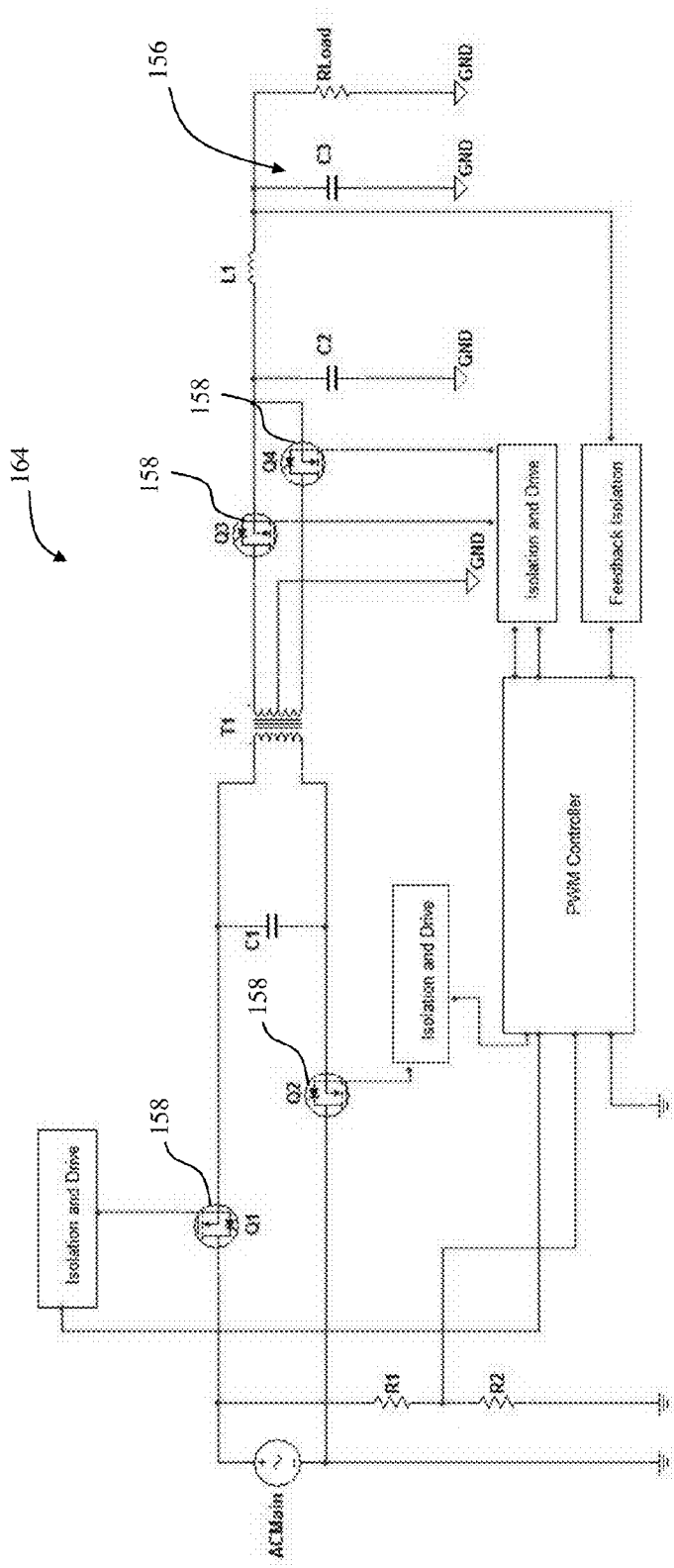
Figure 49A:
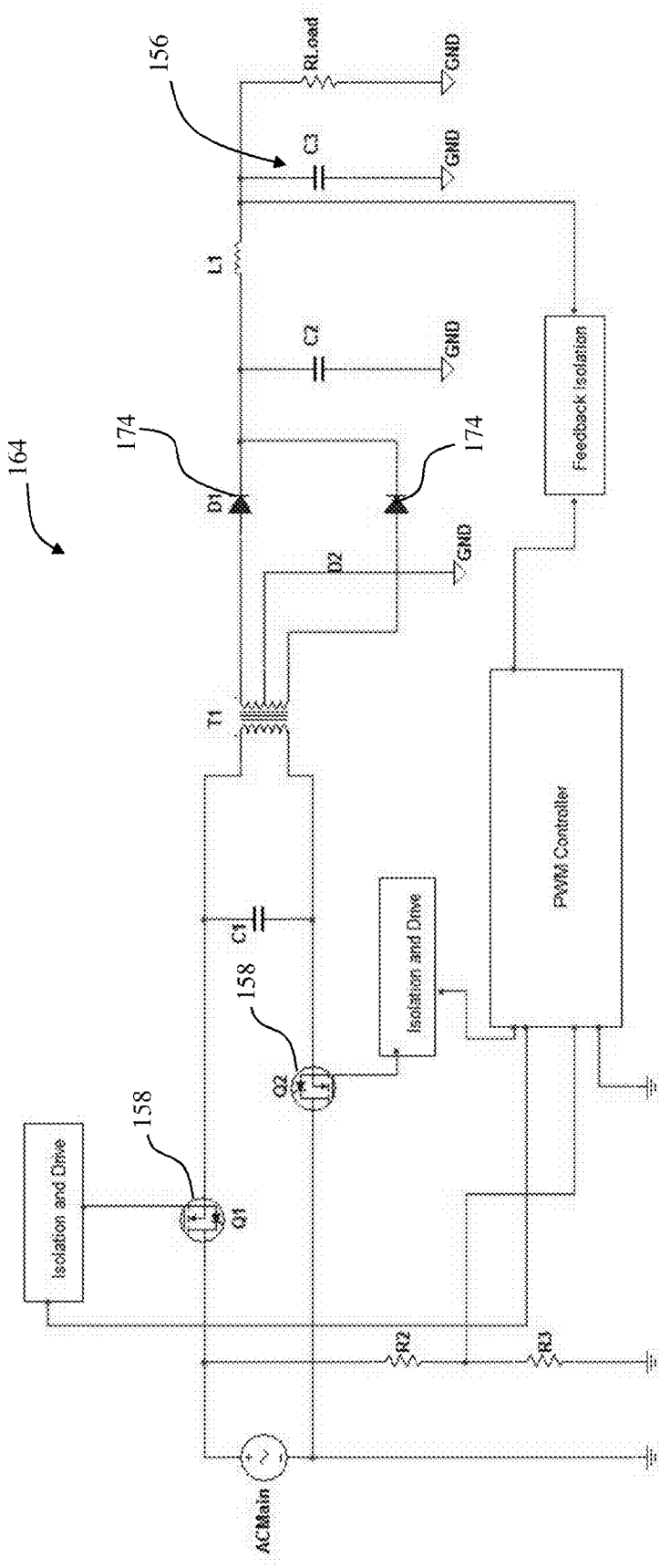
Figure 49B:
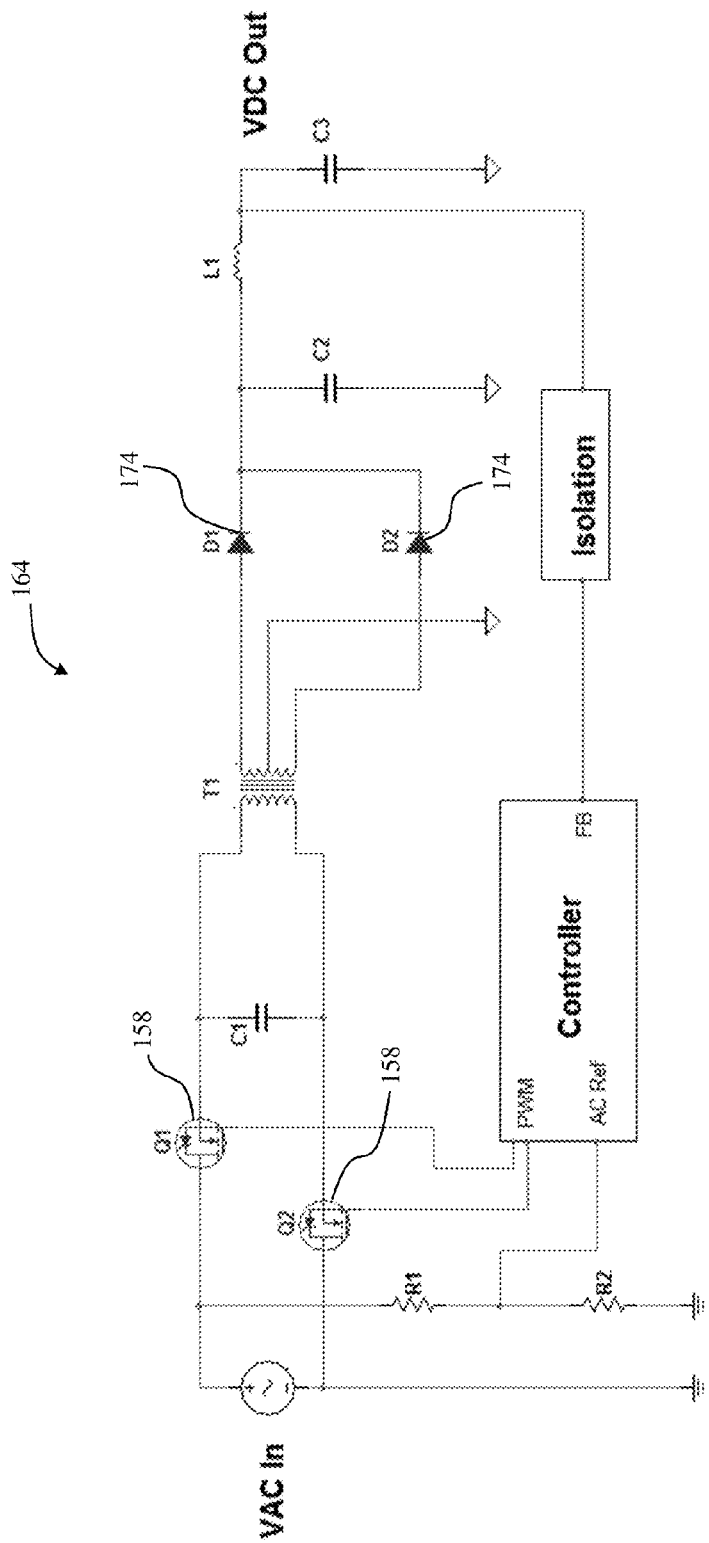
Figure 50A:
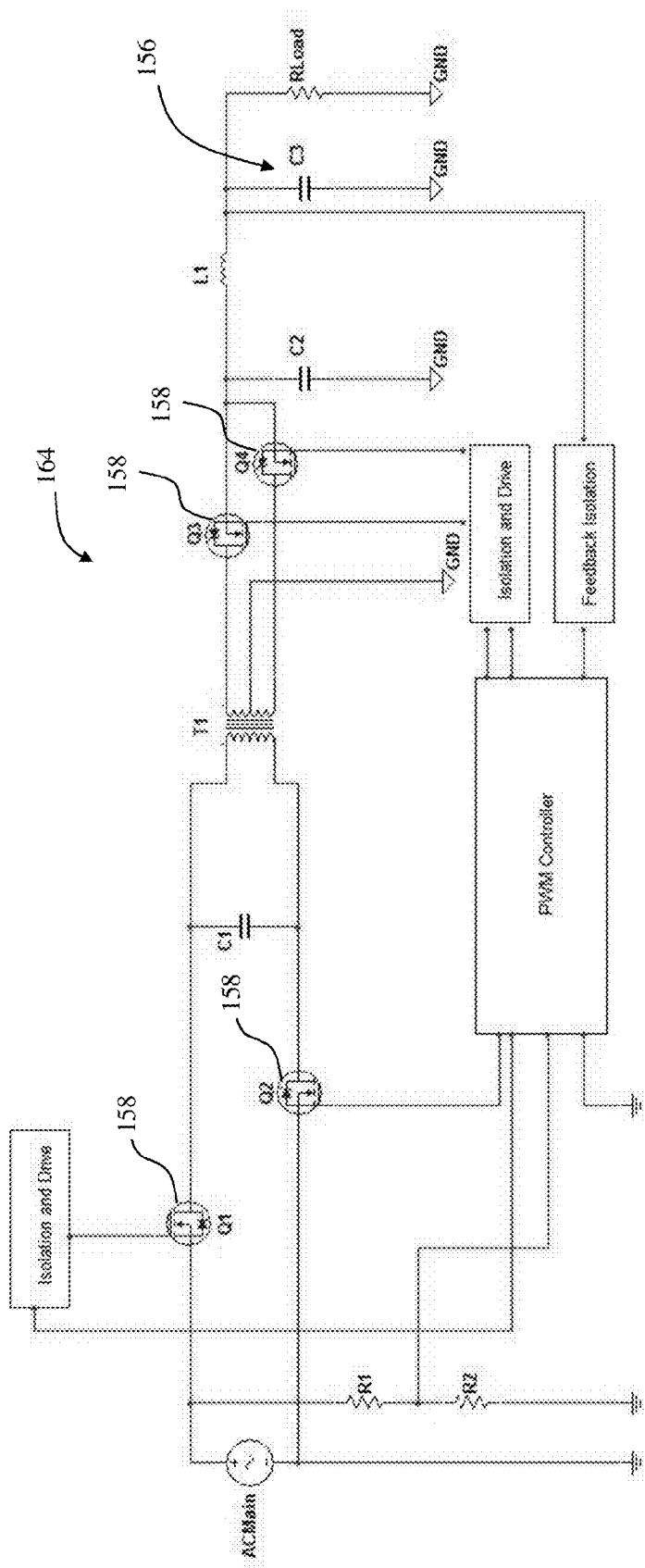
Figure 50B:
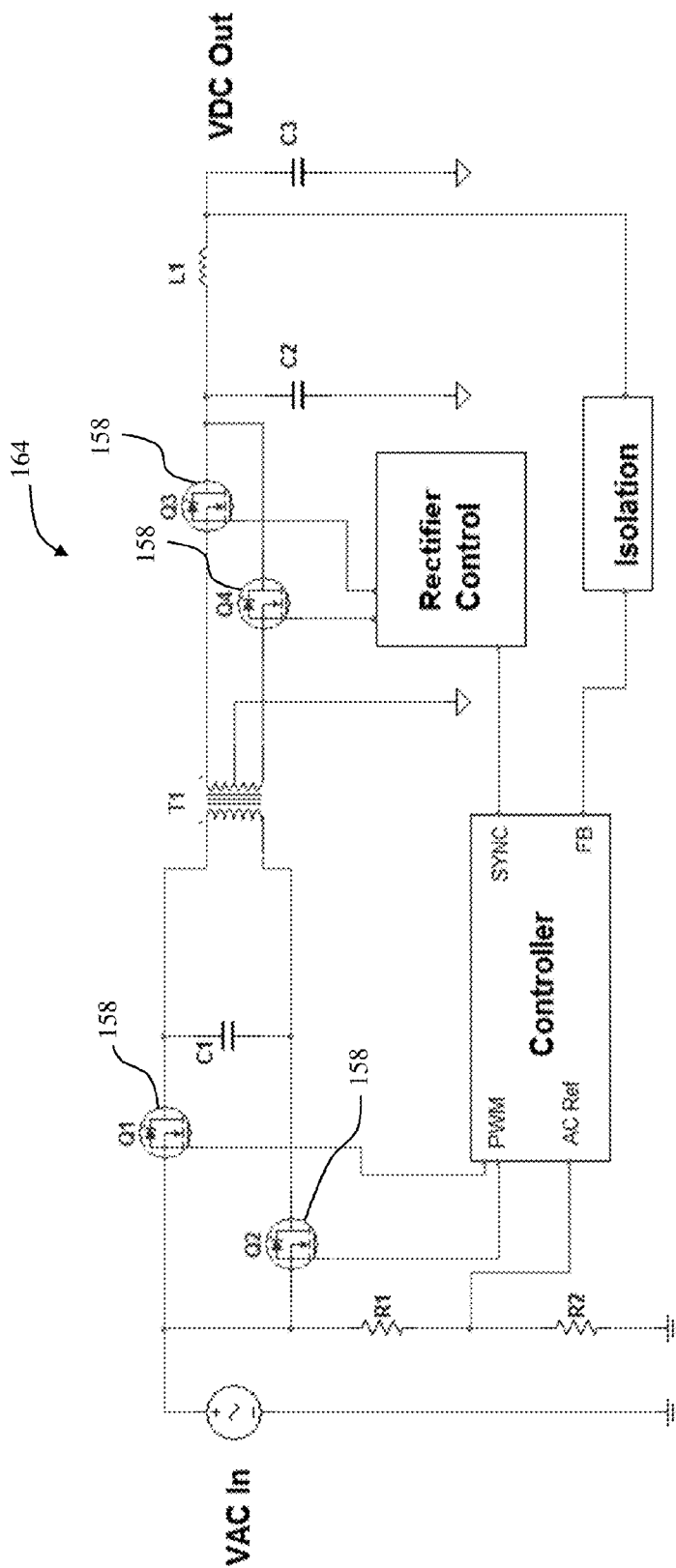

FIG. 44b is a schematic diagram of the BiDFET circuit 164 including a multi-tap transformer. FIG. 45a is a schematic diagram of the BiDFET circuit 164 including the BiDFET with FET source connected to the AC main, asynchronous secondary, and PWM controller referenced to secondary. FIG. 45b is a schematic diagram of the BiDFET circuit 164 including an asynchronous BiDFET with FETs blocking current from the transformer. FIG. 45c is a schematic diagram of the BiDFET circuit 164 including the BiDFET with single side switching. FIG. 46 is a schematic diagram of the BiDFET circuit 164 including the BiDFET with FET source connected to the transformer, synchronous secondary, and PWM controller referenced to secondary. FIG. 47 is a schematic diagram of the BiDFET circuit 164 including the BiDFET with FET source connected to the transformer and PWM controller referenced to asynchronous secondary. FIG. 48 is a schematic diagram of the BiDFET circuit 164 including the BiDFET with FET source connected to the transformer, synchronous secondary, and PWM controller referenced to primary. FIG. 49a is a schematic diagram of the BiDFET circuit 164 including the BiDFET with FET source connected to the transformer, asynchronous secondary, and PWM controller referenced to primary. FIG. 49b is a schematic diagram of the BiDFET circuit 164 with asynchronous BiDFET with FETs blocking current from AC source. FIG. 50a is a schematic diagram of the BiDFET circuit 164 including the BiDFET with FET source connected to the AC main, synchronous secondary, and PWM controller referenced to primary. FIG. 50b is schematic diagram of the BiDFET circuit 164 including synchronous BiDFET with FETs blocking current from the transformer. FIG. 51 is a schematic diagram of the BiDFET circuit 164 including the BiDFET with FET source connected to the AC main and PWM controller referenced to synchronous secondary. FIG. 52 is a schematic diagram of the BiDFET circuit 164 including the BiDFET with FET source connected to the AC main, asynchronous secondary, and PWM controller referenced to primary.

In one embodiment, the BiDFET 162 does not include a diode and the voltage reduction circuit 11 includes an 'N' channel FETs 158 that opposes the current on the high side of the transformer 166 and a diode 174 (shown in FIGS. 45a and 45b) on the low side of the transformer 166 (and similarly for the other half of the wave). As shown in FIGS. 45a and 45b, during operation, during the positive half of the wave FET Q1 is toggled at the switching frequency and FET Q2 is on and serves as a forward biased diode. In addition, a reverse biased FET can't be turned off because of the forward biased body diode, but it can be turned on even with current flowing backwards. So, if the FET is turned on then the result is a very small resistor in parallel with the diode so that as long as the $R_{DS(ON)}$ is lower than the effective resistance of the diode the diode drop is effectively removed as well, improving efficiency. In another embodiment, for increased efficiency, D1 and D2 are replaced with synchronous FETS (as shown in FIG. 46).

Figure 54:
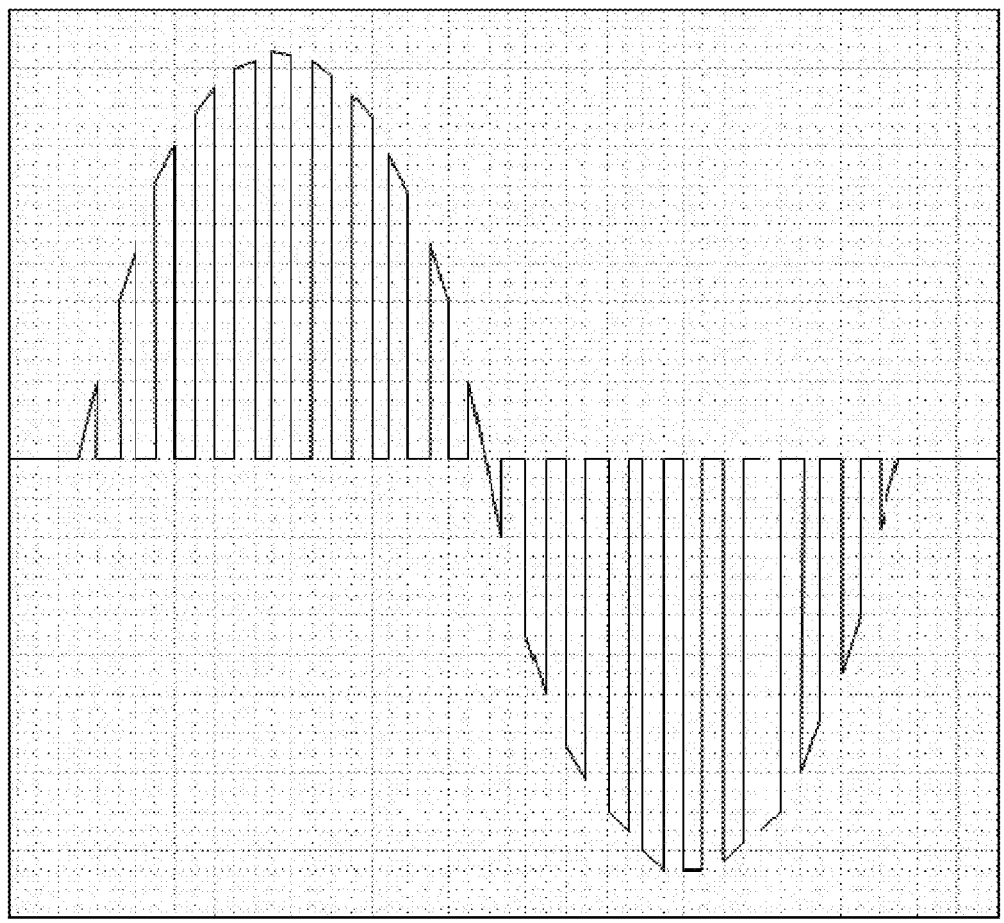
FIGS. 54 and 55 are graphic illustrations of the power output of the bi-directional field effect transistor shown in FIGS. 42-53, according to an embodiment of the present invention.
Figure 55:
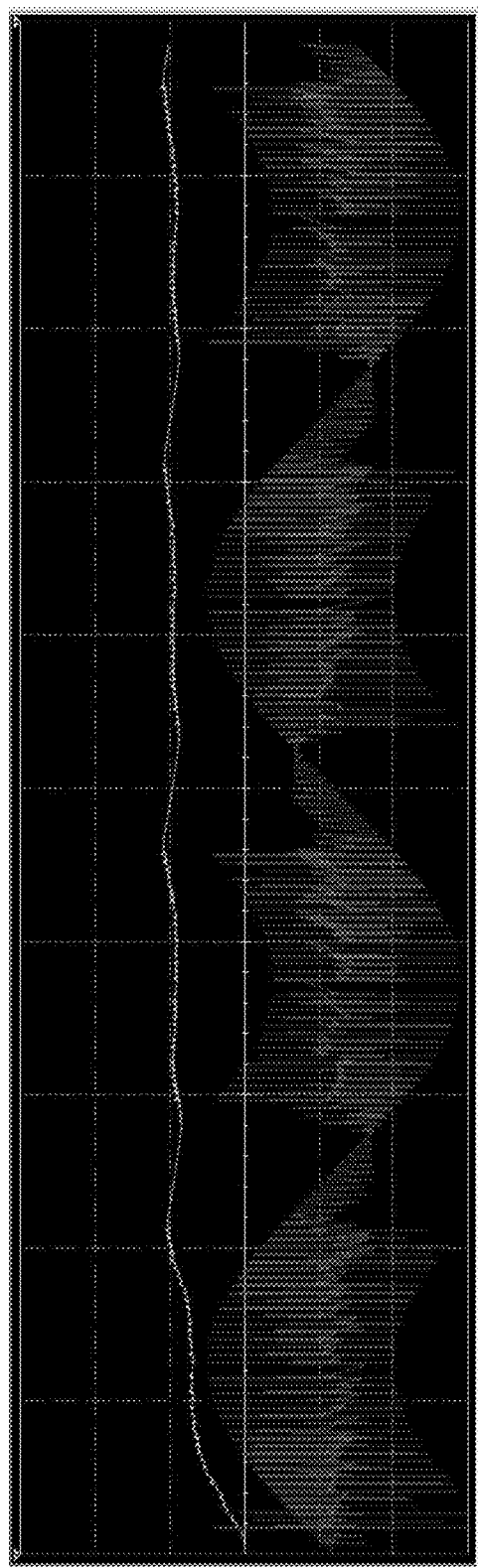

Referring to FIGS. 54 and 55 during operation, the BiDFET circuit 164 is configured to "chop up" a low frequency (50-60 cycle) AC voltage into much smaller segments by operating at a much higher frequency. For example, during operation an input AC power signal may be chopped into much finer pieces at a rate equal to about 50 to 60 Khz, or up to 1 Mhz or more if the switch losses are low enough to warrant such a faster chop rate. A higher BiDFET switching rate leads to smaller parts but higher switching losses. In addition, an operation of the BiDFET circuit 164 may be optimized to operate at an efficient frequency using the $R_{on}$ features of the BiDFET circuit 164.

FIG. 54 illustrates a "chopped" frequency wave generated by the BiDFET circuit 164 demonstrating that the BiDFET chops both the positive and negative segments of the sign wave. In addition, the control element 20 includes a PWM protocol enables the BiDFET to generate the "chops" narrow at the highest voltage and "fatter" closer to the zero point crossing, where the least energy exists in AC waveform. This minimizes the pulsating effect inherent in these chops on both the positive and negative segments of the sign wave.

In the illustrated embodiment, the power circuit 10 includes a high-speed AC switch, operated by a PWM signal from the control element 20 slicing both the positive and negative segments of a 50/60 sine wave. However, the BiDFETs are not limited to any specific frequency and could manage any given frequency at the right controller speed. In addition, in one embodiment, the BiDFETs 162 may be operated similar to fast Triacs (which are also AC switches but operate at relatively low speeds). The BiDFET 162 is a high-speed switcher including switching speeds within a range between about 50Kz-1 MHz, and/or greater than 1 MHz.

Referring to FIGS. 43-52, in the illustrated embodiment, the two BiDFETs 162 are directly controlling the AC Mains input instead of a full wave bridge rectifier and large filter capacitor. This reduces initial intake parts count and defers the AC/DC conversion to the isolated (low power) side of the circuitry, as is customary; resulting in an energy savings though reduced part count and rectification on the lower voltage side of the circuit. In addition, even though there is not a true "continuous" current (due to the low current at zero crossovers) the power circuit 10 includes one or more final capacitors 156 that store the energy. This final capacitor 156 is sized to hold sufficient current between AC cycles for the desired constant output current, and further minimizes or erases any current diminishment due to the lower energy at the zero crossings.

The power circuit 10 also includes a simplified driver circuit because one BiDFET at a time is driven on the cycle being sliced, and the other just "flaps in the breeze" without energy loss when its cycle is not extant. For example, during operation, when the AC is positive, it will all go through one-half of the BiDFET (top FET(s)), when the AC turns negative, it will go through the other half of the BiDFET (bottom FET(s)). In addition, the AC at the output not being "continuous" is not a problem, because a capacitor and/or a super capacitor will be placed on the secondary, which, when sized right for the output voltage, will, itself, sustain constant DC for the power output required. In a complete system, this is an advantage as the feedback loop, and current sense loop can control the BiDFET System, which will work with slow PWM switching stand-by power, thus permitting high energy efficiencies on diminishing (almost fully charged) loads and/or no load (momentary "wake-up" to sense and sustain the load/connection).

Figure 56:
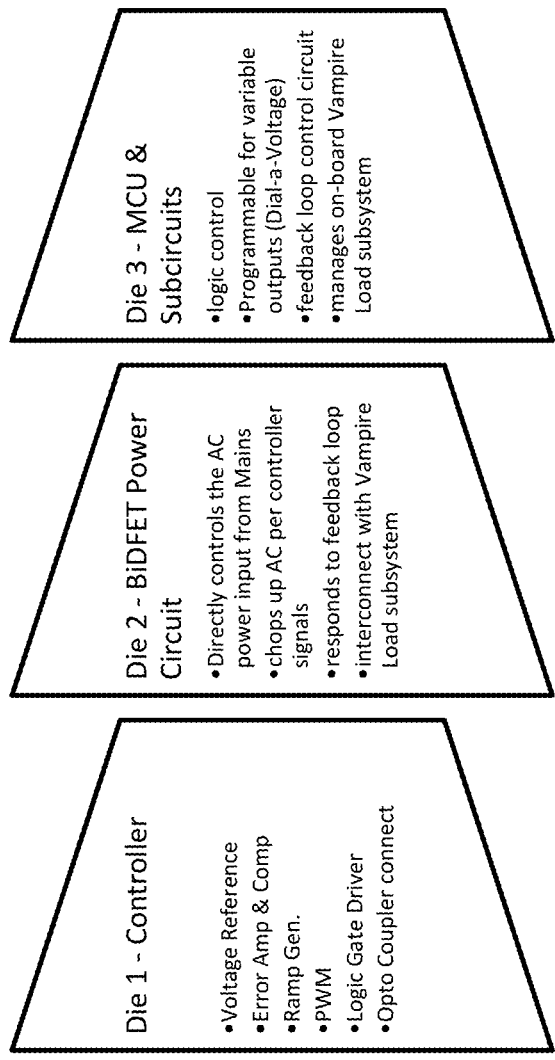
FIG. 56 is a block diagram of a process for manufacturing the power circuit shown in FIGS. 42-53, according to an embodiment of the present invention.

FIG. 56 is a block diagram of a process that may be used to manufacture the power circuit 10 shown in FIGS. 42-53 as integrated into a hybrid package. In the illustrated embodiment, the BiDFET circuit would contain its "Controller/Driver" (Die 1) and incorporate an opto coupler to allow any external control to be a logic level and isolated from any of the voltages that the BiDFETs are controlling. The BCD process could be used for this integration. The Controller will be powered by an internal power supply on the die. In one embodiment, the BiDFETs may be packaged using only a single BiDFET die in package.

Figure 57:
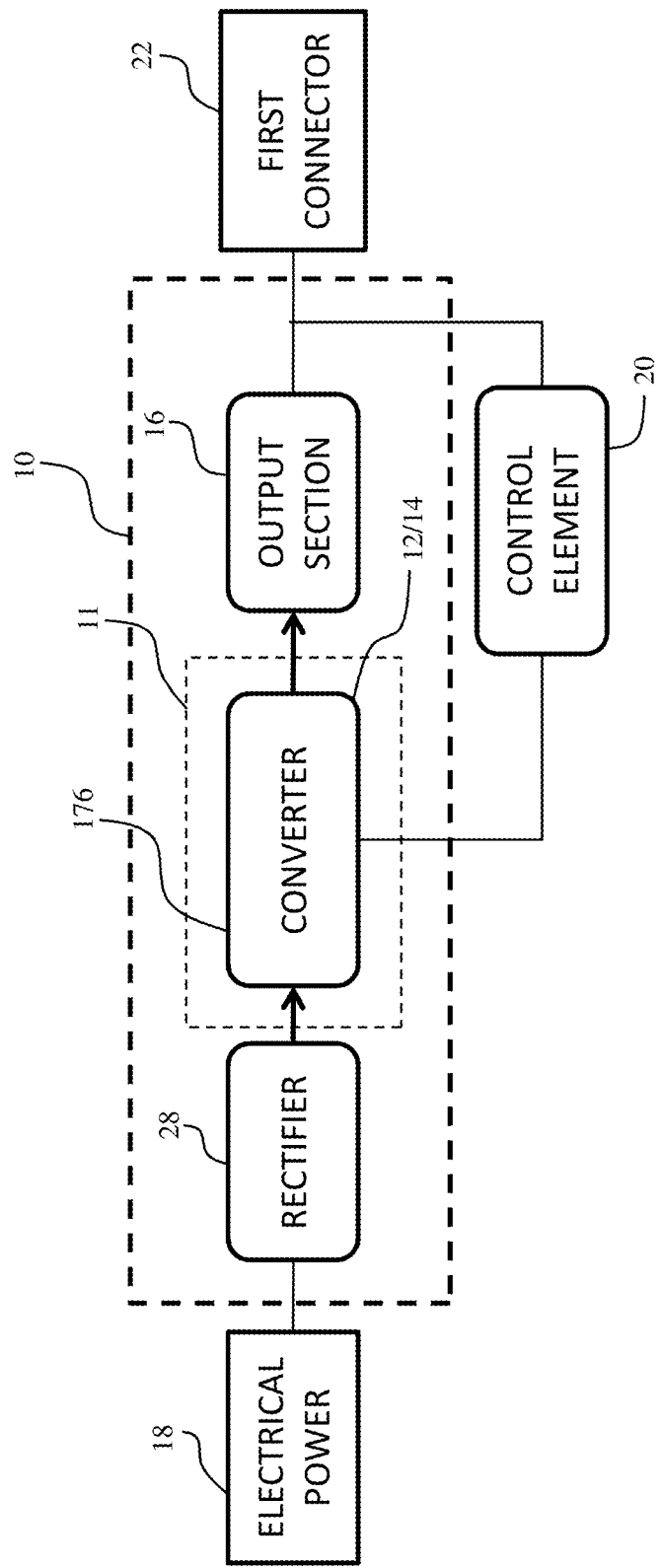
FIG. 57 is another block diagram of the power circuit shown in FIG. 1, according to an embodiment of the present invention.

FIG. 57 is another block diagram of the power circuit 10 including a modified converter 176, according to an embodiment of the present invention. In the illustrated embodiment, the power circuit 10 includes a rectifier circuit 28 connected between the voltage reduction circuit 11 and the power source 18. In addition, the voltage reduction circuit 11 includes a modified converter 176 that includes the switching device 12 and the frequency dependent reactive device 14. In the illustrated embodiment, the rectifier circuit 28 is configured to generate a modified AC power signal from the AC input power signal received from the power source 18. The modified converter 176 is configured to receive the modified AC power signal at an input voltage level from the rectifier circuit 28 and generate a DC output power signal at an output voltage level that is less than the input voltage level. More specifically, the rectifier circuit 28 receives the AC input power signal at the input voltage level from the power source 18 and generates the modified AC power signal. The control element 20 operates the modified converter 176 to reduce the input voltage level and generate the DC output power signal at the output voltage level from the received modified AC power signal.

In one embodiment, the power circuit 10 may including the following AC to DC supplies that are designed to provide low voltage DC output (typically 5 VDC) from an AC mains supply (typically 120 VAC (US) to 264 VAC[EU/Asia]). These systems as described below consist of main subsystems, including:

[1.] Preprocessing, usually using a Full Wave diode bridge and a filter capacitor to convert the AC input voltage into a DC voltage.

[2.] Conversion/Switching, using one of various schemes to convert the high input voltage to a much lower output voltage. Often this takes the voltage from DC to AC.

[3.] Rectification, re-converting the AC to DC.

[4.] Post processing/Output, modifying the output of the conversion process. This output is usually an AC voltage which must be changed into a DC output voltage.

The power circuit 10 may include unique combinations of these subsystems to produce superior power supplies designed for low voltage battery charging and other power supply services from conventional AC mains sources available throughout the world.

The conversion process is the central subsystem about which the pre and post processing subsystems are wrapped. These subsystems usually consist of one of the following:

[1.] Push-Pull

[2.] Ç UK (named after its originator, Slobodan Ç uk)

[3.] SEPIC (Single-ended primary-inductor converter)

These subsystems will be described below along with the various pre and post processing methods utilized to deliver fully functioning power supply.

Figure 58:
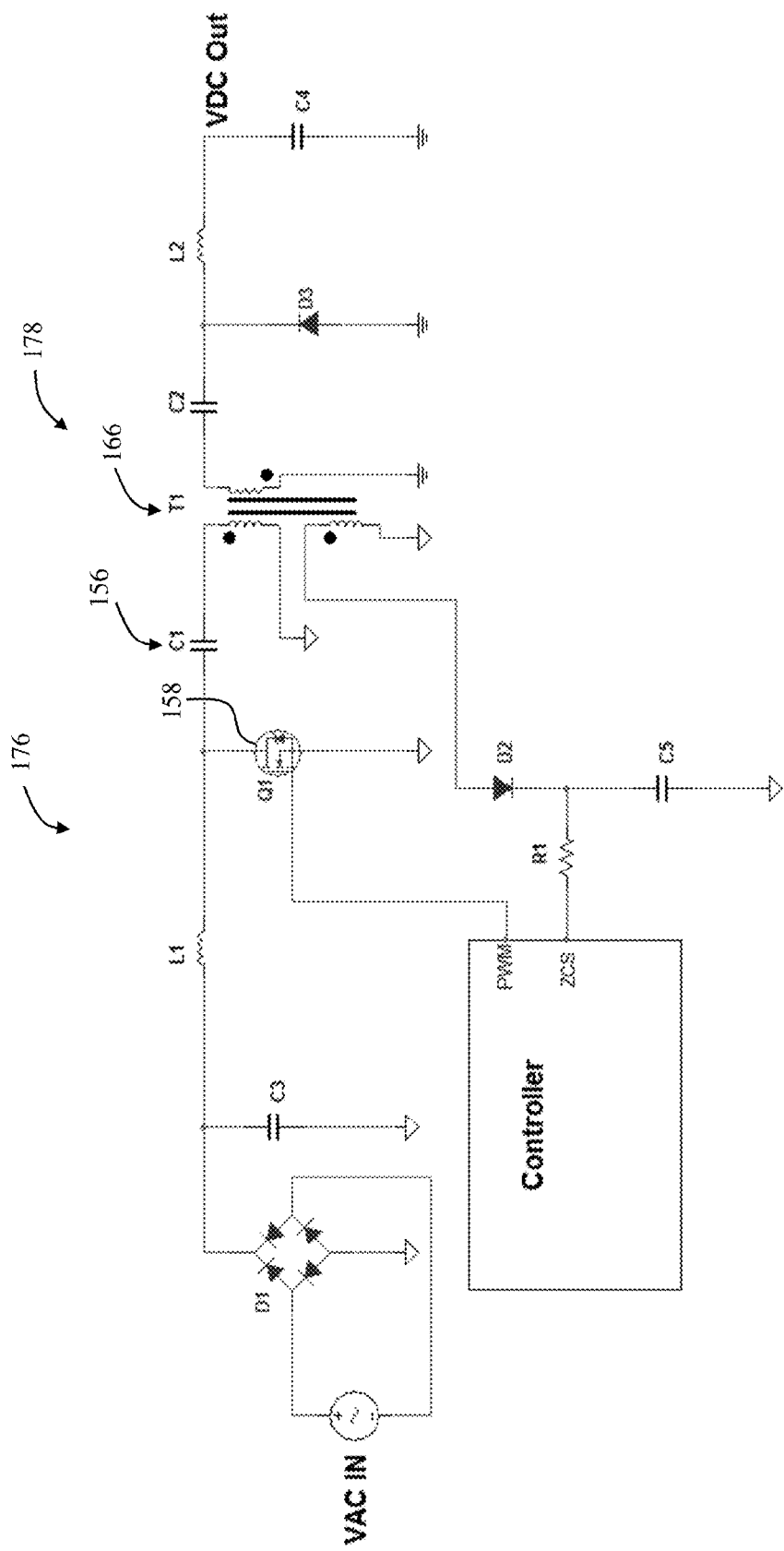
FIGS. 58-60 are schematic diagrams of the power circuit shown in FIG. 57, including a modified Çuk converter, according to an embodiment of the present invention.
Figure 59:
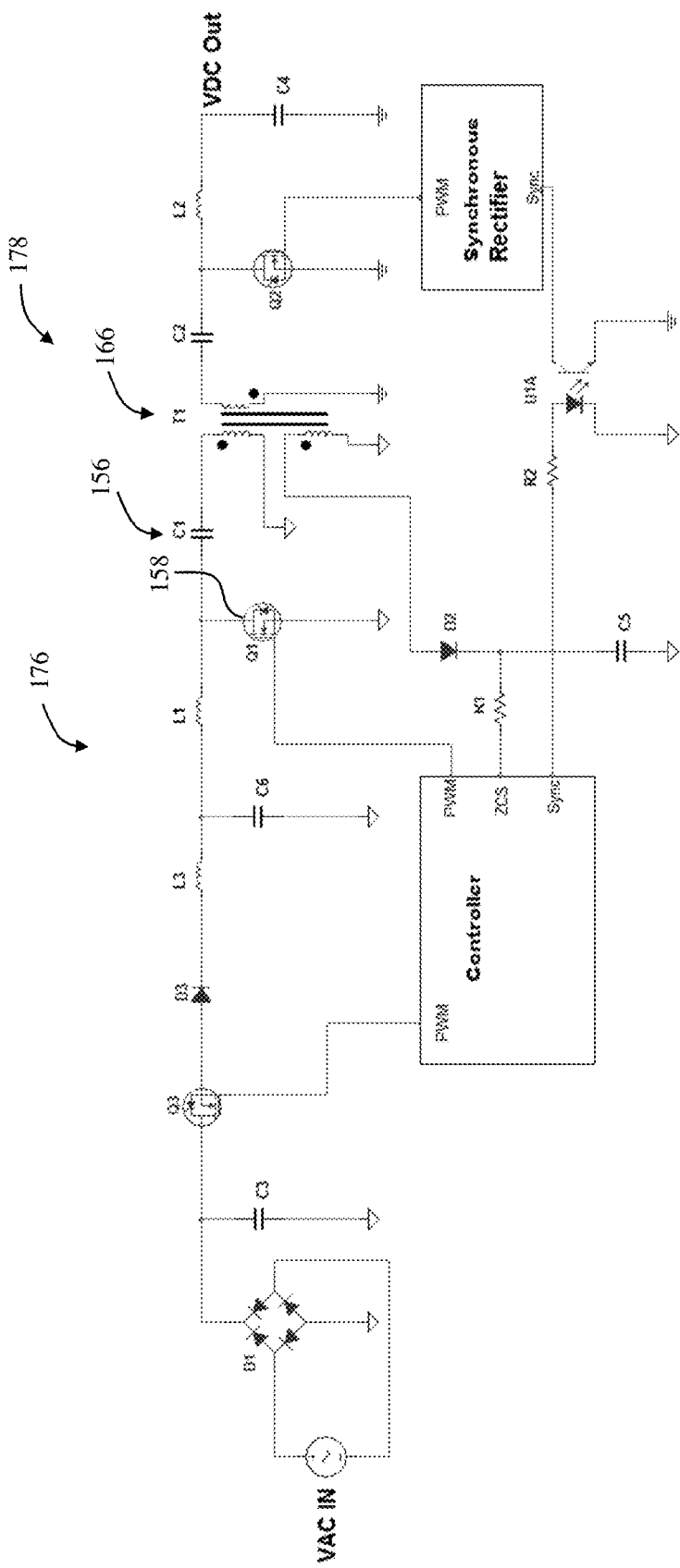
Figure 60:
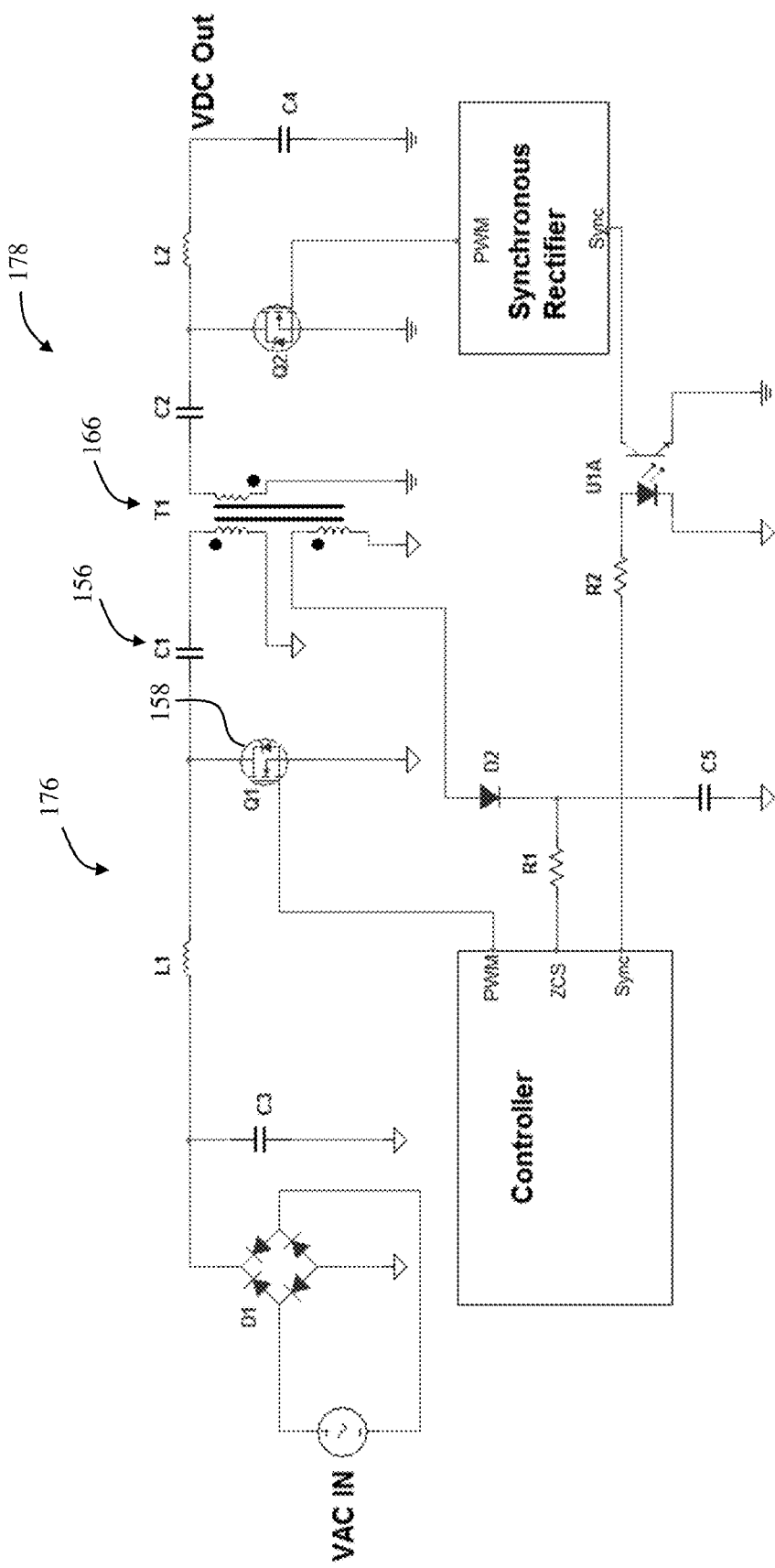

FIGS. 58-60 are schematic diagrams of the modified converter 176 including a modified Ç uk converter 178. FIG. 58 illustrates an asynchronous modified Ç uk converter, FIG. 59 illustrates a synchronous modified Ç uk converter with quasi-resonant front end, and FIG. 60 illustrates a synchronous modified Ç uk converter.

In contrast to known non-isolated and isolated Ç uk converters that are used for DC-DC conversions, the modified Ç uk converter 178 is configured for AC-DC conversions using rail voltage which is reduced down to, for instance, 5V at the desired current. In the illustrated embodiment, the modified Ç uk converter 178 includes a high frequency transformer 166. In addition, the modified Ç uk converter 178 may include an Asynchronous Rectification circuit (shown in FIG. 58) or a Synchronous Rectification circuit (shown in FIGS. 59 and 60). In the illustrated embodiment, the modified Ç uk converter 178 includes a single FET 158 on the top side and a capacitor 156 as the main energy-storage component.

In one embodiment, the modified Ç uk converter 178 control is identified as $V_{out}/V_{in}$=duty cycle/(period−duty cycle). This is how the main FET 158 is driven in the modified Ç uk converter 178. Feedback is provided so that if the output voltage is too low, the duty cycle increases. Conversely, if the voltage is too high the duty cycle is decreased. Another advantage of the modified Ç uk converter 178 is that the relation between the output and input voltage is D/(1−D), where D is the duty cycle. For a given transformer 166, the output voltage may be increased or decreased as required so that the Dial-A-Voltage features, as described herein, may apply. Also, because of the relationship of the input to output voltage with respect to the duty cycle, the output can be adjustable.

Figure 61:
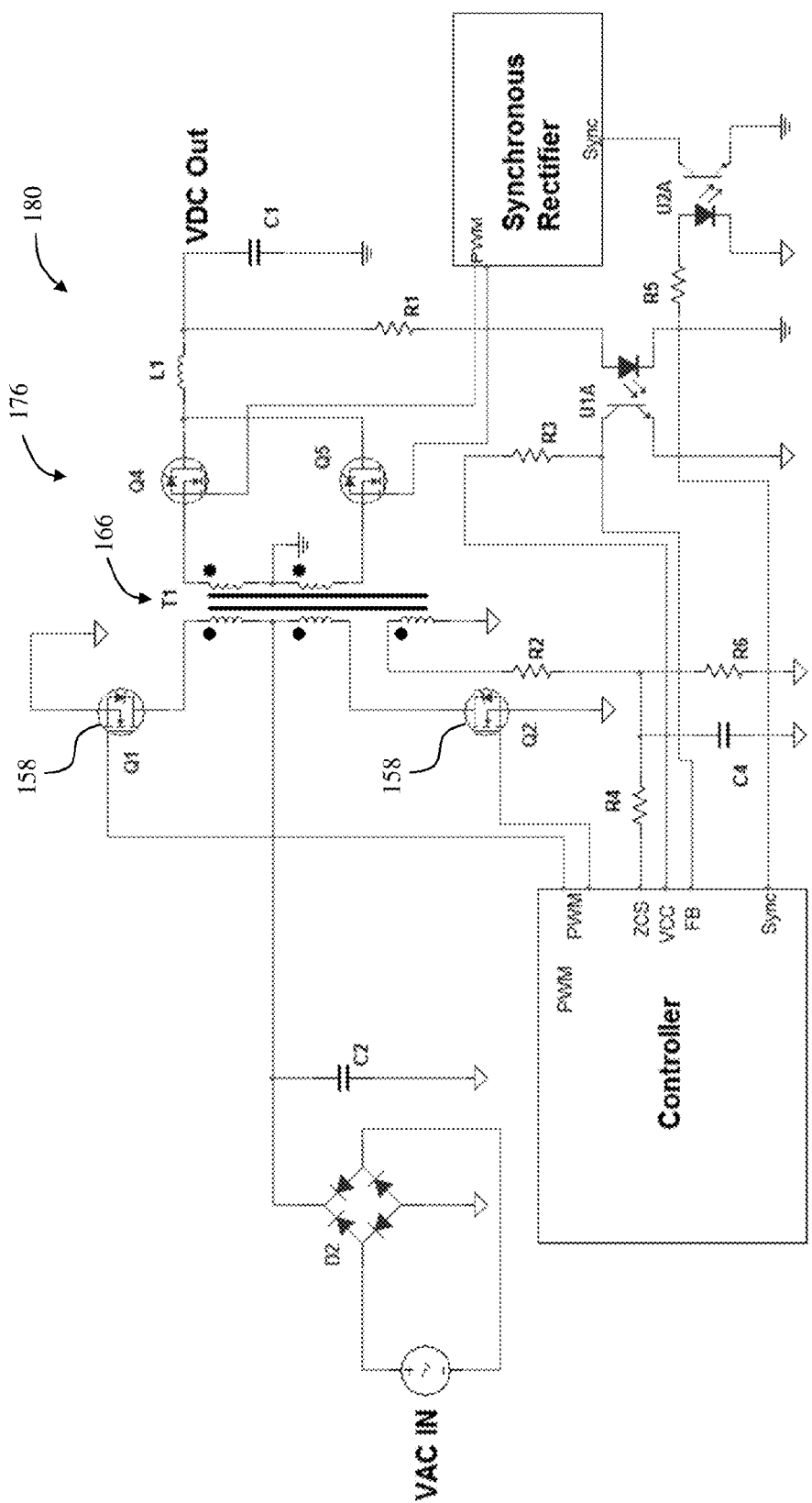
FIGS. 61-63 are schematic diagrams of the power circuit shown in FIG. 57, including a modified Push-Pull converter, according to an embodiment of the present invention.
Figure 62:
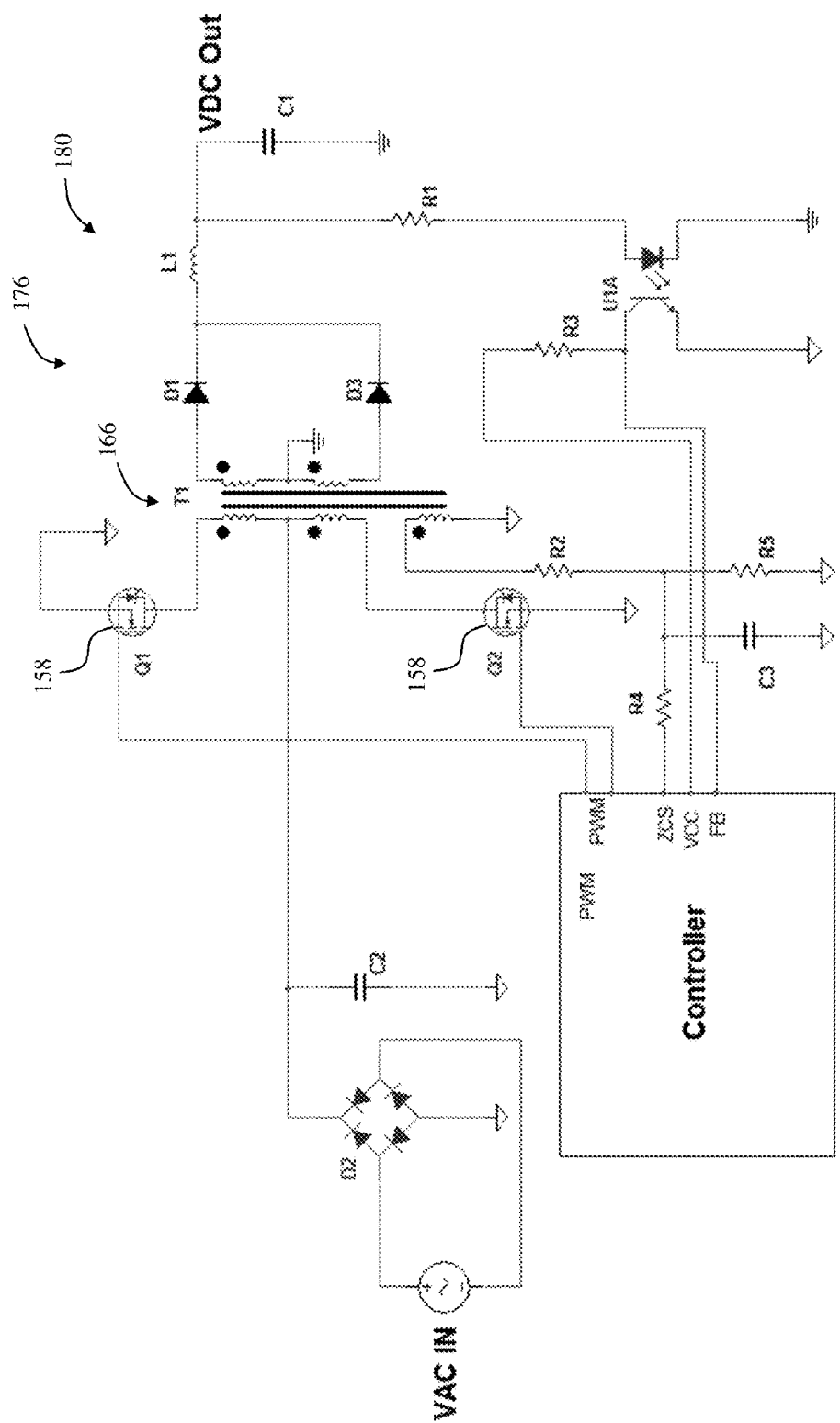
Figure 63:
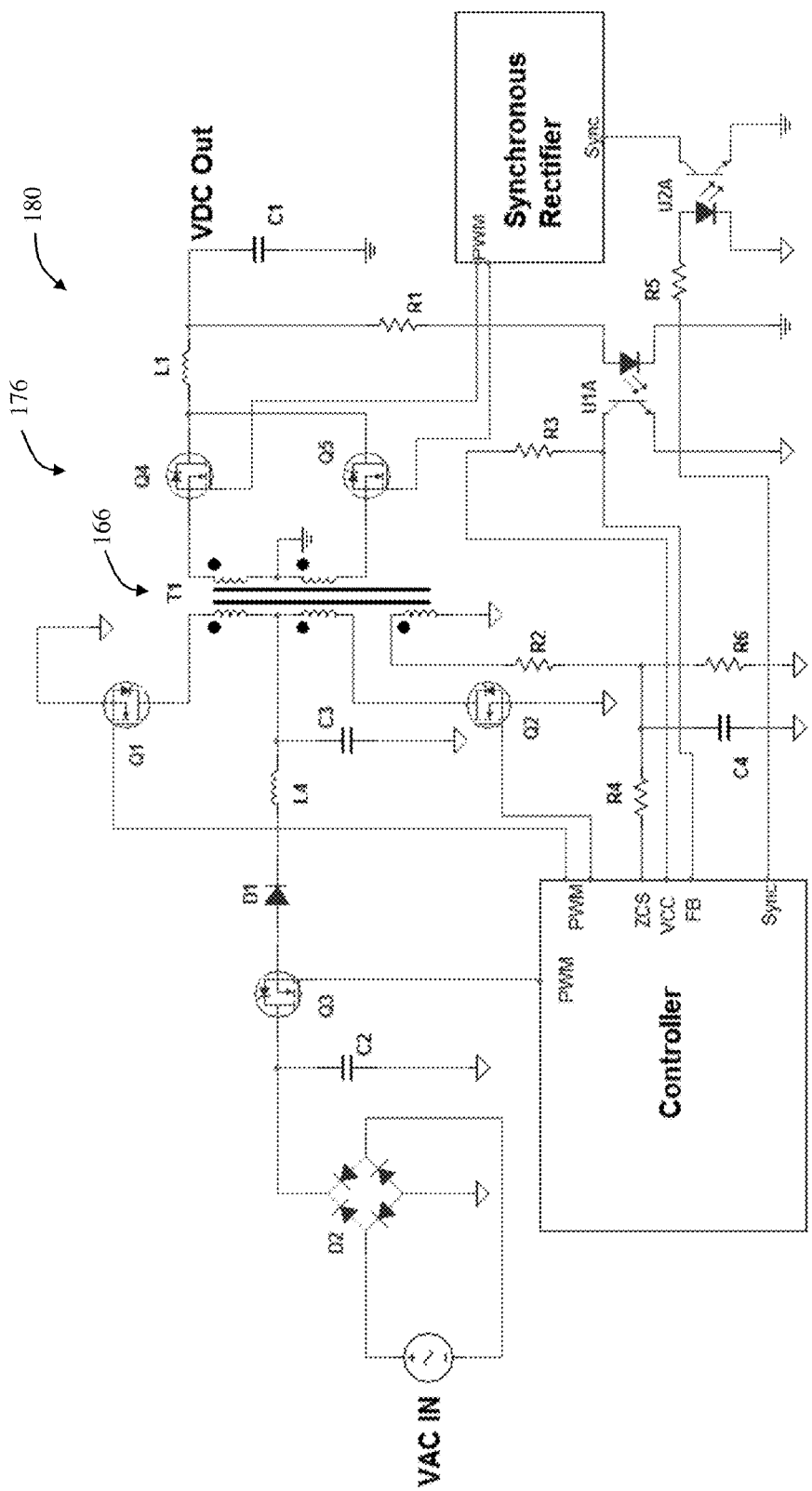

FIGS. 61-63 are schematic diagrams of the modified converter 176 including a modified Push-Pull converter 180. FIG. 61 illustrates a synchronous modified Push-Pull converter, FIG. 62 illustrates an asynchronous modified Push-Pull converter, and FIG. 63 illustrates a synchronous modified Push-Pull converter with quasi-resonant front end.

Known Push-Pull conversion topology has been known in the industry and is exclusively used for DC-DC conversions. In contrast, the modified Push-Pull converter 180 is configured for AC-DC conversion from rail voltages down to 5V capable of producing 10 to 12 Watts. In one embodiment, the modified Push-Pull converter 180 includes a high frequency transformer 166. In addition, the primary side of the transformer 166 is center tapped with the rectified high voltage attached to the center tap. In addition, the modified Push-Pull converter 180 includes a pair of FETs 158 that alternate pulling the current through the each side of the primary winding (hence the name push-pull) of the transformer 166. Since the magnetic flux switches direction with the push pull, the voltage on the secondary will also switch direction. Therefore, a center tapped secondary is taught because when the flux is flowing in one direction the top half of the secondary will be positive. Likewise, when the flux reverses, the lower side will produce a positive voltage. The two switches on the secondary (diodes, or transistors) then control the flow from each half of the secondary winding so that current from the output flows only one way producing a DC output.

The modified Push-Pull converter 180 includes FETs 158 on either side of the transformer primary that are configured to be pulled low by the PWM process at opposite times. The modified Push-Pull 180 control of the circuit is as follows. The FETs on either side of the transformer primary will be pulled low by the PWM process at opposite times. When the output voltage falls below a certain threshold the first FET will turn on for a fixed time and then turn off. Next, after a predetermined dead time, the second FET will turn on for a fixed time and then turn off. After the second FET turns off, the system enters a rest time relative to the output current desired or the time needed to transfer enough energy to the load to cause the output voltage to drop below a certain threshold (the higher the current, the rest time reduces, and the lower the output current, the greater the rest time). The process would repeat when the secondary side voltage decreased below said threshold.

Referring to FIG. 62, in one embodiment, the modified Push-Pull converter 180 includes an Asynchronous Rectification circuit that includes a diode that is configured as a clamping mechanism to prevent the backflow of electricity from the transformer. The diode may be a super barrier diode, due to its high blocking abilities, with low energy losses. Referring to FIGS. 61 and 63, in another embodiment, the modified Push-Pull converter 180 may include a Synchronous Rectification circuit. The synchronous FET(s) is(are) turned on by the controller when the voltage across the FET will allow current to flow to the output of the converter, and is(are) turned off to block the flow of current back through the converter, preventing current to backflow to the transformer. In the Synchronous modified Push-Pull converter 180 (shown in FIGS. 61 and 63), the FET(s) replace diodes and provide increased efficiency as the $R_{on}$ features of a FET provide a lower power loss than a diode.

Figure 64:
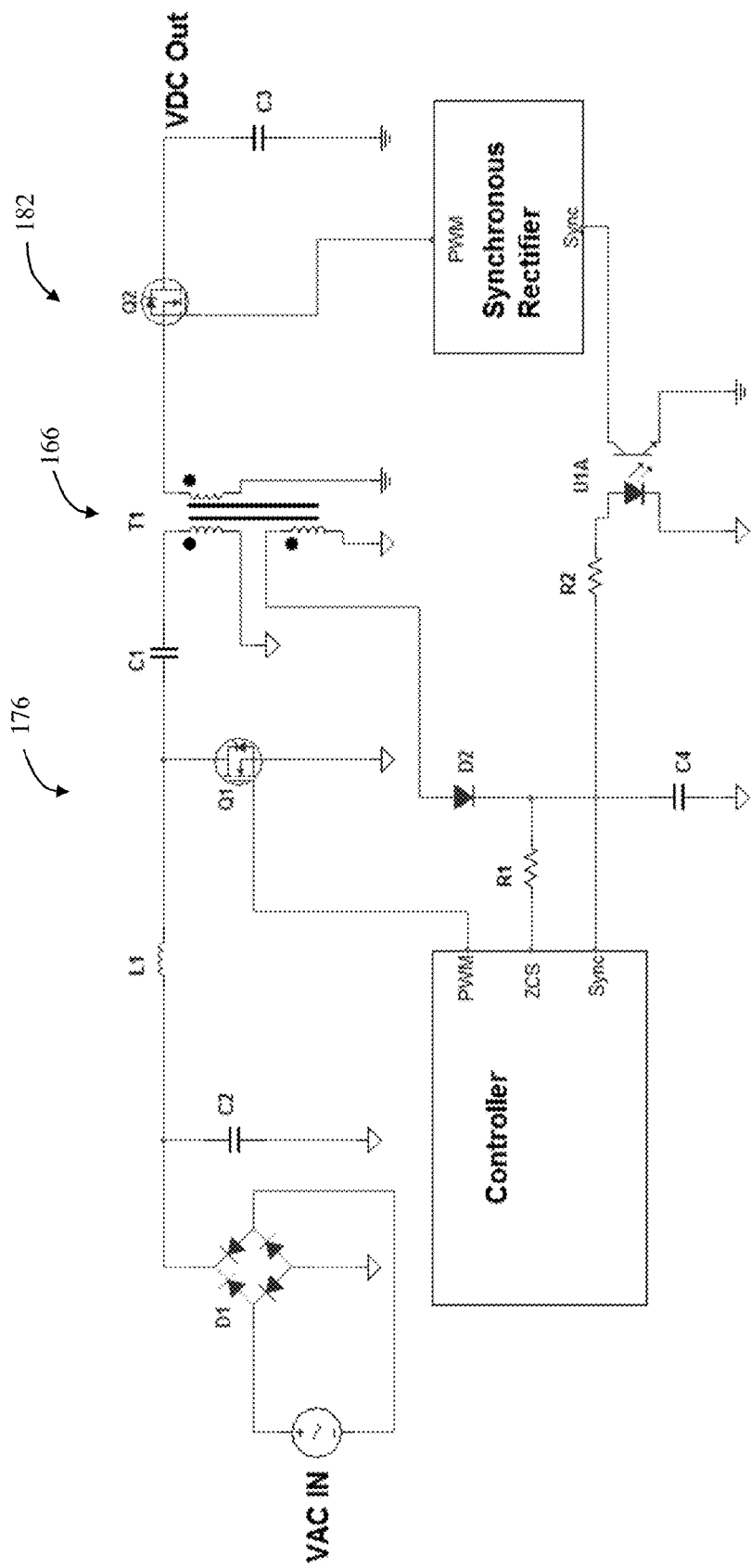
FIGS. 64-66 are schematic diagrams of the power circuit shown in FIG. 57, including a modified Single Ended Primary Conductor (SEPIC) converter, according to an embodiment of the present invention.
Figure 65:
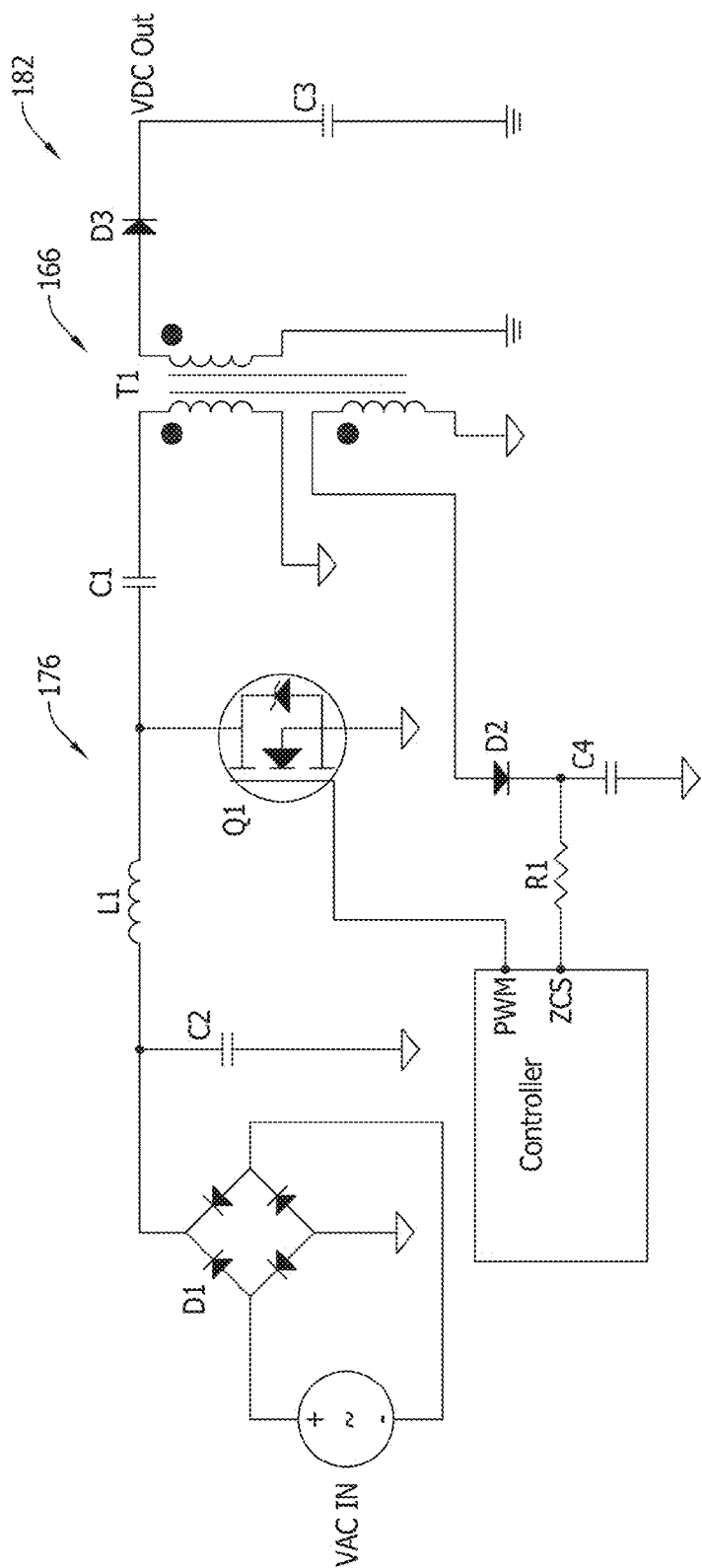
Figure 66:
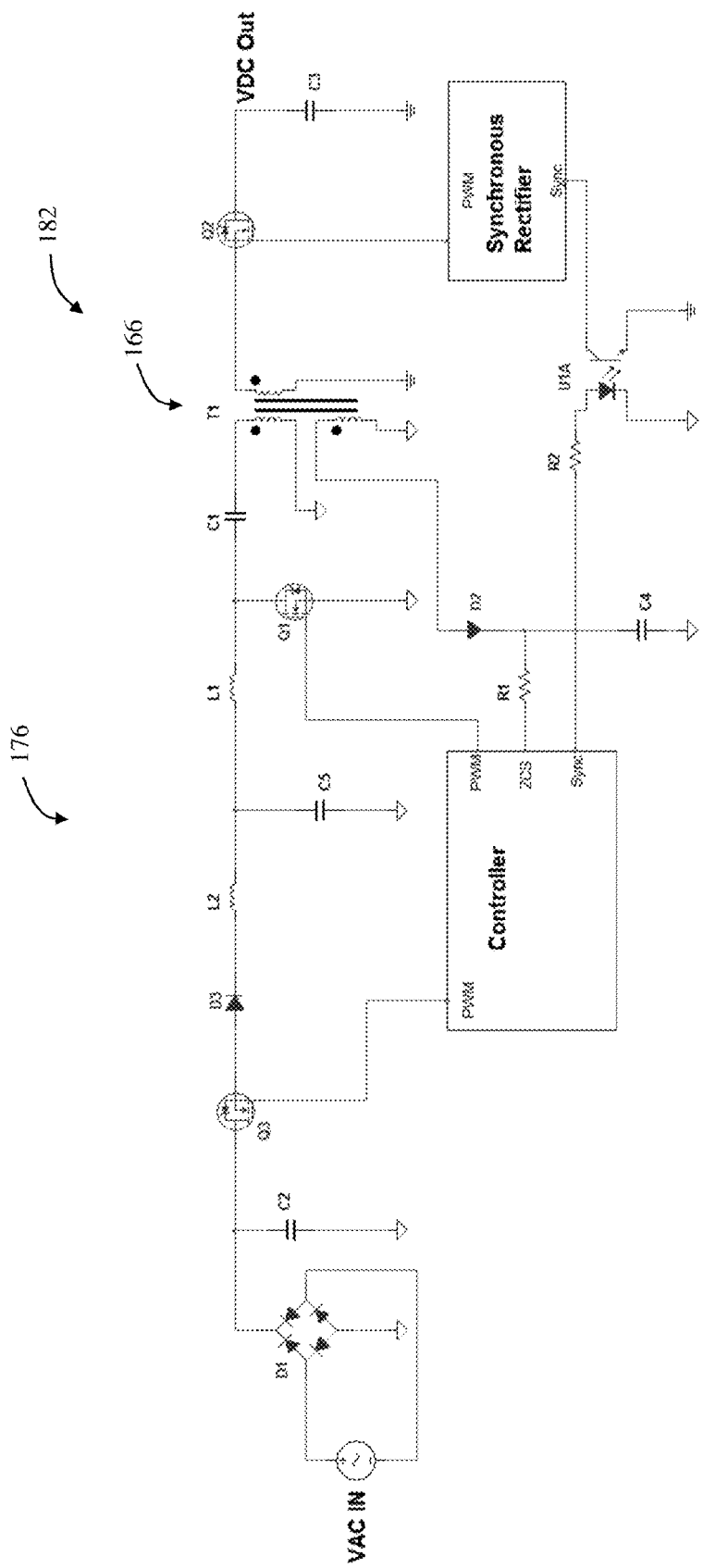

FIGS. 64-66 are schematic diagrams of the modified converter 176 including a modified Single Ended Primary Conductor (SEPIC) converter 182. FIG. 64 illustrates a synchronous modified SEPIC converter, FIG. 65 illustrates an asynchronous modified SEPIC converter, and FIG. 66 illustrates a synchronous modified SEPIC converter with quasi-resonant front end.

Known SEPIC converters are known to be used for DC-DC rectification. In contrast to known SEPIC converters, the modified SEPIC converter 182 is configured for AD-DC conversions. The method of operation provides that the electrical potential (voltage) at its output to be greater than, less than, or equal to that at its input. The output of the modified SEPIC converter 182 is controlled by the duty cycle of the control transistor. The control is accomplished by $V_{out}/V_{in}$=duty cycle/(period−duty cycle). This is how the main FET is driven in the modified SEPIC converter 182. In addition, the feedback is provided so that if the output voltage is too low, the duty cycle increases. Conversely, if the voltage is too high the duty cycle is decreased. In the illustrated embodiment, the modified SEPIC converter 182 includes a transformer 166 and either Asynchronous and/or Synchronous Rectification to accomplish the AC-DC conversion. For example, as shown in FIGS. 64-66, the current through Q1 is the sum of the input current as well as the output current. The modified SEPIC converter 182 is operated to convert AC to DC using rail (mains) power and convert it down to a desired voltage, such as 5V at a desired current, such as 10 to 12 A. In addition the modified SEPIC converter 182 includes isolation taking place at inductor L2 causing the inductor L2 to become a transformer. The modified SEPIC converters 182 includes minimal switches similar to the modified Çuk converters 178 (shown in FIGS. 58-60), but the current through the MOSFET Q1 is be reduced. This is because the secondary load current is prevented from flowing through Q1 by the way diode D6 is positioned. This reduces the I²R heating loss in Q1.

Quasi Resonant Regulation

In addition, any of the modified converters 176 described herein including, but not limited to, the BiDFET 162, the modified Çuk converter 178, the modified Push-Pull converter 180, and/or the modified SEPIC converter 182 may also include a Quasi Resonant feature. Here, a FET, diode, and LC circuit are placed on the front end to allow the main switching elements to fully turn while the current passing through them is zero" or similar instead of the FET in the quasi resonant feature provides an oscillation to allow the main FET(s) to switch at zero current to reduce switching losses. Unlike a linear power supply, the Quasi Resonant feature of regulation uses a pass transistor of a switching-mode supply which continually switches between low-dissipation, full-on and full-off states, and spends very little time in the high dissipation transitions, which minimizes wasted energy. Ideally, a switched-mode power supply dissipates no power. Voltage regulation is achieved by varying the ratio of on-to-off time. In contrast, a linear power supply regulates the output voltage by continually dissipating power in the pass transistor. This higher power conversion efficiency is an important advantage of a switched-mode power supply. Switched-mode power supplies may also be substantially smaller and lighter than a linear supply due to the smaller transformer size and weight.

Figure 67:
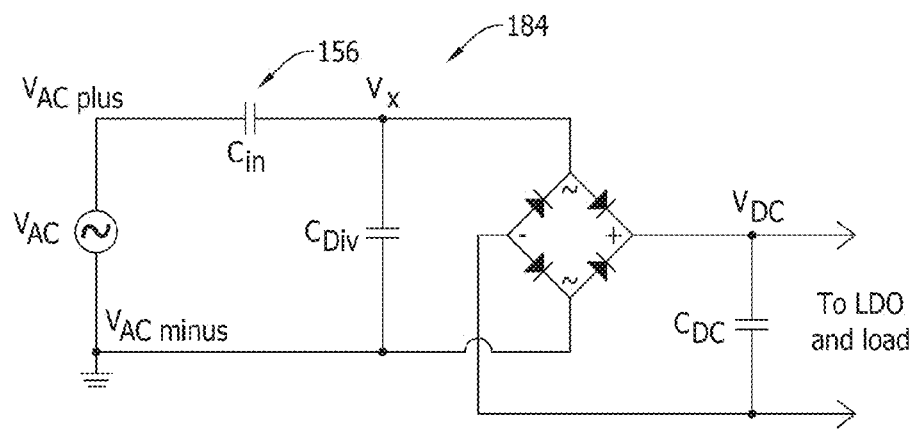
FIGS. 67 and 68 are schematic diagrams of a capacitor divider that may be used with the power circuit shown in FIGS. 1, 33, 42, and 57.
Figure 68:
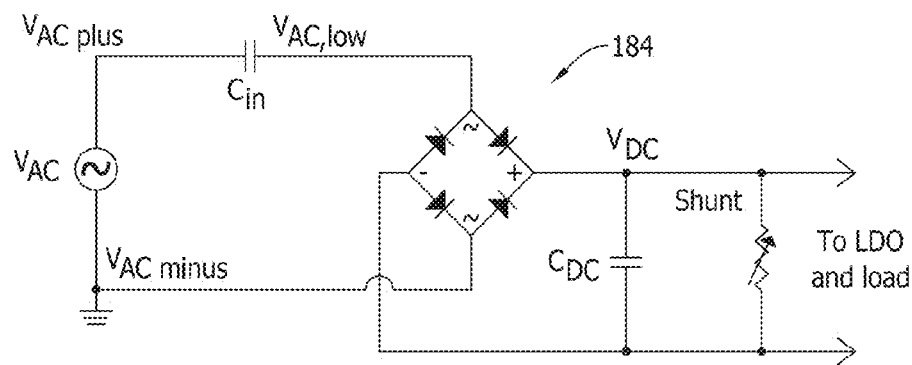

FIGS. 67 and 68 are schematic diagrams of a capacitor divider 184 that may be used with the power circuit 10. For example, in one embodiment, the capacitor divider 184 may be included in the energy well ladder 140. In another embodiment, the output section 16 may include the capacitor divider 184. In addition, the capacitor divider may be used with the power circuit 10 shown in FIGS. 2, 33, 42, and 57. Referring to FIG. 67, in one embodiment, the capacitor divider 184 includes one or more capacitors 156 configured to regulate down to and keep steady the desired output voltage. A capacitive voltage divider is a voltage divider circuit using capacitors 156 as the voltage-dividing components. The capacitor divider 184 is configured to "regulate" the output voltage and prevents the capacitor from elevating the voltage up to rail voltage when no load is applied. In another embodiment, as shown in FIGS. 67 and 68, the capacitor divider 184 includes a capacitor drop with post regulation. In addition, each of the circuit from the rail voltage would also take the initial capacitor on the upper leg and duplicate and double it in size and put in on the lower leg, so that it would not make any difference which way the plug was plugged in. Each capacitor on each leg would have to be sized for the desired output voltage, thus, it would not make any difference which way the actual "plug" was plugged into the wall. Each of the above described circuitries may use the same or similar Vampire features and feedback loop.

In the illustrated embodiment, a BCDMOS process may be used to manufacture the power circuit 10. BCDMOS includes a process for integrating Bipolar (analog), CMOS (logic) and DMOS (power) functions on a single chip for ultra high voltage (UHV) applications. BCDMOS provides a broad range of UHV applications such as LED lighting, AC-DC conversion and switched mode power supplies. Capable of operating directly "off line" from a 110/220 VAC source, ICs implemented with a non-Epi process can deploy optimized 450V/700V DR-LDMOS transistors that specify low on resistance and a breakdown voltage that exceeds 750V. When used in power switching applications, designers can expect lower conduction and switching losses.

Optional Vampire Load Subsystem

Synchronous Switching at High Voltage Subsystem:

Changing the bridge into a synchronous switch matrix has the potential to increase efficiency during high current operation. However, once in place, the matrix provides the opportunity for significantly reduced idling power as well.

To solve the Vampire Load problem one must monitor the output power to determine if a device was being charged or phone attached. If not, the circuit would disconnect itself from the line. Power for the control and monitor would be stored in an on-board capacitor and a timer would allow the circuit to periodically wake up, power up the system, and determine whether to keep it powered up. This duty cycle would result in a significant reduction in average quiescent power (the power wasted when no device is being charged).

Start-Up Powering Issues Solved:

The high voltage diode bridge is a potentially significant opportunity to place the Vampire Load subsystem, since a diode bridge is passive. When power is off and then is turned on (when the power supply is plugged into the socket), the bridge begins conducting power into the system automatically. The main issue with having a synchronous switch configuration at the line interface is the chicken-egg problem. Switches must be actively controlled. Active control requires power, but power may not be available until the switches are actively turned on. Which comes first?

The simplest solution to the start-up issue is to have a separate, extremely simple, low power regulator circuit whose job it is to provide just enough power for the monitor and switch matrix controller to function. Being simple, this regulator would not be very efficient. However, it would be sized for very low power and therefore any inefficiency would be relatively unimportant, and it would be disconnected (turned off) once the main power supply chain and microprocessor is on-line, further reducing energy loss.

It would be best to have separate primary and secondary monitor and switch controller sections of circuitry. The secondary would be the one powered continuously whenever the power supply was plugged in. The primary would maximize the efficiency of the system during charging. Its performance might need to be superior to that of the secondary, whose purpose is only to operate when the unit is first plugged in.

Referring to FIGS. 2, 33, 42, and 57, in one embodiment, the power circuit 10 may include the switched capacitor two-phase circuit 144 and the BiDFET circuit 164. In another embodiment, the power circuit 10 may include the BiDFET circuit 164 and the modified converter 176. In a further embodiment, the power circuit 10 may include the switched capacitor two-phase circuit 144 and the modified converter 176. In yet another embodiment, the power circuit 10 may include the switched capacitor two-phase circuit 144, the BiDFET circuit 164 and/or the modified converter 176. In addition, the power circuit 10 may include any combination of, and any number of elements described in the switched capacitor two-phase circuit 144, the BiDFET circuit 164 and/or the modified converter 176

Figure 69:
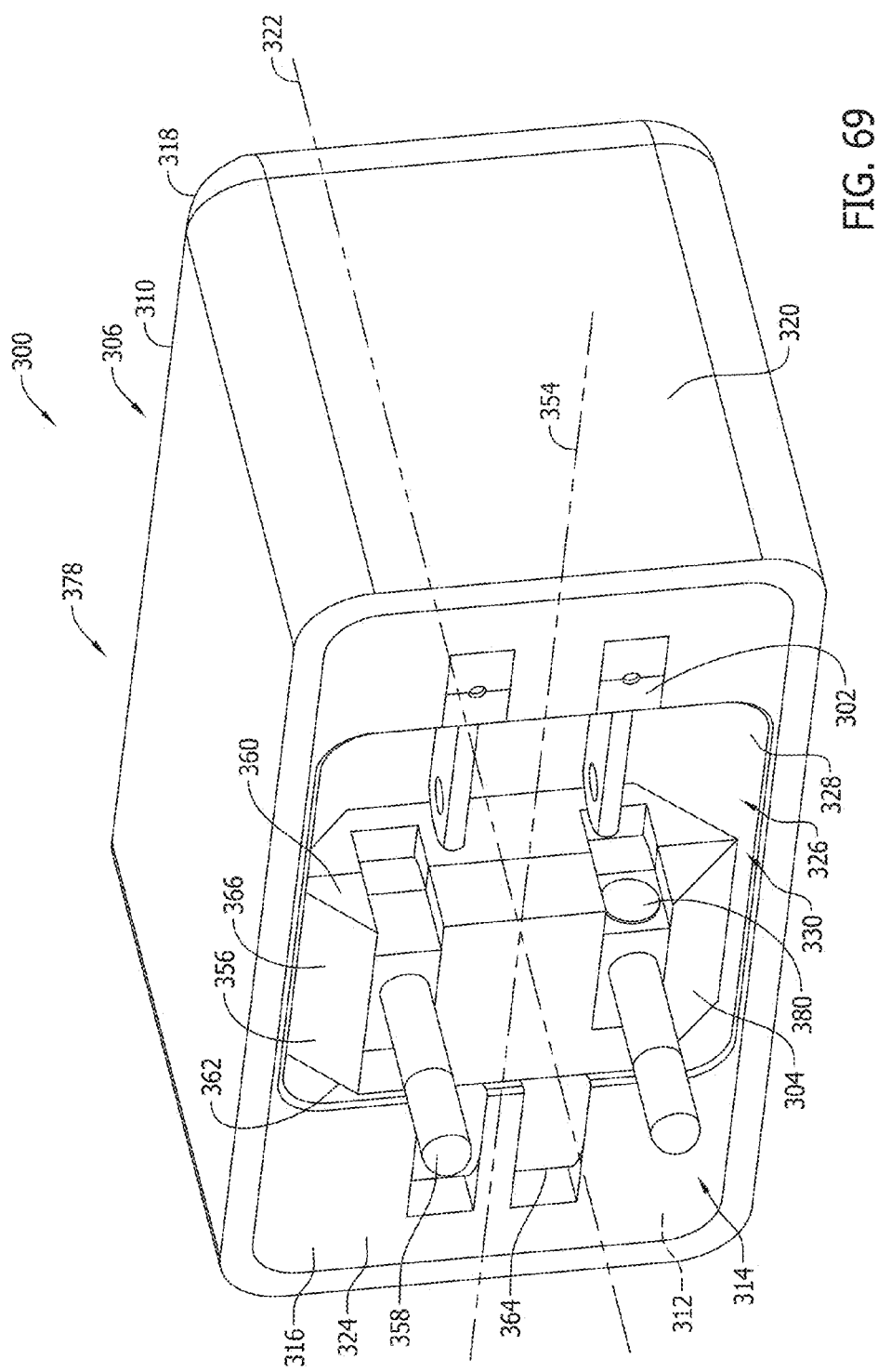
FIG. 69 is an isometric view of an alternative housing for use with the power circuit shown in FIG. 1, according to an embodiment of the present invention.
Figure 70:
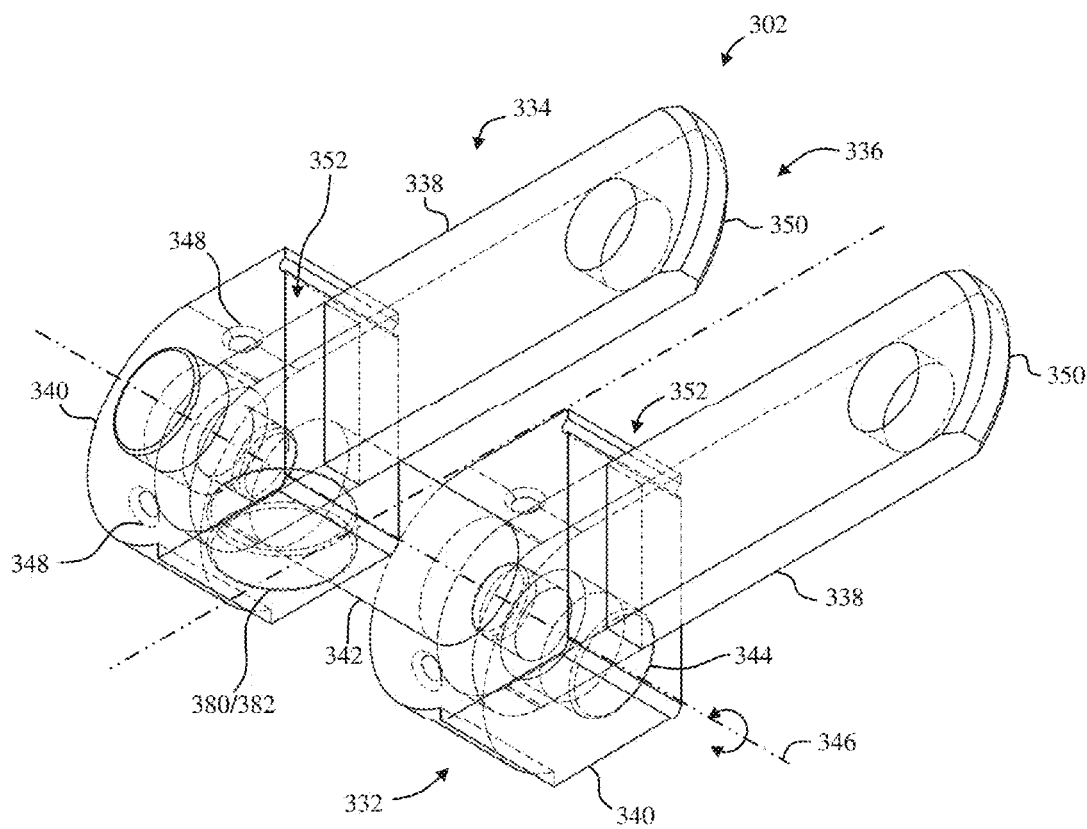
FIG. 70 is a schematic isometric view of a first plug assembly for use with the housing shown in FIG. 69, according to an embodiment of the present invention.
Figure 71:
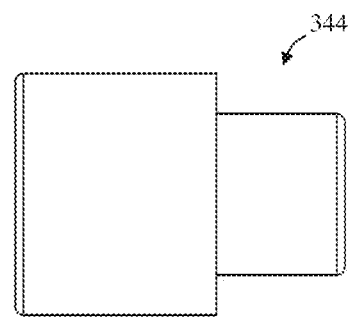
FIG. 71 is a side view of a portion of the first plug assembly shown in FIG. 70.
Figure 72:
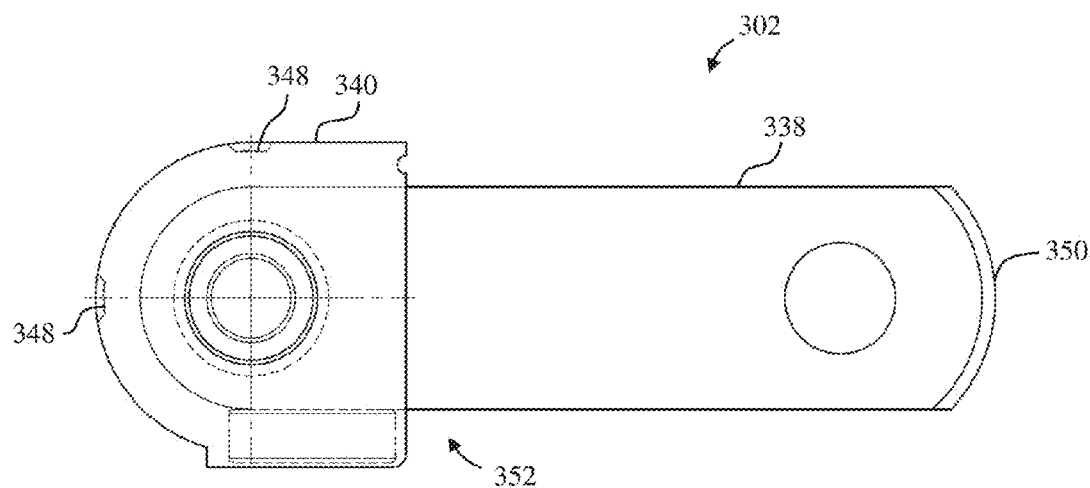
FIG. 72 is a side view of the first plug assembly shown in FIG. 70.
Figure 73:
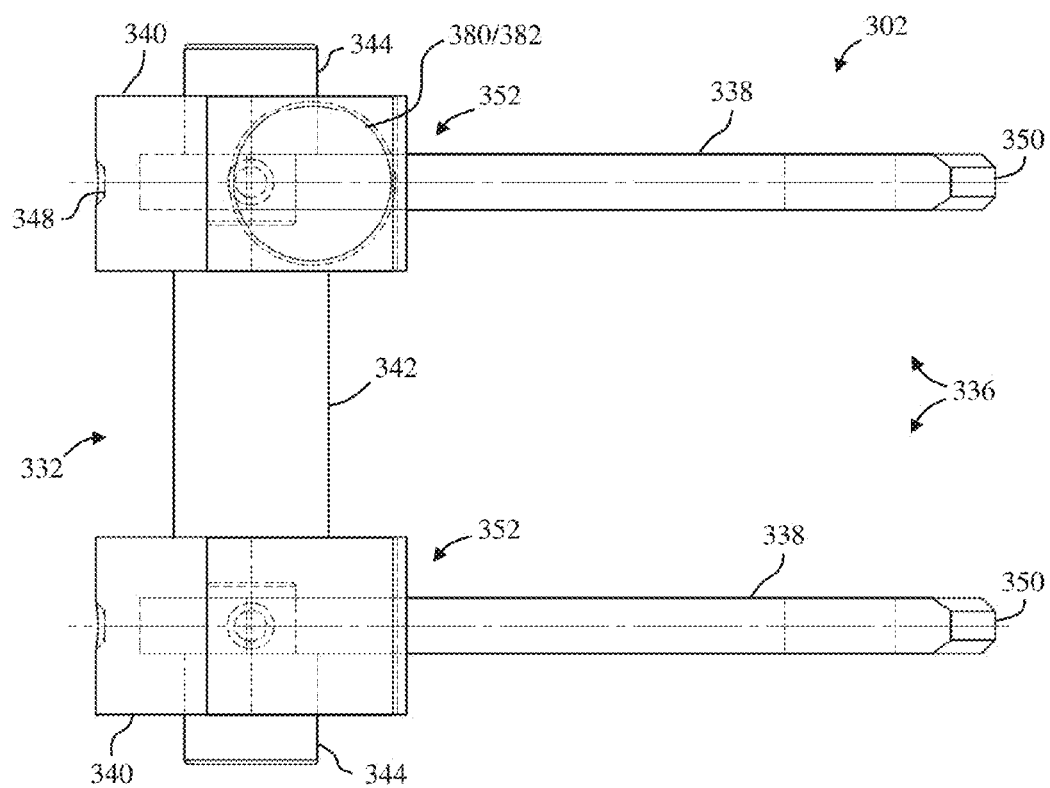
FIG. 73 is a top view of the first plug assembly shown in FIG. 70.
Figure 74:
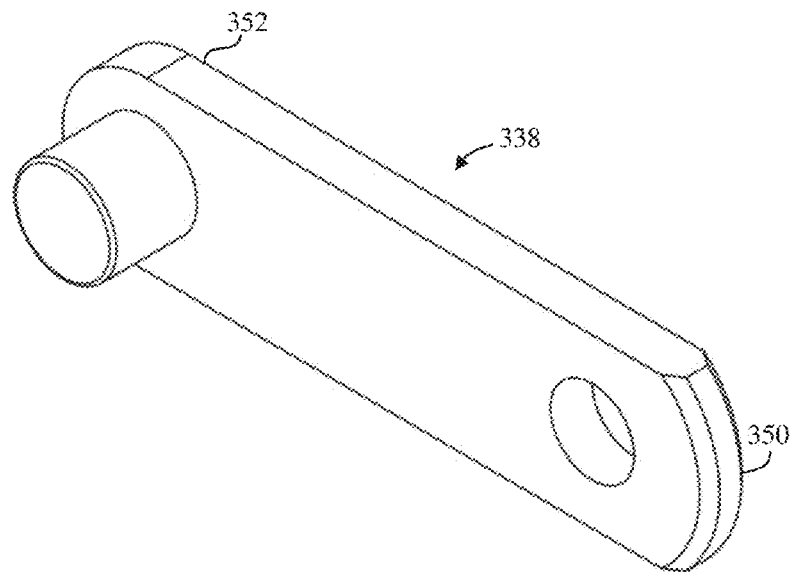
FIG. 74 is a isometric view of a prong that may be used with the first plug assembly shown in FIG. 70, according to an embodiment of the invention.
Figure 75:
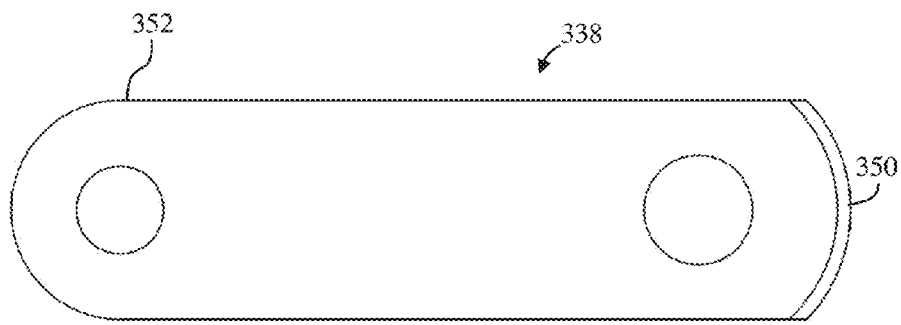
FIG. 75 is a side view of the prong shown in FIG. 74.
Figure 76:
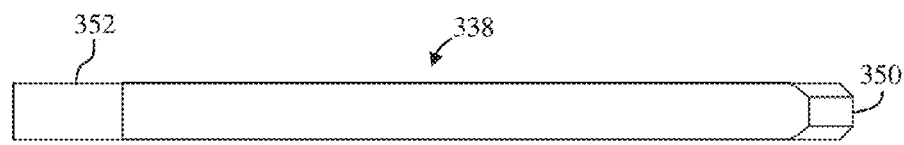
FIG. 76 is a top view of the prong shown in FIG. 74.
Figure 77:
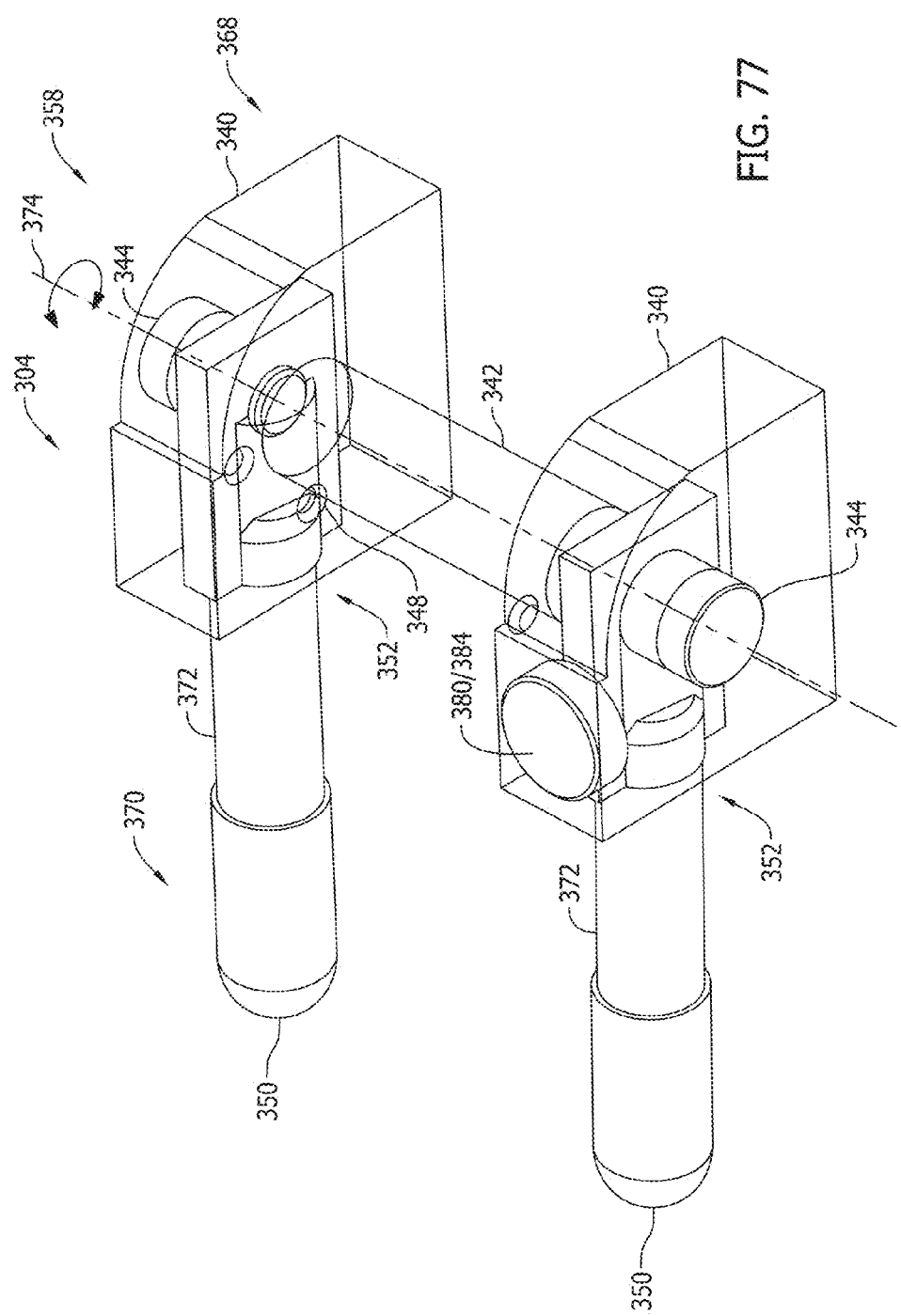
FIG. 77 is a schematic isometric view of a second plug assembly for use with the housing shown in FIG. 69, according to an embodiment of the present invention.
Figure 78:
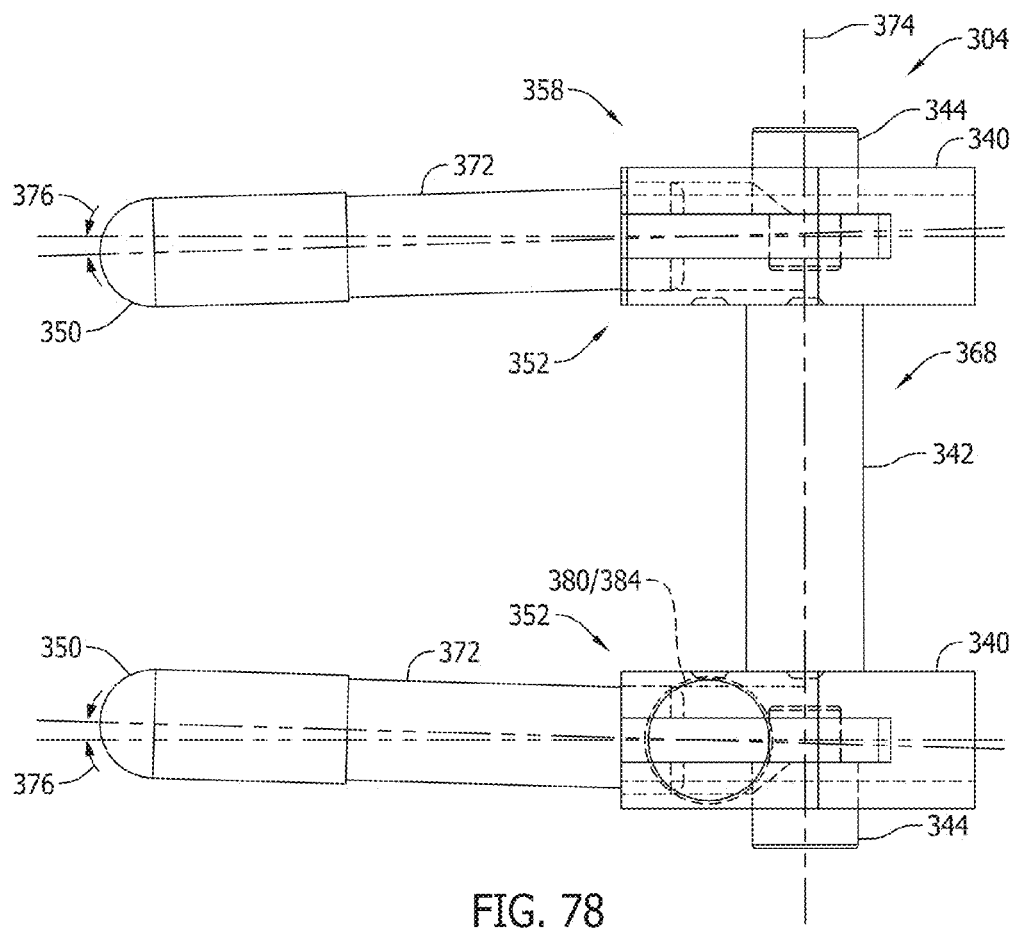
FIG. 78 is a top view of the second plug assembly shown in FIG. 77.
Figure 79:
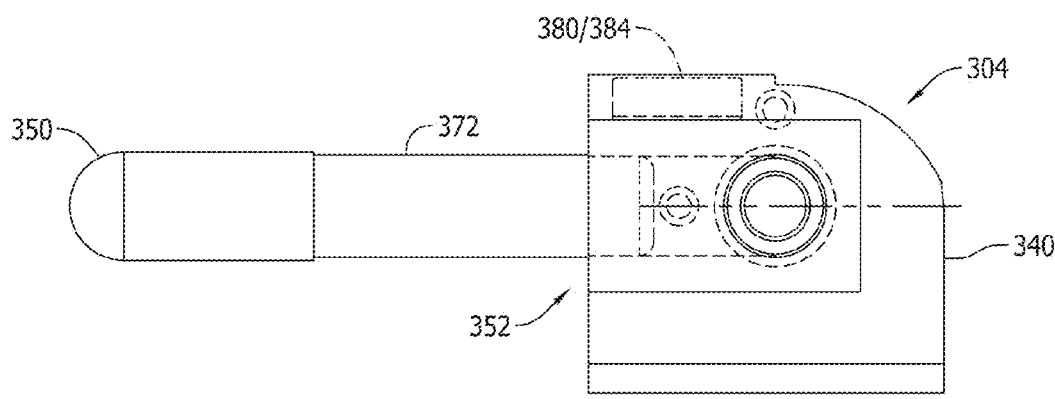
FIG. 79 is a side view of the second plug assembly shown in FIG. 77.
Figure 80:
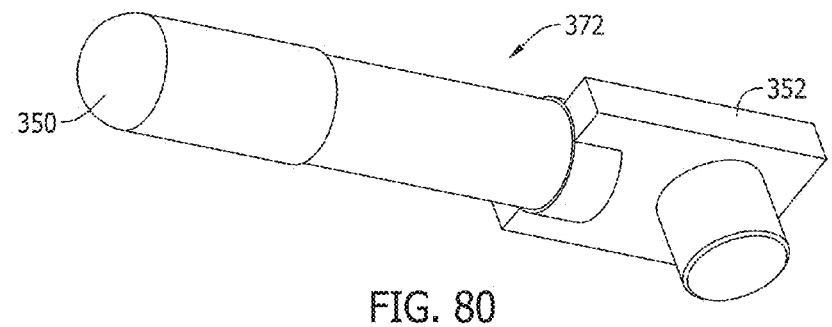
FIG. 80 is an isometric view of a prong that may be used with the second plug assembly shown in FIG. 77.
Figure 81:
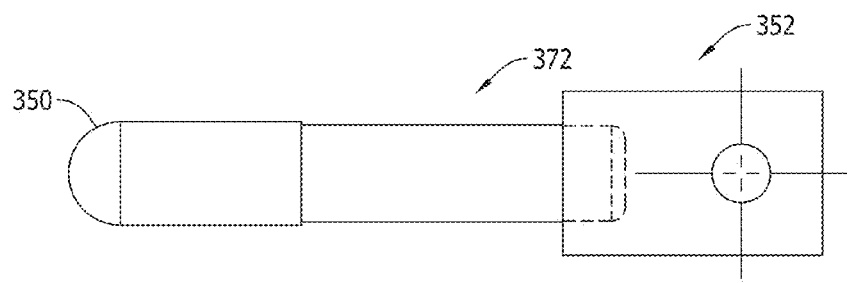
FIG. 81 is a side view of the prong shown in FIG. 80.
Figure 82:
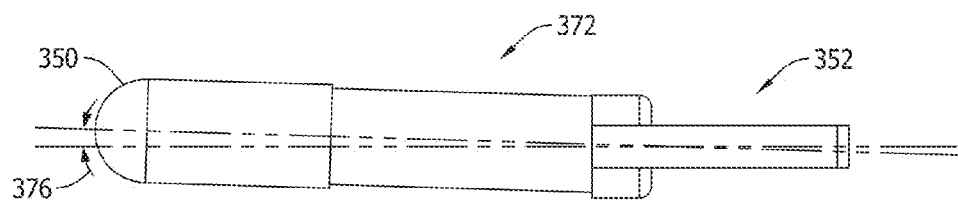
FIG. 82 is a top view of the prong shown in FIG. 80.

FIGS. 69 and 83 are isometric views of another housing 300 that may be used with the power device 2. FIG. 70 is an isometric view of a first plug assembly 302 that may be used with the power device 2. FIG. 77 is an isometric view of a second plug assembly 304 that may be used with the power device 2. In the illustrated embodiment, the power device 2 includes the housing 300, a power circuit assembly 306 (shown in FIG. 1) that is positioned within the housing 300, the first plug assembly 302, and the second plug assembly 304. The power circuit assembly 306 includes the first power circuit 10 and/or the second power circuit 24. The first plug assembly 302 is coupled to the power circuit assembly 306 for transmitting power from the sourced electrical power 18 to the power circuit assembly 306 at a first power voltage. The second plug assembly 304 is coupled to the power circuit assembly 306 for transmitting power from the sourced electrical power 18 to the power circuit assembly 306 at a second power voltage that is different than the first power voltage. Moreover, the second plug assembly 304 is also configured to transmit power from the sourced electrical power 18 to the power circuit assembly 306 at a third power voltage that is different from the first power voltage and the second power voltage.

For example, in one embodiment, the first plug assembly 302 may include the first electrical plug 104A which is configured to channel power from a North American standard power outlet at a first voltage that is approximately equal to 120 volts. The second plug assembly 304 may include the second electrical plug 104B which is configured to channel power from a European standard power outlet at a second voltage that is approximately equal to 240 volts. In addition, the second plug assembly 304 may be configured to channel power from an Asian standard power outlet at a third voltage that is approximately equal to 230 volts. In another embodiment, the first plug assembly 302 and/or the second plug assembly 304 may be configured to meet any other power outlet standard such as the Australian standard power outlet and voltage.

Figure 86:
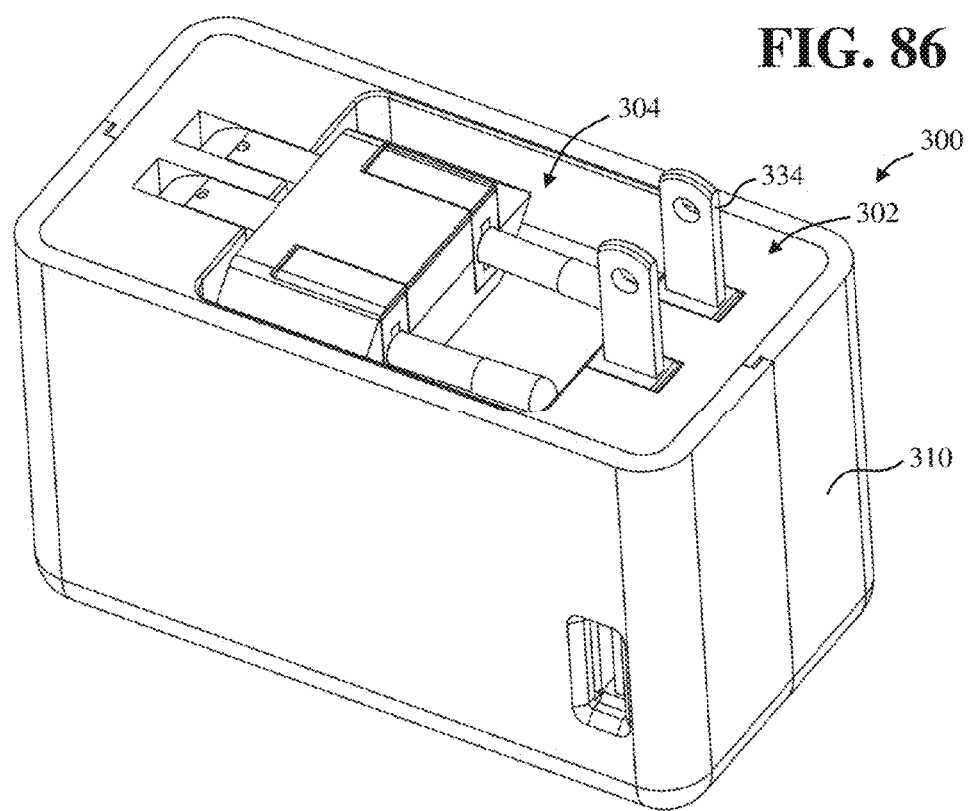
Figure 87:
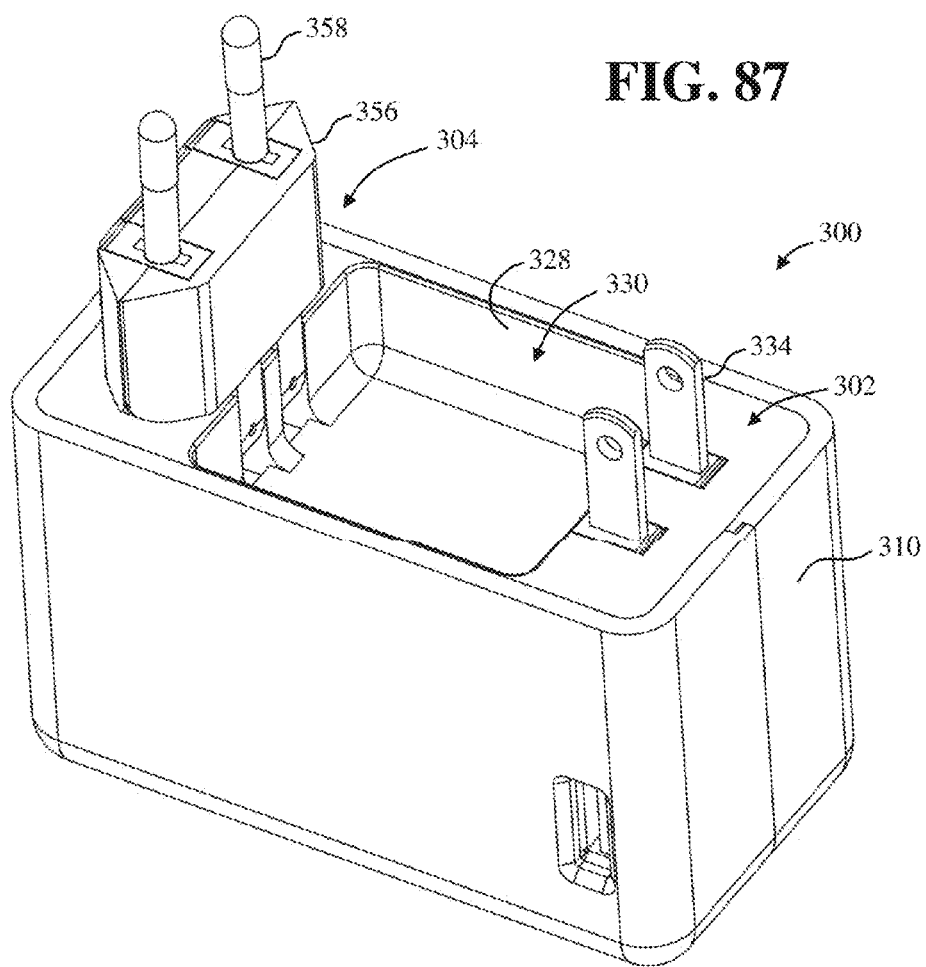

In the illustrated embodiment, the power device 2 is operable between a first operating mode (shown in FIG. 86), a second operating mode (shown in FIG. 85), a third operating mode (shown in FIG. 84), and a fourth operating mode (shown in FIG. 87). In the first operating mode, the power device 2 is adapted to receive power from the sourced electrical power 18 at the first voltage. More specifically, in the first operating mode, the first plug assembly 302 channels power from the sourced electrical power 18 to the power circuit assembly 306 at the first voltage. In the second operating mode, the power device 2 is adapted to receive power from the sourced electrical power 18 at the second voltage via the second plug assembly 304. In the third operating mode, the power device 2 is adapted to receive power from the sourced electrical power 18 via the second plug assembly 304 at the third voltage. In the fourth operating mode, the power device 2 operates in a "fault" mode and is adapted to not receive power from the first plug assembly 302 and the second plug assembly 304 such that power circuit assembly 306 cannot receive power from the sourced electrical power 18. The fault mode prevents hazardous conditions from occurring in the case of a user connecting the system via an extension cord or similar device that would allow the user to touch the unconnected plug which might be exposed through such use.

Figure 85:
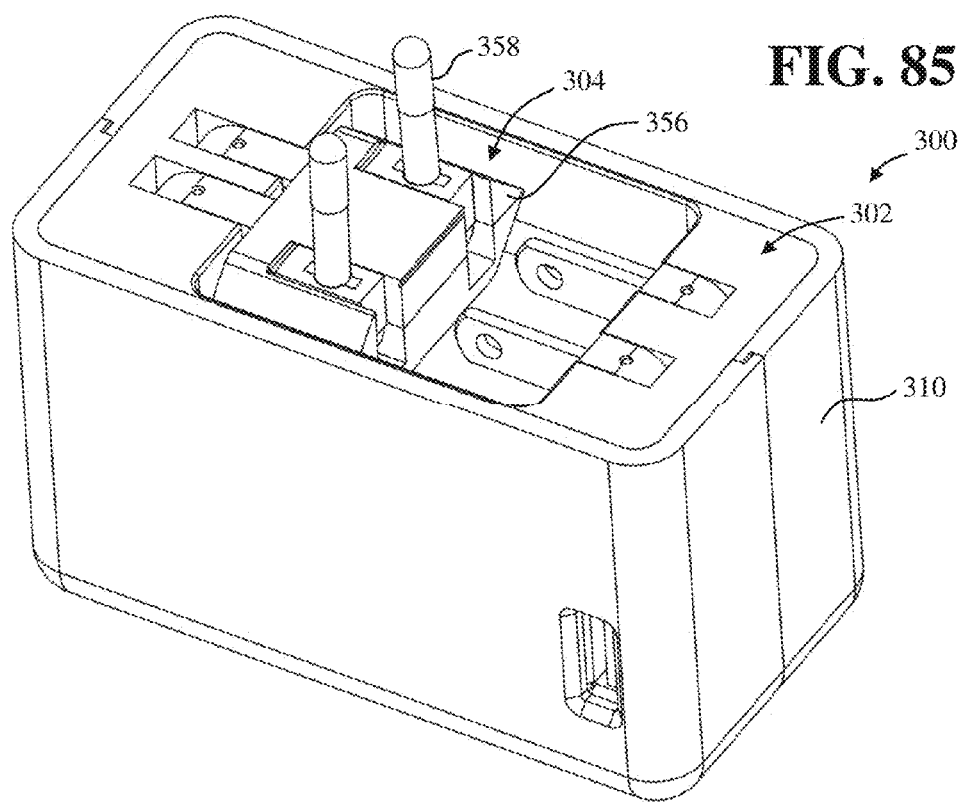

In the illustrated embodiment, the first plug assembly 302 is positionable between a first plug first position (shown in FIG. 86) and a first plug second position (shown in FIGS. 69 and 85). In the first plug first position, the first plug assembly 302 is adapted to be connected to a first power source outlet (not shown) of the sourced electrical power 18. In the first plug second position, the first plug assembly 302 is adapted to be disconnected from the first power source outlet. For example, in the illustrated embodiment, the first power source outlet is a North America standard power outlet. In the first plug first position, the first plug assembly 302 is adapted to be inserted into the North America standard power outlet to channel power from the sourced electrical power 18 to the power circuit assembly 306. In the first plug second position, the first plug assembly 302 is orientated such that the first plug assembly 302 is prevented from being inserted into the power outlet. In an alternative embodiment, the first power source outlet may be a European standard power outlet, an Asian standard power outlet, an Australian standard power outlet, and/or any suitable power outlet to enable the power device 2 to function as described herein.

In the illustrated embodiment, the second plug assembly 304 is positionable between a first position (shown in FIGS. 69 and 85), a second position (shown in FIG. 84), and a third position (shown in FIG. 83). In the second plug first position, the second plug assembly 304 is adapted to be connected to a second power source outlet (not shown) of the sourced electrical power 18 to deliver power from the sourced electrical power 18 to the power circuit assembly 306. In the second plug second position, the second plug assembly 304 is adapted to be connected to third power source outlet (not shown) of the sourced electrical power 18 to channel power from the sourced electrical power 18 to the power circuit assembly 306. In the second plug third position, the second plug assembly 304 is adapted to be disconnected from the second power source outlet and the third power source outlet. For example, in the illustrated embodiment, the second power source outlet is an Asian standard power outlet and the third power source outlet is an European standard power outlet. In the second plug first position, the second plug assembly 304 is adapted to be inserted into the Asian standard power outlet to channel power from the sourced electrical power 18 to the power circuit assembly 306. In the second plug second position, the second plug assembly 304 is adapted to be inserted into the European standard power outlet to channel power from the sourced electrical power 18 to the power circuit assembly 306. In the second plug third position, the second plug assembly 304 is orientated such that the second plug assembly 304 is prevented from being inserted into the European standard power outlet and/or the Asian standard power outlet. In an alternative embodiment, the second power source outlet and/or the third power source outlet may be a North American standard power outlet, a European standard power outlet, an Asian standard power outlet, an Australian standard power outlet, and/or any suitable power outlet to enable the power device 2 to function as described herein.

In the illustrated embodiment, the power device 2 is adapted to operate in the first operating mode with the first plug assembly 302 in the first plug assembly first position and the second plug assembly in the second plug assembly third position. In addition, the power device 2 is adapted to in the second operating mode with the second plug assembly 304 in the second plug assembly first position and the first plug assembly 302 in the first plug assembly second position. Moreover, the power device 2 operates in the third operating mode with the second plug assembly 304 in the second plug assembly second position and the first plug assembly 302 in the first plug assembly second position. In addition, the power device 2 operates in the fourth operating mode with the first plug assembly 302 in the first plug assembly first position and the second plug assembly in the second plug assembly first position and/or the second plug assembly second position.

In the illustrated embodiment, the power device 2 includes a display device 308 (shown in FIG. 14) including the three separate LED circuits 132A, 132B, 132C. The display device 308 is adapted to display a first notification signal such as, for example, illuminating the first plug assembly 302, with the power device 2 operating in the first operating mode, and to display a second notification signal such as, for example, illuminating the second plug assembly 304, with the power device 2 operating in the second operating mode and/or the third operating mode. In one embodiment, each notification signal may include a predefined illuminated color, a predefined flashing sequence, and/or any suitable illumination color, brightness, flashing frequency that enables the power device 2 to function as described herein.

With reference to FIG. 69, in the illustrated embodiment, the housing 300 includes an outer surface 310 and an inner surface 312 that defines a cavity 314 therein. The housing 300 also includes a top wall 316, an opposite bottom wall 318, and a sidewall 320. The sidewall 320 extends between the top wall 316 and the bottom wall 318 along a longitudinal axis 322. In the illustrated embodiment, the top wall 316 includes a substantially planar outer surface 324. Alternatively, the top wall outer surface 324 may have an arcuate and/or curved shape. In the illustrated embodiment, the top wall 316 includes a recessed portion 326 that is defined along the top wall outer surface 324. The recessed portion 326 includes an interior surface 328 that extends inwardly from the top wall outer surface 324 towards the bottom wall 318 and defines a chamber 330 that is sized and shaped to receive the first plug assembly 302 and the second plug assembly 304 therein. In the illustrated embodiment, the first and second plug assemblies 302 and 304 may be positioned within the recessed portion 326 such that the first and second plug assemblies 302 and 304 are substantially flush with the top wall outer surface 324.

FIGS. 69-76 are various views of the first plug assembly 302. In the illustrated embodiment, the first plug assembly 302 is pivotably coupled to the housing top wall 316 and is positionable between the first plug first position, i.e. an extended position (shown in FIG. 86), and the first plug second position, i.e. a retracted position (shown in FIGS. 69 and 83). The first plug assembly 302 includes a mounting assembly 332 and a first prong assembly 334 that is coupled to the mounting assembly 332. The first prong assembly 334 includes a pair 336 of first prongs 338 that extend outwardly from the mounting assembly 332. The mounting assembly 332 includes a pair of mounting brackets 340 and a support rod 342 that is coupled between the mounting brackets 340. The first plug assembly 302 also includes at least one mounting pin 344 that is coupled between the housing top wall 316 and at least one of the mounting brackets 340 to couple the first plug assembly 302 to the housing top wall 316. The mounting pin 344 enables the first plug assembly 302 to pivot about a pivot axis 346 such that the first plug assembly 302 may be moved between the extended and retracted positions. In addition, at least one of the mounting brackets 340 includes a plurality of detent holes 348 that are arranged along an outer surface of the mounting bracket 340 to facilitate positioning the first plug assembly 302 in the extended position and the retracted position.

Each first prong 338 extends between a tip end 350 and a base end 352. The base end 352 is coupled to the respective mounting bracket 340 and the prong tip end 350 extends outwardly from the mounting bracket 340. The pair 336 of first prongs 338 are orientated substantially parallel with each other. In the extended position, the pair 336 of first prongs 338 are orientated such that the prong tip ends 350 extend outwardly a distance from the housing outer surface 310 and towards the power source outlet. Moreover, in the extended position, the first prongs 338 are substantially parallel with the longitudinal axis 322 to enable the first prongs 338 to be inserted into the power source outlet. In the retracted position, the first prongs 338 are orientated such that the prong tip ends 350 are adjacent to the housing outer surface 310. Moreover, the first prongs 338 are orientated along a transverse axis 354 that is substantially perpendicular to the longitudinal axis 322 and are positioned within the chamber 330 to facilitate preventing the first plug assembly 302 from being inserted into the power source outlet.

FIGS. 77-82 are various views of the second plug assembly 304. In the illustrated embodiment, the second plug assembly 304 is pivotably coupled to the housing top wall 316 and is positionable between the second plug first position, i.e. a first extended position (shown in FIGS. 69 and 85), the second plug second position, i.e. a second extended position (shown in FIG. 84), and the second plug third position, i.e. a retracted position (shown in FIG. 83). With reference to FIGS. 69 and 77-82, the second plug assembly 304 includes a base member 356 that is pivotably coupled to the housing top wall 316 and a second prong assembly 358 that is pivotably coupled to the base member 356. The base member 356 extends between a top portion 360 and a bottom portion 362. The bottom portion 362 includes a pair of support arms 364 that extend outwardly from the base member 356 and are coupled to the housing top wall 316 such that that the base member 356 is movable with respect to the housing outer surface 310. In the illustrated embodiment, the base member 356 includes an outer surface 366 having a shape that enables the base member 356 to be at least partially inserted into a power source outlet such as, for example, a European standard power outlet.

The second prong assembly 358 is pivotably coupled to the base member top portion 360 and includes a mounting assembly 368 and a pair 370 of second prongs 372 that extend outwardly from the mounting assembly 368. The mounting assembly 368 includes a pair of mounting brackets 340 and a support rod 342 that is coupled between the mounting brackets 340. The mounting assembly 368 also includes at least one mounting pin 344 that is coupled between the base member top portion 360 and the second prong assembly 358 to couple the second prong assembly 358 to the base member 356 such that the second prong assembly 358 is movable with respect to the base member 356. Moreover, the mounting pin 344 enables the second prong assembly 358 to pivot about a pivot axis 374 such that the second prong assembly 358 may be moved between the first extended position and the retracted position. In addition, at least one of the mounting brackets 340 includes a plurality of detent holes 348 that are arranged along an outer surface of the mounting bracket 340 to facilitate positioning the second prong assembly 358.

Each second prong 372 extends between a tip end 350 and a base end 352. The base end 352 is coupled to the respective mounting bracket 340 and the prong tip end 350 extends outwardly from the mounting bracket 340. At least one of the second prongs 372 extends outwardly at an oblique angle 376 from the mounting bracket 340 such that the second prongs converge at the tip ends 350.

In the first extended position (shown in FIGS. 69 and 85), the base member 356 is positioned within the chamber 330 and the pair 370 of second prongs 372 are orientated such that the prong tip ends 350 extend outwardly a distance from the housing outer surface 310 and towards the power source outlet. Moreover, in the first extended position, the second prongs 372 are substantially parallel with the longitudinal axis 322 to enable the second prongs 372 to be inserted into the power source outlet. In addition, the base member 356 is substantially parallel with the transverse axis 354 such that the second prongs 372 are orientated substantially perpendicular to the base member top portion 360.

In the second extended position (shown in FIG. 84), the base member 356 extends outwardly from the housing outer surface 310 and towards the power source outlet and is orientated along the longitudinal axis 322. In addition, the second prongs 372 extend outwardly from the base member top portion 360 such that the second prongs 372 are aligned with the base member 356 and are also orientated along the longitudinal axis 322 such that the base member 356 and the second prongs 372 extend outwardly from the housing 300 and towards the power source outlet. In the first extended position, the second plug assembly 304 is orientated to be inserted into a first power source outlet such as, for example, a Asian and/or French standard power outlet. In the second extended position, the second plug assembly 304 is orientated to be inserted into a second power source outlet such as, for example, a European standard power outlet that is different than the first power source outlet.

In the retracted position, the base member 356 is positioned within the chamber 330 and the second prong tip ends 350 are positioned adjacent the housing outer surface 310. Moreover, the base member 356 and the second prongs 372 are orientated along the transverse axis 354 and are each positioned within the chamber 330 to facilitate preventing the second plug assembly 304 from being inserted into the first and/or second power source outlets.

In the illustrated embodiment, the pair 370 of second prongs 372 a spaced a distance apart such that the pair 336 of first prongs 338 may be positioned between each of the second prongs 372 with the first plug assembly 302 and the second plug assembly 304 in the retracted positions such that the first and second plug assemblies 302 and 304 are flush with the housing outer surface 310.

Figure 88:
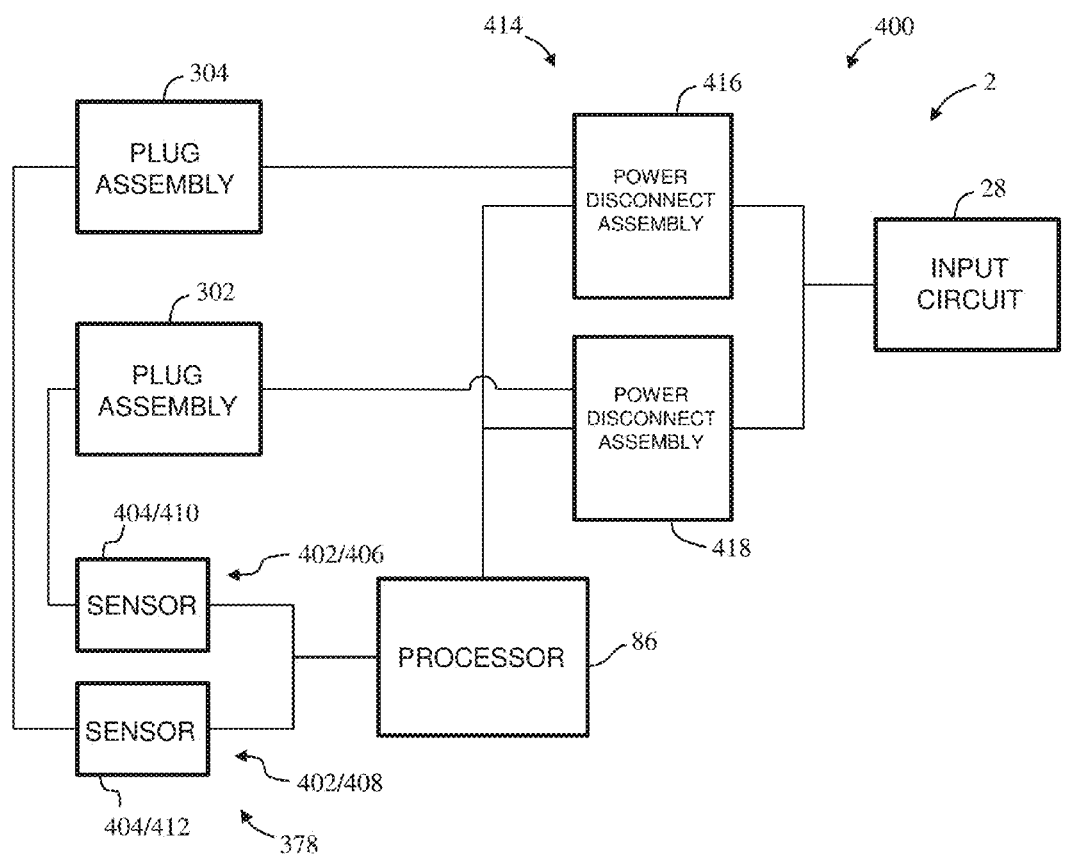
FIG. 88 is a schematic view of a power cut-off assembly that may be used with the power circuit shown in FIG. 1, according to an embodiment of the present invention.
Figure 89:
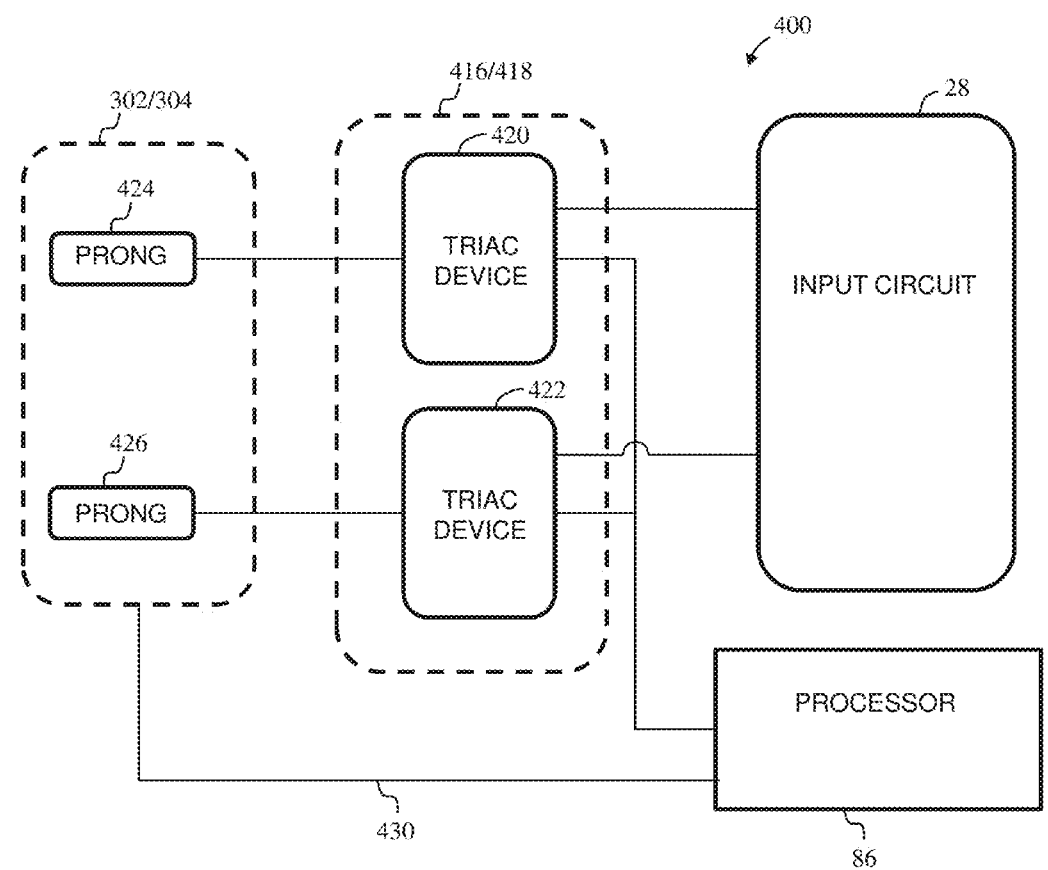
FIG. 89 is another schematic view of a power cut-off assembly that may be used with the power circuit shown in FIG. 1, according to an embodiment of the present invention.
Figure 90:
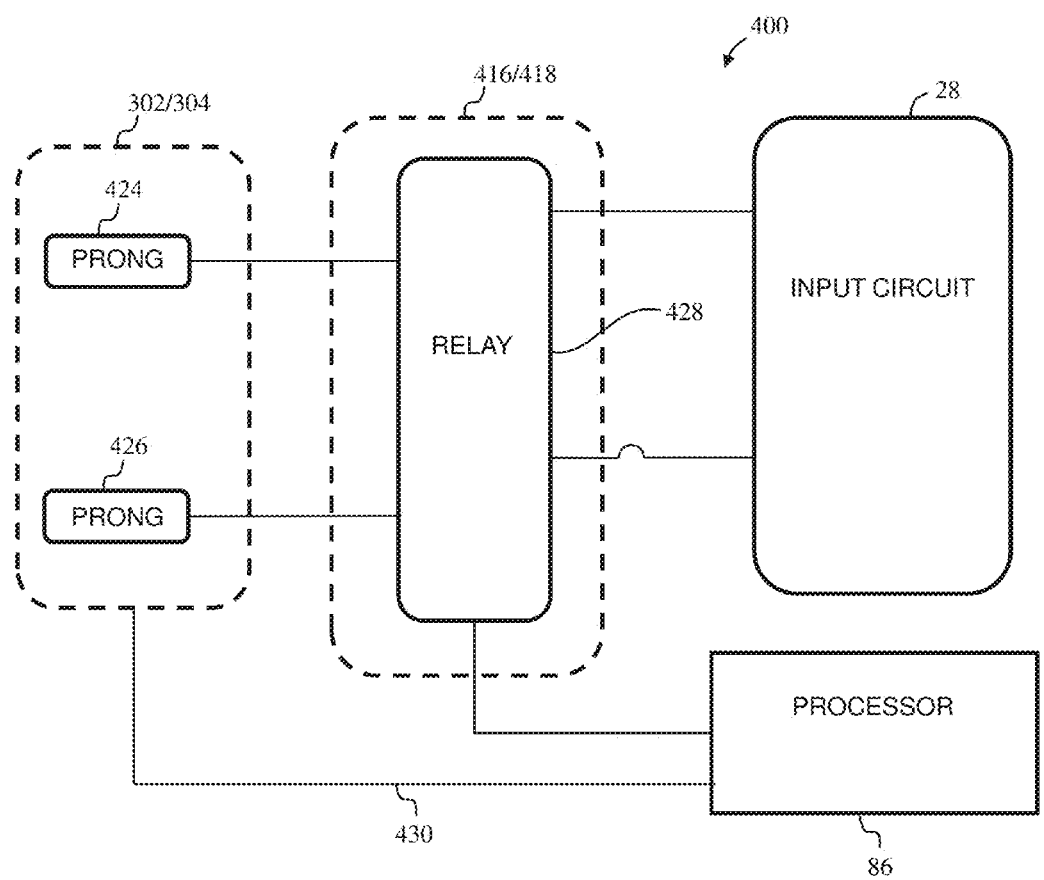
FIG. 90 is another schematic view of a power cut-off assembly that may be used with the power circuit shown in FIG. 1, according to an embodiment of the present invention.

FIG. 88 is a schematic view of a power cut-off assembly 400. FIG. 89 is another schematic view of the power cut-off assembly 400. FIG. 90 is another schematic view of the power cut-off assembly 400. In the illustrated embodiment, the power device 2 also includes the power cut-off assembly 400 for use in preventing power from being transmitted from the first and second plug assemblies 302 and 304 to the power circuit assembly 306. In the illustrated embodiment, the power cut-off assembly 400 includes a sensing assembly 378 (shown in FIGS. 69 and 88) that is adapted to sense a position of the first plug assembly 302 and a position of the second plug assembly 304, and transmit a signal indicative of the sensed positions to the microprocessor 86. In the illustrated embodiment, the sensing assembly 378 includes at least one sensing device 402 that includes one or more magnets 380 that are coupled to the first plug assembly 302 and the second plug assembly 304 and one or more Hall Effect sensors 404 for sensing a proximity of the first and second plug assemblies 302 and 304. More specifically, in the illustrated embodiment, the sensing assembly 378 includes a first sensing device 406 for sensing a position of the first plug assembly 302, and a second sensing device 408 for sensing a position of the second plug assembly 304. The first sensing device 406 includes a first sensor 410 and a first magnet 382 that is coupled to the first plug assembly 302. The second sensing device 408 includes a second sensor 412 and a second magnet 384 that is coupled to the second plug assembly 304.

The Hall Effect sensors 410 and 412 operate by sensing the presence of a magnetic field that is generated by the magnets 380. As the first and second plug assemblies 302 and 304 are moved between the retracted positions and the extended positions, the Hall Effect sensors 410 and 412 are adapted to sense the relative strength of the magnetic fields generated by the first and second magnets 382 and 384, respectively, to determine a relative position of the first and second plug assemblies 302 and 304. In the illustrated embodiment, the Hall Effect sensors 410 and 412 are positioned near the interior surface 328 of the housing recessed portion 326, and each of the first and second magnets 382 and 384 are coupled to the mounting brackets 340 of the first and second plug assemblies 302 and 304, respectively. In another embodiment, the sensing assembly 378 may include any suitable sensing device for sensing the relative positions of the first and second plug assemblies 302 and 304.

In the illustrated embodiment, the power cut-off assembly 400 also includes an input power management system 414 that is coupled between first and second plug assemblies 302 and 304 and the input circuit 28 for selectively transmitting power from the first and second plug assemblies 302 and 304 to the input circuit 28. In the illustrated embodiment, the input power management system 414 includes a first input power disconnect assembly 416 and a second input power disconnect assembly 418. The first input power disconnect assembly 416 is connected between the first plug assembly 302 and the input circuit 28. The second input power disconnect assembly 418 is connected between the second plug assembly 304 and the input circuit 28. In addition, the microprocessor 86 is coupled to first and second input power disconnect assemblies 416 and 418, and to the sensing assembly 378 for detecting a position of the first and second plug assemblies 302 and 304, and operating the first and second input power disconnect assemblies 416 and 418 to selectively transfer power from the first and second plug assemblies 302 and 304 to the input circuit 28.

Referring to FIG. 89, in the illustrated embodiment, the first and second input power disconnect assemblies 416 and 418 each include a first TRIAC device 420 and a second TRIAC device 422. The first TRIAC device 420 is connected between a first prong 424 and the input circuit 28. The second TRIAC device 422 is connected between a second prong 426 and the input circuit 28. Each of the first and second TRIAC devices 420 and 422 operate between an "on" state wherein the first and second prongs 424 and 426 are electrically connected to the input circuit 28 and an "off"

state wherein the first and second prongs 424 and 426 are electrically disconnected from the input circuit 28. In the illustrated embodiment, the default state for each of the first and second input power disconnect assemblies 416 and 418 is the "off" state. During operation, the microprocessor 86 senses a position of the first plug assembly 302 and selectively operates the first input power disconnect assembly 416 between the "on" state for delivering power to the input circuit 28 and the "off" state to prevent power form being deliver to the input circuit 28. Similarly, the microprocessor 86 senses a position of the second plug assembly 304 and selectively operates the second input power disconnect assembly 418 between the "on" state and the "off" state. In one embodiment, the first and second TRIAC devices 420 and 422 may include an Opti-TRIAC device.

Referring to FIG. 90, in one embodiment, the first and second input power disconnect assemblies 416 and 418 may each include an electrical relay 428 that is connected to the first and second prongs 424 and 426. Each electrical relay 428 is operable in the "on" state and the "off" state to selectively deliver power from the first and second prong assemblies 302 and 304, respectively, to the input circuit 28.

In the illustrated embodiment, the input power management system 414 also includes a boot-strap circuit 430 that is connected to the first and second plug assemblies 302 and 304 and the microprocessor 86 for delivering power to the microprocessor 86 for use during a boot-up or start-up mode of the microprocessor 86. The boot-strap circuit 430 is electrically connected to the hot-side of the first and second input power disconnect assemblies 416 and 418 for delivering a small amount of power from the respective plug assemblies 302 and 304 to the microprocessor 86 during start-up. In on embodiment, the boot-strap circuit 430 may be the second power circuit 24.

Power Input Management

The charger enclosure houses two self contained Power connectors; a USA plug and a European/Asian plug. This necessitates some management of the power Input connection in order to prevent the possibility of exposing a hazardous voltage to the user. Through the use of a bootstrapping system, the microprocessor can access power from either connector, as long as one of them is plugged in, while at the same time allowing both connectors to be unattached to the charger itself.

Through the use of Hall Effect devices and small magnets it is possible for the microprocessor to determine which of the included plugs is extended. This is due to the fact that a Hall Effect device operates by sensing the proximate presence of a magnetic field. This field is provided by small magnets embedded in the mountings of the plugs themselves. When the plugs are in the closed position, their respective Hall Effect devices sense their magnet and, therefore, knows that its plug is closed. If either plug is extended, its magnet is moved away from its respective Hall Effect device and, by this action, alerts the microprocessor of the extension.

There a four possible states of the two plugs. They are as follows:

[1.] Both plugs are closed. Since there is no available power the microprocessor is unaware of this state.

[2.] The USA plug is extended. The microprocessor is alerted to this state by the USA Hall Effect device.

[3.] The European/Asian plug is extended. The microprocessor is alerted to this state by the European/Asian Hall Effect device

[4.] Both plugs are extended. When the microprocessor sees this state, it considers it a "Fault" condition.

When either states 2 or 3 are present the microprocessor enables an Optotriac or relay to enable the connection of its respective power connector to the charging system and therefore allow battery charging to begin. State 1 is academic as there is no power available, while state 4 is considered a "Fault" condition and neither plug is connected. This prevents hazardous conditions from occurring in the case of a user connecting the system via an extension cord or similar device that would allow the user to touch the unconnected plug which might be exposed through such use.

INDUSTRIAL APPLICABILITY

In one aspect of the present invention, the power circuits 10, 24 are aimed at delivering a specified power output signal to an external device connected, e.g., through the USB port 22, 26 or from a non-transformer "dial-a-voltage circuit (FIGS. 20 and 21). Most external devices do not require a pure direct current (DC) signal to operate correctly. Many external devices will work with a power signal that has a combination of alternating current (AC) and DC. The important consideration with a power output signal that has a combination of AC and DC is to not let the peak value exceed some limit. This limit is typically the value of a pure DC power output signal which is accomplished with this invention either as circuitry as shown here or the PSSoC/PSSiP Energy well semiconductor invention. For example: a USB device typically needs a 5V DC power signal. The limit is 5V so the peak value of the composite AC/DC signal cannot exceed 5V. To keep the power output signal from exceeding the limit, the control element will sense the peak value of the output power signal rather than the DC, or average, component. If there is no AC component, the peak value of the output power signal in the invention is equal to the DC component.

The power device 2 will supply a desired fixed voltage. For a given device, the desired voltage may be different. For example, for a cell phone, the desired voltage is typically 5 volts. The frequency of the output signals (from the microprocessor) is adjusted to always supply the target voltage. In the frequency invention described here, if a load requires more current, the frequency will increase so that the fixed output voltage stays in an acceptable range. In the PSSoC/PSSiP invention described here, more energy is taken from the various Energy wells, which, themselves, have discrete portions of voltage contained within them. For different device requiring different voltages, the power device 2 will output consecutively larger voltages and monitor the current. For different devices requiring different voltages, the PSSoC/PSSiP will output consecutively larger voltages depending on the specific Energy well tapped. When a threshold current is being drawn from the power device 2, or the PSSoC/PSSiP Energy wells, the microprocessor makes a threshold determination as to what voltage the output should be controlled, e.g., 5 volts, 9 volts, 12 volts or up to 19.6 volts for devices like notebooks and/or laptops.

In another aspect of the present invention, a battery and/or charging capacitor (supercap 98) or Variable Voltage Energy well Ladder Power IC may be used as a power storage device to power the microprocessor 86. Also, current as regulated from the feedback loop may be delivered to the microprocessor, avoiding the need for an initial power supply for the microprocessor. In the case of the PSSoC/PSSiP the energy is stored in the Energy wells until it is needed utilizing ultra-low leakage MOSFETS to serve as the power for a "bootstrap". It is desirable to keep the microprocessor on through either a electricity source supply or charged by the supercap 98 and/or battery and/or PSSoC/PSSiP at all times such that the application of loads, i.e., devices, may be detected and their state of charge to begin a charging cycle. During normal charging operation, power is diverted from one of the charging outputs to provide power to charge the supercap 98 and/or battery. In the case when the power device 2 is either first utilized or has been inactive for a period of time, a bootstrap power supply may be temporarily activated to supply the initial power. Once the supercap 98 and/or battery has been charged, the bootstrap power supply may be turned off.

In another aspect of the present invention, the power device 2 and the PSSoC/PSSiP eliminates vampire loads. The microprocessor 86 and feedback loop continually monitor the draw of current from the charging device. From the initiation of the charging cycle, a table is formed in the microprocessor 86 which analyzes the current draw. During the charging cycle the microprocessor 86 continues to monitor the current draw that is being consumed by the charging device through the current sensor resistor 78. The microprocessor 86 then analyzes that draw and reports when the draw begins to wane due to a fully charged device. The microprocessor 86 also stands on alert to sense when the current diminishes as the charging device approaches a full charge. From the initial outrush of current to the charging device through the entire charging cycle, the microprocessor 86 uses algorithms to determine when a charging device is fully or nearly fully charged (and when the current draw approaches zero). Then, the power device 2 shuts off power from its inrush supply and shuts down the charging and power draw from the inrush source. This is accomplished either with a "wake up" routine, such that the system goes to "sleep" for a specified period of time, then wakes up to sense if any device is attached. In another embodiment of the invention, rather than use a "wake up" routine, the clock time is reduced to virtually zero, providing just enough power to power the microcontroller, which then senses whether a device is attached or not. Also, the power device 2 can detect when a device is connected by sensing the current draw. At any time when there is no current draw, the power device shuts off, avoiding the ongoing electrical waste that normally exist when a charging device is still plugged into a wall outlet, but no phone is attached.

In the illustrated embodiment, the first power block or input circuit 28 is connected to the mains, i.e., the sourced electrical power 18, which consist of either 120 volts at a frequency of 60 Hertz (the North American Standard) or 220-240 volts at a frequency of 50 Hz (the European Standard). This power is supplied to a full wave bridge 30 which rectifies the AC into pulsating DC. This pulsating DC is converted into a continuous DC voltage through the use of the capacitors 36 and 38 and the inductor 32. The DC voltage supplied is approximately 180V DC in the case of the North American Standard or approximately 360V DC in the case of the European Standard.

The charging delivery system starts with the microprocessor 86 which delivers high frequency square waves via four ports. These signals are fed through isolator devices 88 and 90 to their respective FET driver sub assemblies 50A, 50B. In the case of sub assembly 50A a signal from the highside isolator 90 is supplied to an FET 62 via its gate. The purpose of the FET 62 is to increase the voltage swing of the square wave from logic levels (3.3V peak to peak) to a voltage level of about 15V peak to peak required to drive the power FET 42 the first driver circuit 50A also contains lowside driver FETs these FETs are supplied from the lowside isolator 88 which is injected into the first isolator's gate 56. This signal is amplified and inverted and then fed in to a subsequent FET 58. This signal is also amplified and then inverted to create a 15V peak to peak signal suitable for driving respective power FET 44.

The two power FETs 42, 44 are set up as a "Totem Pole" configuration. The top of the "Totem Pole" 42 is fed with the DC voltage supplied from the input circuit 28. The bottom FET 44 has its source attached to ground. This arrangement allows for the "Totem Pole" junction 52 to deliver the square waves supplied by circuit 50A with a peak to peak value of 180V in the case of the North American Standard or a peak to peak value of 360V in the case of the European Standard.

Circuits 50B, 40B function identically to circuits 50A, 40A as described above with the exception that the delivered square wave at 54 is 180 degrees out of phase with the square wave at 52.

These two square waves are fed into the frequency dependent reactive device which contains a full wave bridge that is supplied by signal 52 via capacitor 70A. The bottom side of the bridge is fed signal 54 via the capacitor 70B. Capacitors 70A and 70B are sized (capacitance value) to reduce the AC voltage output from the large peak to peak input (180V to 360V peak to peak) to a more manageable voltage in the neighborhood of 10 VAC. The rectified output of bridge 74 is fed into the output circuit 16. This output circuit consists of conductor 76 and capacitor 80 which converts the pulsating DC from bridge 74 into an unregulated DC voltage.

The balance of circuit 16 consists of a voltage sense assembly consisting of resistors 82 and 84 and a current sense resistor 78. The voltage sense assembly delivers a representation of the output voltage (that voltage which is delivered to the charging device) to one of the microprocessor's A/D converters. The sense resistor 78 delivers a voltage that is a representation of the current that is being consumed by the charging device. This signal is supplied to another A/D convertor within the microprocessor. These signals enable the microprocessor to adjust the output voltage to a precise 5 VDC regardless of the current requirements of the charging device.

Figure 19:
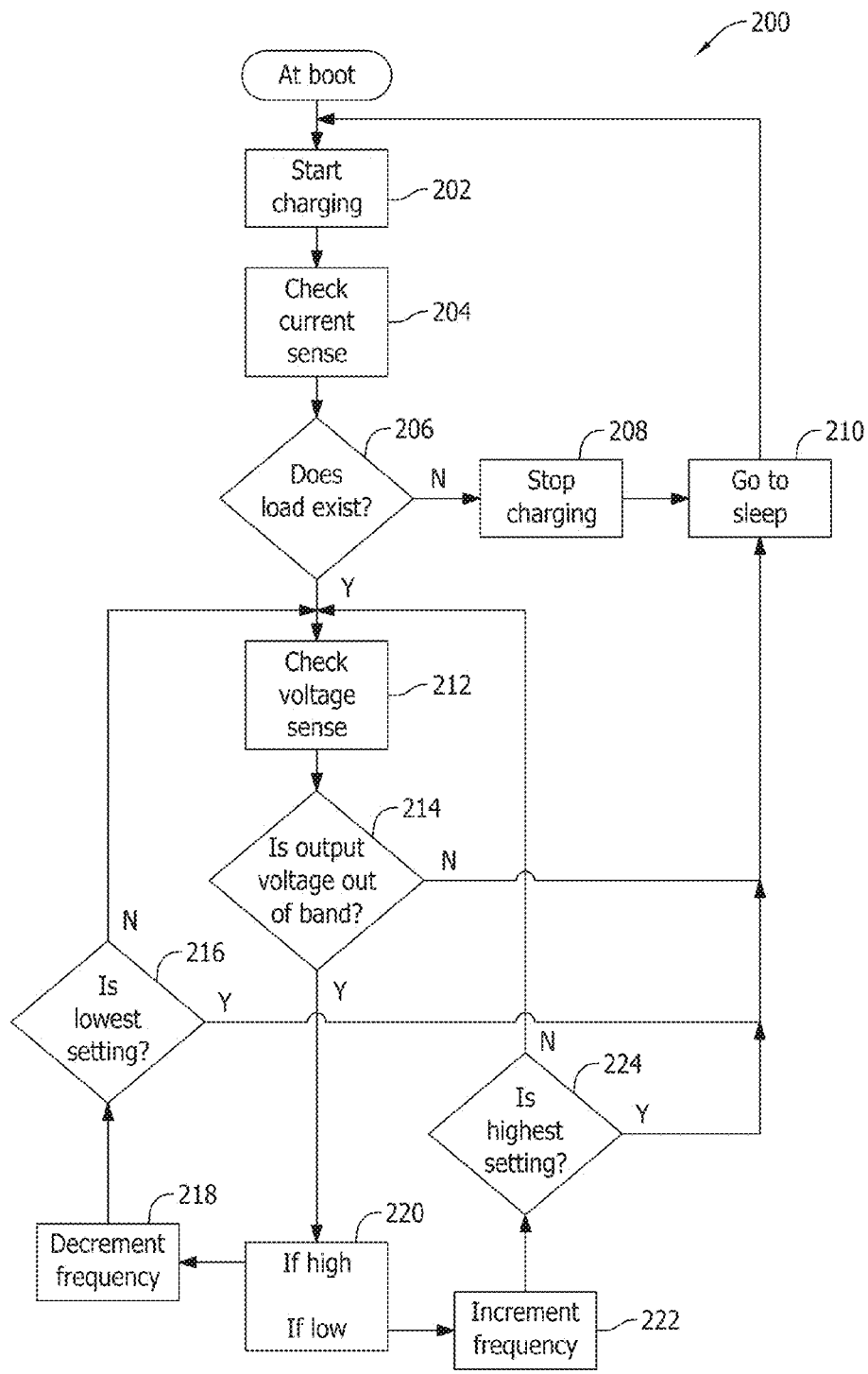
FIG. 19 is a flow diagram illustrating aperture of the power current of FIG. 1, according to an embodiment of the present invention.

With reference to FIG. 19, a boot time method 200 is shown. At boot time, the system initializes a charging routine at block 202. The microprocessor 86 then checks the current sense at block 204 to see if a load exists (block 206). If it does not, the microprocessor 88 turns off the charging routine (block 208) and enters a sleep period (block 210). After the sleep period the method 200 returns to the charging routine (block 202). The method 200 will stay in this loop as long as no load exists.

In the event that a load does exist (block 206) the method 200 checks the voltage sets (block 212). The system then compares what it reads with the acceptable in band voltage (block 214). If the voltage is not out of band the routine goes to sleep (block 210). If the voltage is out of band (block 214), the routine then checks if it is too high or too low (block 220).

If the voltage is too high the system decrements the output frequency (block 218) and then checks if the output frequency is at the lowest allowable setting (block 216). If yes, the routine goes to sleep (block 210). If no, the microprocessor once again checks the voltage sense (block 212). The microprocessor 86 will continue this loop until the output voltage has been reduced to the desired amount or it reaches the lowest allowable setting.

If the voltage is too low, the microprocessor 86 increments the output frequency (block 222) and then checks if the output frequency is at the highest allowable setting (block 224). If yes, the routine goes to sleep (block 210). If no, the method 200 once again checks the voltage sense (block 212). The method 200 will continue this loop until the output voltage has been increased to the desired amount or it reaches the highest allowable setting.

In another aspect of the invention, the PSSoC/PSSiP can be connected in the circuitry with either a wire or wireless connector, enabling it to receive turn on/shut off commands from a remote source, such as a Home Efficiency Command center, a laptop, tablet or a cell phone.

Figure 91:
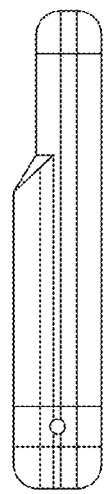
FIG. 91-93 are isometric views of a consumer electronic device including the power circuit shown in FIG. 2, according to an embodiment of the present invention.
Figure 92:
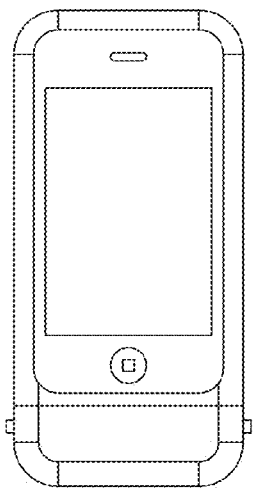
Figure 93:
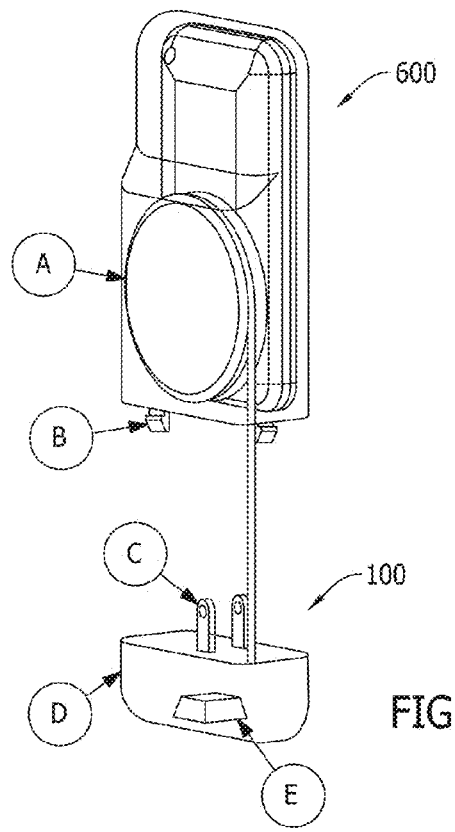
Figure 94:
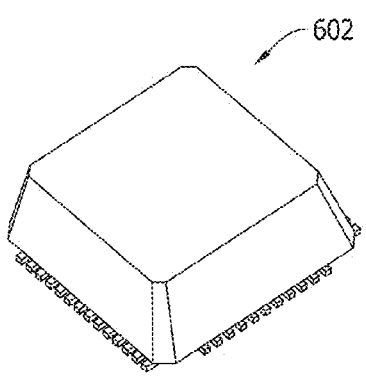
FIG. 94 is an isometric view of a multiple chip module for housing the power circuit shown in FIG. 2, according to an embodiment of the present invention.

FIGS. 91-93 are isometric views of a consumer electronic device 600 including the power circuit 10. FIG. 94 is an isometric view of a multiple chip module 602 for housing the voltage reduction circuit 11. In the illustrated embodiment, the power device 2 includes a detachable charger housing D that is detachable coupled to a housing of the consumer electronic device 600 with a mounting assembly B. The mounting assembly B is configured to detachably couple the charger housing D to the consumer electronic device 600. The detachable charger housing D also includes folding prongs C (106A, 106B). The power device 2 also includes a multiple chip module E (602) that is housed within the detachable charger housing D and includes the voltage reduction circuit 11. A reel assembly A is coupled to the consumer electronic device 600 and includes a 5 v power cord for electrically connecting the power circuit 10 to the operating circuit of the consumer electronic device.

Consumer and Electronics Applications

Because each winding of a transformer can only output one current, the ability to have a dial-a-voltage system, as small as on a hybrid chip is a great advantage. First, it will eliminate heat, second it will vastly reduce part count associated with traditional transformer based systems, and finally, it is more energy efficient. In addition, the addition of intelligence and a "look-up" table of external use permits any consumer device which has the PSSoC/PSSiP onboard to learn a consumer's habits and shut down when not in use or when commanded by a consumer.

Currently, there are over ten thousand different external power supply and/or embedded power supply transformer systems and parts. With the PSSoC/PSSiP these would be vastly reduced, as the dial-a-voltage system on a chip would permit many variables of power outputs to come from a single source, and a the same time, thus powering the different voltages often required within one consumer product, or the circuitry contained within those consumer parts.

Many modifications and variations of the present invention are possible in light of the above teachings. The invention may be practiced otherwise than as specifically described within the scope of the appended claim.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A voltage reduction apparatus for reducing a voltage level of a power signal received from a power source, comprising:
a voltage reduction circuit electrically coupled to the power source for receiving an input direct current (DC) input power signal having an input voltage level and discharging a DC output power signal having an output voltage level that is less than the input voltage level, the voltage reduction circuit including:
a plurality of switched capacitor devices for receiving the DC input power signal and discharging an intermediate DC power signal, each of the switched capacitor devices including a capacitor, an input switch, and a pair of output switches, each input switch of each of the switched capacitor devices configured to couple the switched capacitor devices in series with the source of electrical power for transmitting the DC input power signal from the source of electrical power to the capacitors of each of the switched capacitor devices, each pair of output switches of each of the switched capacitor devices configured to couple each of the switched capacitor devices in parallel to discharge the intermediate DC power signal from the plurality of switched capacitor devices; and
a buck converter coupled to the plurality of switched capacitor devices for receiving the intermediate DC power signal and delivering the DC output power signal to an electrical device;
a power circuit controller coupled to the plurality of switched capacitor devices and configured to:
detect the input power signal being received from the source of electrical power;
initiate a start-up routine including detecting a current draw of the electrical device upon detecting the input power signal;
initiate a sleep mode if the current draw of the electrical device is not detected including initiating a predefined sleep period and reinitiating the start-up routing upon expiration of the predefined sleep period;
initiate a charging routine if the current draw of the electrical device is detected, the charging routing including sensing the output voltage level and transmitting control signals to the switched capacitor device for regulating the switched capacitor device as a function of the sensed output voltage level; and
a vampire load elimination subsystem including a current sensor for sensing a current level of the DC output power signal, the vampire load elimination subsystem configured to shut-off input power to the voltage reduction circuit if the sensed current level is different from a predefined current level.

2. The voltage reduction apparatus in accordance with claim 1, wherein the plurality of switched capacitor devices includes a first switched capacitor device and a second switched capacitor device, the first switched capacitor device including a first capacitor and a first input switch coupled between the power source and the first capacitor, the second switched capacitor device including a second capacitor and a second input switch coupled between the first capacitor and the second capacitor.

3. The voltage reduction apparatus in accordance with claim 2, further comprising a semiconductor chip, the input and the output switching devices being formed on the semiconductor chip, the semiconductor chip including a substrate material including at least one of low Ohmic silicon, polysilicon, gallium nitride, gallium arsenide, silicon germanium, silicon carbide and indium phosphide.

4. The voltage reduction apparatus in accordance with claim 2, the switched capacitor device configured to operate between a charging state, a hold state, and a discharge state, the charging state including the input switching device in an on-position and the output switching devices in an off-position to transmit the DC input power signal to charge the capacitor, the hold state including each of the input switching device and the output switching devices in the off-position to isolate the capacitor, the discharging state including the input switching device in the off-position and the output switching devices in the on-position to discharge the capacitor.

5. The voltage reduction apparatus in accordance with claim 2, wherein each of the plurality of switched capacitor devices is operable between a charging state and a discharging state, the input switching devices configured to couple the capacitors in series in the charging state to transmit the DC input power signal to charge the capacitors, the output switching devices configured to couple the capacitors in parallel in the discharging state to discharge the intermediate DC power signal from the capacitors to the buck converter.

6. The voltage reduction apparatus in accordance with claim 5, the voltage reduction circuit including a hold capacitor electrically coupled to each of the switched capacitor devices, the plurality of switched capacitor devices being regulated to deliver the intermediate DC power signal to the hold capacitor in the discharge state.

7. The voltage reduction apparatus in accordance with claim 1, the voltage reduction circuit including a transformer, a primary side of the transformer being coupled to the buck converter for receiving a DC power signal from the buck converter and generating the DC output power signal.

8. The voltage reduction apparatus in accordance with claim 1, further comprising a rectifier circuit coupled between the power source and the voltage reduction circuit for receiving an alternating current (AC) power signal from the power source and transmitting resulting DC power signal to the voltage reduction circuit.

\* \* \* \* \*